United States Patent
Jeong et al.

(10) Patent No.: US 12,412,078 B1
(45) Date of Patent: Sep. 9, 2025

(54) NEURAL PROCESSING UNIT OPERABLE IN MULTIPLE MODES TO APPROXIMATE ACTIVATION FUNCTION

(71) Applicant: DEEPX CO., LTD., Seongnam-si (KR)

(72) Inventors: Jin Ung Jeong, Seoul (KR); Lok Won Kim, Yongin-si (KR); Hyung Jin Chun, Suwon-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 19/042,006

(22) Filed: Jan. 31, 2025

(30) Foreign Application Priority Data

Nov. 25, 2024 (KR) .......................... 10-2024-0170131

(51) Int. Cl.
*G06N 3/048* (2023.01)
(52) U.S. Cl.
CPC .................................... *G06N 3/048* (2023.01)
(58) Field of Classification Search
CPC ........... G06N 3/048; G06N 3/063; G06F 1/12
See application file for complete search history.

(56) References Cited

U.S. PATENT DOCUMENTS

| | | | | |
|---|---|---|---|---|
| 10,740,432 | B1* | 8/2020 | Diamant | G06N 3/045 |
| 12,223,414 | B1* | 2/2025 | Shin | G06N 3/045 |
| 2017/0103319 | A1* | 4/2017 | Henry | G06F 1/10 |
| 2019/0147323 | A1* | 5/2019 | Li | G06N 3/048 706/15 |
| 2020/0019850 | A1* | 1/2020 | Valentian | G06N 3/049 |
| 2020/0285939 | A1* | 9/2020 | Baker | G06F 18/24 |
| 2021/0241077 | A1* | 8/2021 | Mizuo | G06N 3/048 |
| 2024/0403616 | A1* | 12/2024 | Cheema | G06N 3/048 |

OTHER PUBLICATIONS

Kim, Lok-Won. "DeepX: Deep learning accelerator for restricted boltzmann machine artificial neural networks." IEEE transactions on neural networks and learning systems 29.5 (2017): 1441-1453. (Year: 2017).*

Goyal, Mohit, Rajan Goyal, and Brejesh Lall. "Improved polynomial neural networks with normalised activations." 2020 International Joint Conference on Neural Networks (IJCNN). IEEE, 2020. (Year: 2020).*

Valencia, Daniel, Saeed Fouladi Fard, and Amir Alimohammad. "An artificial neural network processor with a custom instruction set architecture for embedded applications." IEEE Transactions on circuits and systems I: regular papers 67.12 (2020): 5200-5210. (Year: 2020).*

(Continued)

*Primary Examiner* — Randall K. Baldwin

(57) ABSTRACT

A neural processing unit may be provided. The neural processing unit may comprise a controller circuit configured to select an activation function processing method among a first method or a second method, according to an activation function included in a neural network model, a programmed activation function execution unit (PAFE unit) configured to execute a programmed activation function (PAF) that approximate the activation function and output a first activation value, and a converter circuit configured to convert the first activation value and output a second activation value. In the first method, only the PAFE unit may operate. In the second method, both the PAFE unit and the converter may operate.

18 Claims, 36 Drawing Sheets

(56) References Cited

OTHER PUBLICATIONS

Skrbek, Miroslav, and Pavel Kubalík. "Feasibility of a neural network with linearly approximated functions on zynq fpga." 2022 29th IEEE International Conference on Electronics, Circuits and Systems (ICECS). IEEE, 2022. (Year: 2022).*

Reggiani, Enrico, Renzo Andri, and Lukas Cavigelli. "Flex-sfu: Accelerating dnn activation functions by non-uniform piecewise approximation." 2023 60th ACM/IEEE Design Automation Conference (DAC). IEEE, 2023. (Year: 2023).*

Ashish Vaswani et al., "Attention Is All You Need", 31st Conference on Neural Information Processing Systems (NIPS 2017), 11 pages, Long Beach, CA, USA.

Janghyeon Kim et al., "Range-Invariant Approximation of Non-Linear Operations for Efficient BERT Fine-Tuning", 2023 60th ACM/IEEE Design Automation Conference (DAC), 6 pages, Seoul, Korea.

* cited by examiner

NEURAL PROCESSING UNIT OPERABLE IN MULTIPLE MODES TO APPROXIMATE ACTIVATION FUNCTION

CROSS-REFERENCE TO RELATED APPLICATIONS

This application claims priority to Korean Patent Application No. 10-2024-0170131 filed on Nov. 25, 2024, in the Korean Intellectual Property Office, the disclosure of which is incorporated herein by reference in its entirety.

BACKGROUND OF THE DISCLOSURE

Technical Field

The present disclosure relates to a neural processing unit configured to process activation functions.

Background Art

Humans are equipped with intelligence that can perform recognition, classification, inference, prediction, and control/decision making. Artificial intelligence (AI) refers to artificially mimicking human intelligence.

The human brain is made up of a multitude nerve cells called neurons. Each neuron is connected to hundreds to thousands of other neurons through connections called synapses. The modeling of the operating principle of biological neurons and the connection relationship between neurons in order to imitate human intelligence is called a neural network (NN) model. In other words, a NN is a system that connects nodes that mimic neurons in a layer structure.

A NN dedicated processor developed to accelerate the computation of an NN is a neural processing unit (NPU).

SUMMARY OF THE DISCLOSURE

Embodiments relate to a neural processing unit including a controller, one or more processors and a converter circuit. The controller circuit selects a first mode or a second mode for applying an activation function in a neural network model based on analysis of the activation function. The one or more processors execute a programmed activation function (PAF) and generate a first activation value in the first mode and the second mode by applying the PAF, the first activation value used as an approximation of applying the activation function in the first mode. The converter circuit coupled to the one or more processors and converts the first activation value into a second activation value in the second mode but not in the first mode, the second activation value used as the approximation of applying the activation function in the second mode.

In one or more embodiments, when an error rate defined as difference between the activation function and the PAF is lower than a threshold value, the controller circuit selects the first mode. When the error rate is not lower than the threshold value, the controller circuit selects the second mode.

In one or more embodiments, an accuracy of an activation value output generated in the second mode is higher than an accuracy of the activation value output generated in the first mode.

In one or more embodiments, the PAF is approximated using a trained neural network.

In one or more embodiments, in the first mode, the one or more processors outputs the first activation value across entire sections of input values to the activation function.

In one or more embodiments, in the second mode, the one or more processors use the first activation value for a reference section of the input values, and the converter use the second activation value for the sections excluding the reference section.

In one or more embodiments, the converter circuit applies an exponential function to the first activation value to generate and use the second activation value in the second mode.

In one or more embodiments, the converter circuit outputs the second activation value by concatenating a variable exponent part with a mantissa part of the first activation value.

In one or more embodiments, the activation function is a reciprocal function.

In one or more embodiments, the PAF includes a programmable segment implemented as a linear function divided into a plurality of segments.

DETAILED DESCRIPTION OF THE EMBODIMENT

Figure 1:
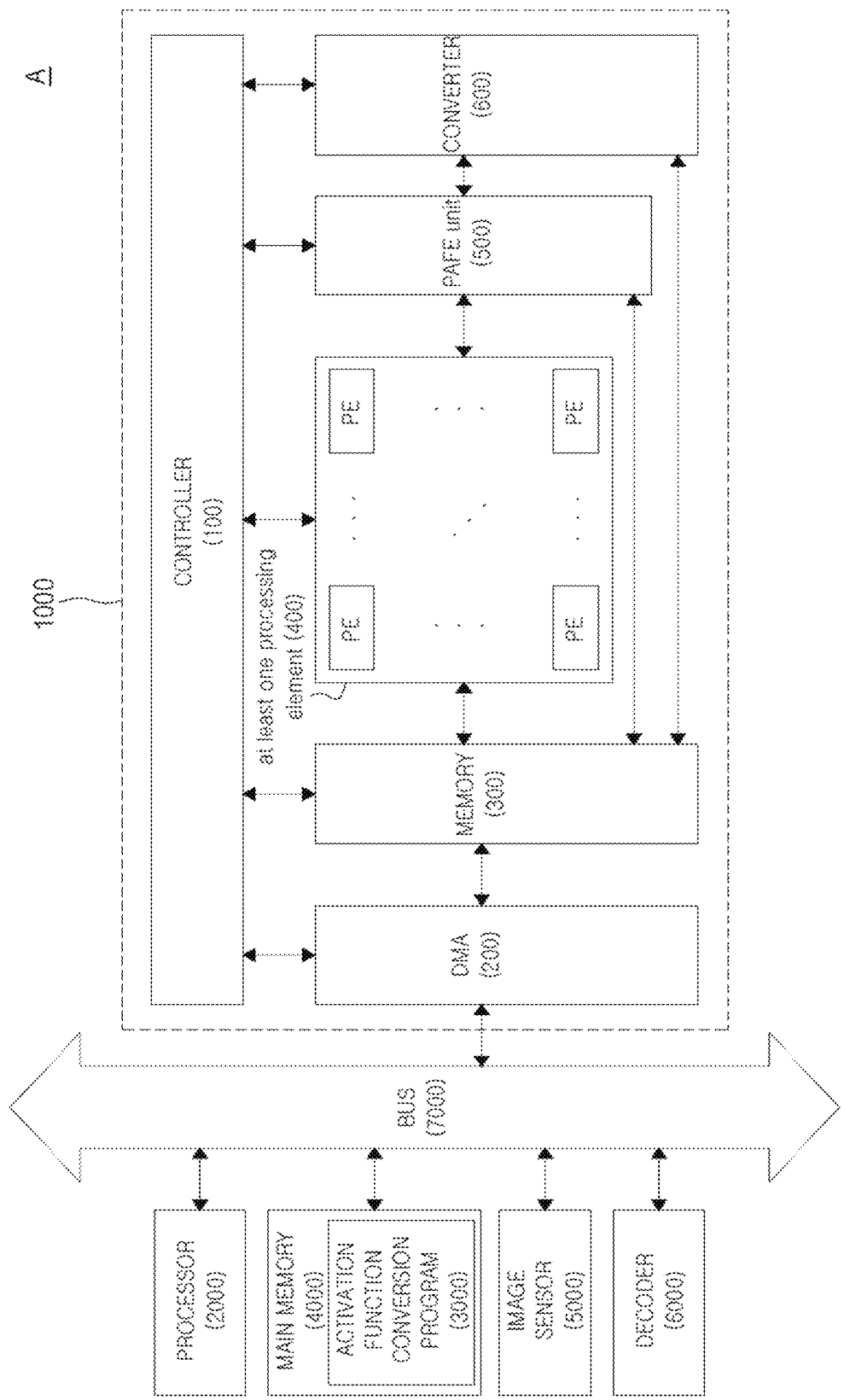
FIG. 1 is a schematic conceptual diagram illustrating a device for performing a method of programming an activation function according to an example of the present disclosure.

Particular structural or step-by-step descriptions for examples according to the concept of the present disclosure disclosed in the present specification or application are merely exemplified for the purpose of explaining the examples according to the concept of the present disclosure.

Examples according to the concept of the present disclosure may be embodied in various forms. Examples according to the concept of the present should not be construed as being limited to the examples described in the present specification or application.

Embodiments according to the concept of the present disclosure may apply various changes. The present disclosure may take many forms. Accordingly, specific examples are illustrated in the drawings and described in detail in the present disclosure. However, this is not intended to limit the examples according to the concepts of the present disclosure to a specific disclosure form. Therefore, it should be understood that all changes, equivalents or substitutes included in the spirit and scope of the present disclosure are included in the present disclosure.

Terms such as first and/or second may be used to describe various components. However, the present disclosure should not be limited by the above terms.

These terms are only used for the purpose of distinguishing one component from another. For example, without departing from the scope of rights according to the concept of the present disclosure, a first element may be termed a second element, and similarly, a second element may also be termed a first element.

When an element is referred to as being "connected to" or "in contact with" another element, it is understood that the other element may be directly connected to or in contact with the other element, but other elements may be disposed therebetween. On the other hand, when it is mentioned that a certain element is "directly connected" or "directly connected" to another element, it should be understood that no other element is present therebetween.

Other expressions describing the relationship between elements, such as "between" and "immediately between" or "adjacent to" and "directly adjacent to", etc., should be interpreted similarly.

In this present disclosure, expressions such as "A or B", "at least one of A or/and B" or "one or more of A or/and B" may include all possible combinations thereof. For example, "A or B", "at least one of A and B" or "at least one of A or B" may refer to both (1) including at least one A, (2) including at least one B, or (3) including both at least one A and at least one B.

As used herein, expressions such as "first", "second", "first or second" may modify various elements, regardless of order and/or importance. Said expressions are used only to distinguish one element from other elements, and does not limit the elements. For example, the first user apparatus And the second user device may represent different user device regardless of order or importance. For example, without departing from the scope of rights described in this disclosure, the first element may be named as the second element, and similarly, the second element may also be renamed as the first element.

Terms used in present disclosure are only used to describe specific examples, and may not be intended to limit the scope of other examples.

The singular expression may include the plural expression unless the context clearly dictates otherwise. Terms used herein, including technical or scientific terms, may have the same meanings as commonly understood by one of ordinary skill in the art described in this document.

Among terms used in present disclosure, terms defined in a general dictionary may be interpreted as having the same or similar meaning as the meaning in the context of the related art. Unless explicitly defined in this document, it should not be construed in an ideal or overly formal sense. In some cases, even terms defined in the present disclosure cannot be construed to exclude examples of the present disclosure.

The terms used herein are used only to describe specific examples, and are not intended to limit the present disclosure.

Singular expressions include plural expressions unless the context clearly dictates otherwise. In this specification, terms such as "comprise" or "having" are intended to indicate that the described feature, number, step, operation, component, part, or combination thereof is present. Accordingly, it should be understood that the presence or addition of one or more other features, numbers, steps, operations, components, parts, or combinations thereof is not precluded.

Unless defined otherwise, all terms used herein, including technical or scientific terms, have the same meaning as commonly understood by one of ordinary skill in the art to which this disclosure belongs. Terms such as those defined in commonly used dictionaries should be interpreted as having a meaning consistent with the meaning in the context of the related art. Unless explicitly defined in this disclosure, it is not to be construed in an ideal or overly formal sense.

Each feature of the various examples of the present disclosure may be partially or wholly combined or combined with each other. Various examples of the present disclosure are technically capable of various interlocking and driving as can be fully understood by those skilled in the art. Each of the examples of the present disclosure may be implemented independently of each other or may be implemented together in an association relationship.

In describing the examples, descriptions of technical contents that are well known in the technical field to which the present disclosure pertains and are not directly related to the present disclosure may be omitted. This is to more clearly convey the gist of the present disclosure without obscuring the gist of the present disclosure by omitting unnecessary description.

Neural network (NN) models are divided into "single-layer neural network" and "multi-layer neural network," according to the number of layers. A typical multi-layer neural network consists of an input layer, a hidden layer, and an output layer. The input layer is a layer that receives external data, and the number of input layers is the same as the number of input variables. The hidden layer is located between the input layer and the output layer, and is a layer that receives signals from the input layer, extracts features, and transfers them to the output layer. The output layer is a layer that receives signals from hidden layers and outputs them to the outside.

When a signal is transmitted between neurons in the human brain, the transmission strength of the signal varies. By imitating this, the transmission strength of a signal transmitted between layers, that is, activation, is determined by an activation function in the NN.

Depending on the characteristics of the activation function implemented in the NPU, the inference accuracy of the NN may vary. That is, the performance and efficiency of the NN are determined according to the hardware implementation characteristics of the NPU's activation function processing circuit. In addition, NNs that handle complex mathematical activation functions can be processed by hardware accelerators. When implementing an NN-specific processor in hardware, an NN-specific processor may require significant chip area (i.e., a large number of logic gates). Also, these chips can exhibit significant power consumption.

A deep neural network (DNN) refers to an NN with an increased number of hidden layers to implement higher artificial intelligence. The activation function of the DNN is used to determine the transfer strength for computed values with weights and biases applied. DNNs are being developed in various structures.

For example, a convolutional neural network (CNN), which is an example of a DNN, is known to be easy to extract features of an input value (i.e., video or image) and identify a pattern of the extracted features. A CNN may be configured in a form in which a convolution operation, an activation function operation, a pooling operation, and the like are processed in a specific order.

For example, in each layer of a DNN, input values and parameters (i.e., weights or kernels) may be a matrix composed of a plurality of channels. Input values and parameters can be processed in the NPU by convolution or matrix multiplication. Calculation values are generated after calculations are processed in each layer. An activation function may be applied to these calculated values.

For example, a transformer is a DNN based on attention technology. Transformers utilize a number of matrix multiplication operations. The transformer may obtain an operation value of attention (Q, K, V) by using parameters such as an input value and a query (Q), a key (K), and a value (V). The transformer may process various inference operations based on the operation value (i.e., attention (Q, K, V)). Transformers tend to show better inference performance than CNNs.

The aforementioned neural networks may be referred to as DNNs. Meanwhile, an activation function may be selectively applied to an operation value of a specific layer among a plurality of layers of the DNN.

It may be configured to include an X-axis value corresponding to an input value of an activation function (i.e., an operation value of a specific layer) and a Y-axis value corresponding to an activation value of the activation function. The activation function plays a role in converting mathematical linear combinations of input values into various types of linear combinations or non-linear combinations. Accordingly, a DNN may be designed to perform various inference functions by applying an appropriate activation function to an operation value of a specific layer.

Most of the complex functions to be solved in DNNs have non-linearity. To solve this problem, most activation functions are non-linear functions. Performance and efficiency of a DNN model processed in hardware may vary depending on the non-linearity of an activation function applied to at least one DNN model processed by the NPU. Inference accuracy of the input value of the activation function may be affected by emphasizing features of specific regions and deemphasizing features of other regions. The non-linearity of at least some activation functions among various activation functions may include a logarithm operation, an exponential operation, and the like. Implementing an activation function including log and exponential operations in hardware is complex in terms of digital logic design. For example, for logarithmic and exponential operations, the configuration of a hardware operator becomes very complicated. Accordingly, power consumption of hardware may increase and calculation processing speed may be slowed down when such activation functions are used.

In the case of NPUs, each activation function processing module may be designed for each activation function processing. In addition, a hard-wired processor may process only predefined activation functions using respective hard-wired dedicated activation function processing logic units. At this time, the inventors of the present disclosure recognized that there is a disadvantage in that the number of gates rapidly increases in a hard-wired processor according to the computational complexity of the activation function.

Hard-wired processors cannot independently handle new activation functions without hardware modifications. Activation functions that cannot be processed by hard-wired processors must be calculated with separate software. For example, a hard-wired processor could be an application specific integrated circuit (ASIC) dedicated to artificial intelligence. That is, the hard-wired processor may be an NPU.

Various methods have been proposed to process various types of activation functions in hard-wired processors. For example, conventionally, an activation function has been processed using a method using a look-up table (LUT), a method using a non-linear approximation equation, a method using a polynomial approximation, and the like.

However, in the conventional method of approximating an activation function where the activation function is processed in hardware using polynomial approximation or the like, a large amount of computation from the processor is performed to improve inference accuracy.

Embodiments relate to addressing the inference accuracy deterioration problem of the DNN model to which the conventional activation function approximation technique is applied, addressing the problem of increasing the number of gates in the activation function processing unit of the processor, and addressing the problem of increasing power consumption of the processor.

Furthermore, a programming method capable of approximating any activation function and a hardware design for driving the activation function are beneficial for the processor to independently process: 1) activation functions that are not included in predetermined data such as a lookup table that cannot be processed by a processor to which the conventional activation function processing method is applied, 2) new activation functions, and/or 3) activation functions in which some of the conventional ones have been modified.

Furthermore, a design of an NPU capable of driving an approximation algorithm customized for characteristics of an activation function is beneficial.

Furthermore, it is beneficial if an activation function can be programmed efficiently and flexibly in hardware designed to perform such activation function.

Furthermore, each region may be set based on the shape of an activation function to be programmed, and an approximation parameter may be programmed for each set region. The activation function can be programmed efficiently and with a low approximation error by considering the characteristics of each region of the activation function.

Furthermore, a programmed activation function (PAF) can be provided in a hard-wired processor that includes a programmed activation function execution (PAFE) unit.

Embodiments may provide a method that is superior to conventional approximation methods and capable of programming a non-linear activation function in hardware with various hardware options. Further, embodiments may also provide a method for approximating a non-linear activation function in a more customized manner by considering characteristics of the activation function itself, approximation error, hardware option information, and the like. For these purposes, embodiments may provide a hard-wired processor including a PAFE unit.

Embodiments man also provide a hard-wired processor comprising a PAFE unit configured to process at least one programmed activation function.

Embodiments may also provide a method for deriving a first programmed activation function for at least one section of an activation function, and then use the first programmed activation function to derive a second programmed activation function for all sections.

Embodiments may also provide a method for converting an activation function into a programmable activation function composed of multiple programmable segments for enabling precise approximation, reducing the approximation error rate and enhancing overall computational accuracy.

However, the tasks of the present disclosure are not limited to the tasks mentioned above, and other tasks not mentioned will be clearly understood by those skilled in the art from the description below.

Hereinafter, an example of the present disclosure will be described in detail with reference to the accompanying drawings.

FIG. 1 illustrates a device for performing an activation function programming method according to an example of the present disclosure. Referring to FIG. 1, an apparatus or a system A for performing an activation function programming method may include a neural processing unit NPU 1000 and an activation function conversion program unit 3000. The apparatus or system A may further include a processor 2000, a main memory 4000, an image sensor 5000, and a decoder 6000. Accordingly, the apparatus A may be configured to perform various neural network inference functions. Each of the elements that may be included in the apparatus or system A may communicate through the bus 7000 to transmit and receive data.

Here, the NPU 1000, the processor 2000, the main memory 4000, the image sensor 5000, and the decoder 6000 may be configured as electronic circuits. The activation function conversion program unit 3000 may be a computer program, software, firmware, application, or executable code stored in a recording medium. The activation function conversion program unit 3000 may be stored in main memory 4000. Alternatively, the activation function conversion program unit 3000 may be stored in memory separate from main memory 4000 Computer-readable recording media may include ROM, RAM, SSD, HDD, CD-ROM, flash memory, magnetic tape, floppy disk, optical data storage device, and the like. The activation function conversion program unit 3000 may be loaded onto and executed by processor 2000 or other processors.

The NPU 1000 is a processor separate from the processor 2000 and specialized for operation for a deep neural network (DNN). In particular, the NPU 1000 may include operators specialized for convolution and matrix multiplication, which occupy most of the computational load of DNN. The NPU 1000 and the processor 2000 may be semiconductor chips including electronic circuits.

NPU 1000 may include a controller 100, a direct memory access (DMA) 200, a memory 300, at least one processing element 400, a programmed activation function execution (PAFE) unit 500 and a converter 600.

The controller 100 may be electrically connected to the DMA 200, the memory 300, at least one processing element 400, and the PAFE unit 500. The controller 100 may be configured to control operations related to DNN operations in the NPU 1000. However, the present disclosure is not limited thereto, and at least one processing element 400 may be modified and implemented as a processing element array (e.g., a systolic array).

The DMA 200 is configured so that the NPU 1000 directly accesses the main memory 4000 outside the NPU 1000 to perform read/write operations. The NPU 1000 may read various data related to the DNN from the main memory 4000 through the DMA 200. The DMA 200 may be configured to perform tasks such as setting, generating, and controlling addresses of the internal memory 300.

The memory 300 may be a memory disposed in the on-chip region of the NPU 1000 and may be a memory for caching or storing data processed in the on-chip region. The memory 300 may read and store data required for calculation of the neural network model from the main memory 4000. The memory 300 may include one of memories such as ROM, SRAM, DRAM, resistive RAM, magneto-resistive RAM, phase-change RAM, ferroelectric RAM, flash memory, and HBM. The memory 300 may be composed of at least one memory unit. The memory 300 may be configured as a homogeneous memory unit or a heterogeneous memory unit.

At least one processing element 400 may be configured to process an operation of parameters (e.g., weight, kernel, query (Q), key (K), value (V), and the like) corresponding to input data of the DNN. At least one processing element 400 may include a multiply and accumulate (MAC) operator and/or an arithmetic logic unit (ALU) operator.

The PAFE unit 500 is configured to receive data (i.e., programmed parameters) for a programmed activation function (PAF) converted from an activation function. The programmable parameter may be data generated by processor 2000 executing the activation function conversion program unit 3000. The programmable parameter may be configured to have a form compatible with the circuit of the PAFE unit 500 of the NPU 1000. Programmable parameters may be configured to implement at least one PAF. That is, the PAFE unit 500 may be configured to receive a programmable parameter corresponding to at least one PAF generated by the activation function conversion program unit 3000. To elaborate, the PAF programmed through the activation function conversion program unit 3000 may include at least one programmable segment. That is, the programmable parameter may implement at least one programmable segment.

The NPU 1000 may perform a DNN operation by receiving data for a PAF in relation to an activation function. The PAFE unit 500 may generate an activation value (e.g., activation map) by applying the PAF generated by the activation function conversion program unit 3000 to the calculation value (e.g., feature map) output from the at least one processing element 400. The PAFE unit 500 uses at least one programmable parameter generated in correspondence with at least one PAF. Accordingly, the PAFE unit 500 enables the NPU 1000 to process various activation functions, in particular, newly proposed or known but partially modified activation functions.

The PAFE unit 500 may be pipelined with at least one processing element 400. According to the configuration described above, a value calculated by at least one processing element 400 may be input through a pipeline. Accordingly, the at least one pipelined processing element 400 and the PAFE unit 500 may be configured to receive an operation value from the at least one processing element 400 and output an activation value to which PAF is applied. In this case, bottlenecks that may occur in the at least one processing element 400 and the PAFE unit 500 may be reduced or substantially eliminated. However, the examples of the present disclosure are not limited to the pipeline structure, and the PAFE unit may be implemented by merging with at least one processing element 400.

The converter 600 is a circuit that converts the activation value for a particular section output from the PAFE unit 500 (e.g., a section with an input of 0 to 1) to output an activation value for the whole section. The converter 600 may be optionally be operated depending on the situation. Specifically, if the DNN is sensitive so that it involves a relatively high approximation accuracy of the programmed activation function, the controller 100 may control the PAFE unit 500 and the converter 600 to operate organically so that the NPU 1000 outputs a more accurate activation value. In contrast, if the DNN is relatively insensitive so that it involves a relatively low approximation accuracy of the programmed activation function, the controller 100 may control the PAFE unit 500 to operate only the PAFE unit 500 without operation of the converter 600, allowing the NPU 1000 to output an activation value. This will be described later with reference to FIGS. 26 through 36.

The activation function conversion program unit 3000 may be executed by the processor 2000, but is not limited thereto. The processor 2000 may be an arithmetic device such as a central processing unit (CPU) or an application processor (AP) capable of performing the activation function programming method disclosed in the present disclosure.

The activation function conversion program unit 3000 may be stored in a computer-readable recording medium (e.g., main memory 4000). The activation function conversion program unit 3000 may be implemented in firmware or software included in hardware. A separate computing system and operating system may be provided to drive the activation function conversion program unit 3000. The activation function conversion program unit 3000 may be a program for operating the NPU 1000 including the PAFE unit 500. The activation function conversion program unit 3000 may be configured to perform an activation function programming method. The activation function conversion program unit 3000 may be executed by the processor 2000 or a processor external to the apparatus A. The activation function conversion program unit 3000 may be configured separately from a compiler configured to compile a DNN in the apparatus A. Alternatively, the activation function conversion program unit 3000 may be integrated with a compiler.

The activation function conversion program unit 3000 may be configured to program at least one activation function. The activation function conversion program unit 3000 may be configured to provide programmable parameters corresponding to at least one PAF to the PAFE unit 500.

The activation function conversion program unit 3000 may be configured to receive activation function information included in a DNN to be processed by the NPU 1000. The activation function conversion program unit 3000 may obtain information on all activation functions to be processed by the NPU 1000 based on the provided information on at least one activation function. Accordingly, the activation function conversion program unit 3000 may program at least one activation function necessary for the DNN to be processed by the NPU 1000. In various examples, the activation function conversion program unit 3000 may generate segment data for segmenting the activation function, segment the activation function into a plurality of segments using the generated segment data, and approximate at least one segment among a plurality of segments as a programmable segment. When the value of the programmable parameter is determined, an approximation level of the programmable segment may be determined. The activation function conversion program unit 3000 may determine the number and width of the plurality of segments based on the segment data.

The activation function conversion program unit 3000 may be configured to analyze characteristics of an activation function. For example, the activation function conversion program unit 3000 may be configured to analyze a gradient change of an activation function. The slope change data of the activation function may refer to all kinds of data from which the slope change of the activation function can be determined.

The activation function conversion program unit 3000 may analyze the characteristics of the activation function based on the slope change data. In other words, the approximation error tends to increase in a region where the slope change of the activation function is more abrupt. In the case of a region where the slope does not change, the approximation error may be zero or close to zero. Accordingly, the activation function conversion program unit 3000 may be configured to approximate the activation function in a more efficient manner by analyzing the slope change data.

For example, the slope change data of the activation function may be differential data of the activation function. The slope change data may include at least one of a slope change value, a first derivative value, a second derivative value, a third derivative value and the like.

For example, the activation function conversion program unit 3000 may determine a linear section and a non-linear section of the PAF based on slope change data of the activation function.

In some examples, the activation function conversion program unit 3000 may determine a section having a substantially insignificant gradient change among non-linear sections of the PAF as a substantially linear section.

The activation function conversion program unit 3000 may convert at least one segment into a programmable segment approximated by a specific equation.

For example, the activation function conversion program unit 3000 may convert a specific segment of the activation function into a programmable segment approximated by a linear function.

In detail, the activation function conversion program unit 3000 may convert at least one segment into a programmable segment approximated with a specific gradient and a specific offset value. The activation function conversion program unit 3000 may convert at least one segment among a plurality of segments into a programmable segment using a specific non-linear approximation equation. The activation function conversion program unit 3000 may determine a gradient and an offset for approximating at least one segment to a programmable segment corresponding to a linear function.

The activation function conversion program unit 3000 may search for a minimum error value while converting the gradient value and the offset value of the programmable segment. Alternatively, the activation function conversion program unit 3000 may search for a minimum error value by performing a cost function.

The activation function conversion program unit 3000 may calculate an error value between at least one segment of an activation function to be transformed and at least one candidate segment having a candidate gradient and a candidate offset. The activation function conversion program unit 3000 may determine at least one candidate segment as a programmable segment based on the calculated error value. The activation function conversion program unit 3000 may search for at least one minimum error value between the segments of the activation function and each of the corresponding programmable segments. The activation function conversion program unit 3000 may determine the programmable parameter of the programmable segment based on the least one searched minimum error value. Here, the error value determined may be a minimum error value. When the activation function conversion program unit 3000 determines the programmable parameter based on the minimum error value, deterioration in inference accuracy of the DNN may be suppressed or minimized.

However, the examples of the present disclosure are not limited to the minimum error value, and the programmable parameter may be differently determined according to different priorities among the amount of calculation, the amount of power consumption, and the approximation error value.

In other words, the activation function conversion program unit 3000 may measure an approximation error value of a programmable segment obtained by converting a specific segment to a specific approximation function. For example, the activation function conversion program unit 3000 may measure a first error value of the programmable segment by approximating the specific segment to a programmable segment of a linear function. Additionally, the activation function conversion program unit 3000 may measure the second error value of the programmable segment by approximating the specific segment to a programmable segment of a quadratic function. The activation function conversion program unit 3000 may compare the first error value and the second error value and select an approximation function having a smaller error value as a programmable segment. Through the above process, the activation function conversion program unit 3000 may select an activation function for neural network operation and convert the activation function into a PAF.

That is, when the approximation function of the programmable segment is determined, the format of the programmable parameter may also be determined. For example, if a specific segment is approximated as a programmable segment of a linear function, the corresponding programmable parameters may include gradient and offset values. For example, if a specific segment is approximated by a programmable segment of a quadratic function, the corresponding programmable parameter may include coefficients of the quadratic term. An approximation function of each programmable segment may be selectively determined. That is, approximation functions of the first programmable segment and the second programmable segment may be identical to or different from each other.

The criterion for determining the characteristics of the approximation function of each programmable segment may be determined based on any one of the calculation amount, the power consumption, and the approximation error value of the PAFE unit 500.

For example, the criterion for determining the characteristics of the approximation function of the programmable segment may vary according to the relative priority of calculation amount, power consumption amount, and approximation error values. The priorities may be set in the activation function conversion program unit 3000. In other words, the activation function conversion program unit 3000 may search for programmable parameters implementing an approximation function of a programmable segment to achieve specific performance among high-speed operation, low-power consumption, and suppression of deterioration of inference accuracy. However, examples of the present disclosure are not limited to specific approximation criteria.

The main memory 4000 may store, among other data, data for calculation of the neural network model. The main memory 4000 may include one of memories such as ROM, SRAM, DRAM, resistive RAM, magneto-resistive RAM, phase-change RAM, ferroelectric RAM, flash memory, and HBM. The main memory 4000 may be composed of at least one memory unit. The main memory 4000 may be configured as a homogeneous memory unit or a heterogeneous memory unit.

The image sensor 5000 generates an image or video data from light entering through a lens. The NPU 1000 may use the image or video data as input data of a DNN processed in the NPU 1000.

The decoder 6000 decodes the input data of the encoded bit stream, and the decoded input data can be used as an input of the DNN.

The bit stream may be a bit stream encoded to perform at least one task.

Tasks that may be included in the bit stream may include object detection, object segmentation, image/video reconstruction, image/video enhancement, object tracking, event recognition, event prediction, anomaly detection, density estimation, event search, measurement and the like.

A bit stream may include a plurality of encoded operation values capable of handling a plurality of tasks.

Output data of the decoder 6000 may be an image, a video, a calculation value of a specific layer of the DNN, and the like.

Hereinafter, the activation function programming method will be described in detail with reference to FIGS. 2, 3A-3C, and 4A-4D.

Figure 2:
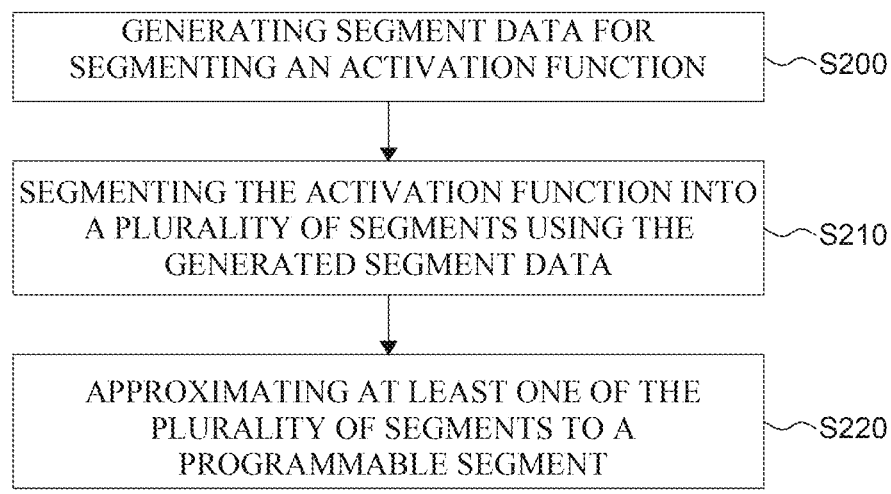
FIG. 2 is a schematic flowchart illustrating a method of programming an activation function according to an example of the present disclosure.

FIG. 2 illustrates an activation function programming method according to an example of the present disclosure. Referring to FIG. 2, the activation function programming method includes step S200 of generating segment data for segmenting an activation function, step S210 of segmenting the activation function into a plurality of segments using the generated segment data, and step S220 of approximating at least one of the plurality of segments to a programmable segment.

In the step S200, a segment data is generated. The segment data is the data generated to segment the activation function into a plurality of segments. The segment data will be described later.

In the step S210, the activation function is segmented into a plurality of segments using the generated segment data. In the present disclosure, the term "segment" means a portion of an activation function divided into a plurality of sections, and may be distinguished from a "candidate segment" or a "programmable segment," which is a term related to approximation of an activation function.

In various examples, the step S210 may include determining the number and width of a plurality of segments based on segment data. In the step S210, the number of segments and the width of each of the plurality of segments segmenting the activation function to be transformed may be determined using the segment data. At least one of the plurality of segments may have a width that is the same as or different from that of other segments.

In the present disclosure, a segment of a plurality of segments may be expressed as coordinates of start and end points along the X-axis. Meanwhile, when the number and width of each of the plurality of segments are determined, the coordinates of the segment of the plurality of segments may be obtained using the number and width of the plurality of segments.

In the step S220, at least one segment among the plurality of segments is approximated as a programmable segment. The programmable segment may be programmed according to the hardware configuration of the PAFE unit 500. That is, the activation function conversion program unit 3000 may be configured to program an activation function to be processed in the NPU 1000 based on the hardware configuration of the PAFE unit 500.

For example, the PAFE unit 500 may be configured to have hardware configured to compute each segment with a specific gradient and a specific offset. The activation function conversion program unit 3000 may be configured to receive configuration information of the PAFE unit 500.

In this case, the activation function conversion program unit 3000 may program a segment of the corresponding activation function in the form of a linear function having a slope and an offset, or higher than a quadratic function. For example, a programmable segment can be approximated with a linear function according to certain criteria. In this case, the activation function conversion program unit 3000 may generate a programmable segment expressed in the form of (gradient a)×(input value x)+(offset b). The specific gradient and specific offset described above may be programmable parameters. In the case of a programmable segment determined to be approximated with a linear function, the step S220 may include approximating the selected segment with a specific gradient and a specific offset value.

To elaborate, in some examples, the steps 210 and 220 may be performed in substantially one step. This is because the step of segmenting the segment and the step of generating programmable parameters of the corresponding programmable segment can be performed simultaneously. To elaborate, in some examples, the steps 210 and 220 may be modified into a step of segmenting the activation function into a plurality of segments using the generated segment data and approximating at least one of the plurality of segments to a programmable segment.

Figure 3A:
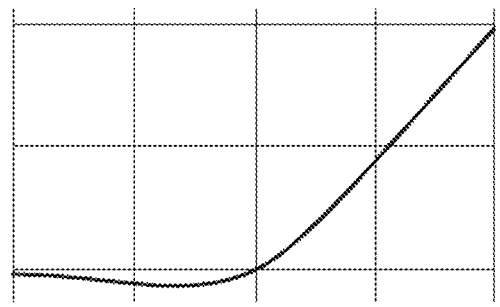
FIGS. 3A-3C are graphs illustrating a process of programming an activation function according to an example of the present disclosure.
Figure 3B:
Figure 3B:
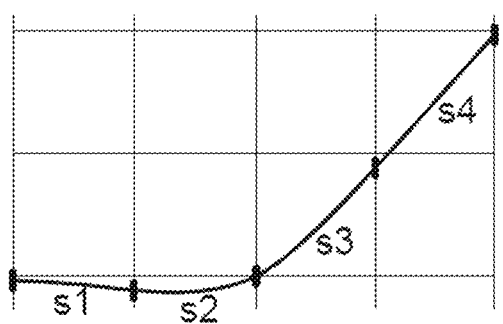
Figure 3C:
Figure 3C:
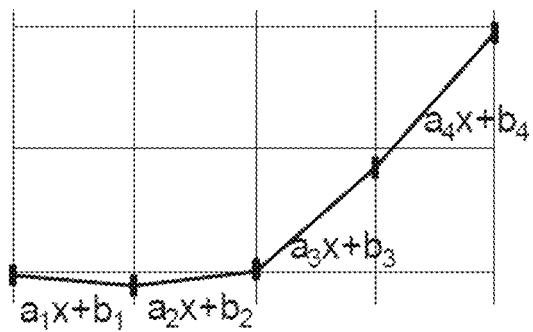

FIGS. 3A-3C illustrate a process in which an activation function is approximated by an activation function programming method according to an example of the present disclosure.

The activation function shown in FIG. 3A may be segmented into a plurality of segments s1, s2, s3, and s4 using segment data as shown in FIG. 3B. The plurality of segments s1, s2, s3, and s4 are approximated as programmable segments a1$x$+b1, a2$x$+b2, a3$x$+b3, and a4$x$+b4 as shown in FIG. 3C. Here, an example in which the activation function conversion program unit 3000 generates programmable parameters so that all programmable segments correspond to a linear function will be described.

Each programmable segment includes corresponding programmable parameters. In FIG. 3C, all of the plurality of segments are approximated as programmable segments in the form of a linear function. However, in various examples, some segments among a plurality of segments may be approximated with other types of programmable segments. For example, the activation function conversion program unit 3000 may program each programmable segment in the form of a linear function, a quadratic function, a cubic function, a logarithmic function, and the like.

For example, only segments s1, s3, and s4 are approximated as programmable segments, and segment s2 may be approximated using various methods available in the device where the activation function is to be processed. Specifically, if a look-up table, a non-linear approximation equation, and the like, previously determined and stored for the section of the segment s2 is available in hardware, the segment s2 may be approximated using the predetermined and stored look-up table, non-linear approximation equation, and the like.

In other words, the activation function conversion program unit 3000 may be configured to independently program each of the segments s1, s2, s3, and s4. At this time, the activation function conversion program unit 3000 receives hardware configuration information of the PAFE unit 500. The activation function conversion program unit 3000 may be configured to independently determine an approximation method for each of the segments s1, s2, s3, and s4 based on hardware configuration information of the PAFE unit 500.

For example, the PAFE unit 500 may be configured to include circuitry supporting linear function operations. In this case, the activation function conversion program unit 3000 may program each of the segments s1, s2, s3, and s4 in the form of a linear function.

For example, the PAFE unit 500 may be configured to include circuitry supporting linear function and quadratic function operations. In this case, the activation function conversion program unit 3000 may program each of the segments s1, s2, s3, and s4 in the form of a linear function or a quadratic function.

For example, the PAFE unit 500 may be configured to include circuitry that supports linear function, quadratic function, and log function operations. In this case, the activation function conversion program unit 3000 may selectively program each of the segments s1, s2, s3, and s4 in the form of a linear function, a quadratic function, or a logarithmic function.

For example, the PAFE unit 500 may be configured to include circuitry that supports linear function, quadratic function, logarithmic function, and exponential function operations. In this case, the activation function conversion program unit 3000 may selectively program each of the segments s1, s2, s3, and s4 in the form of a linear function, a quadratic function, a logarithmic function, or an exponential function.

For example, if the PAFE unit 500 is configured to include circuitry configured to support at least one specific function operation, the activation function conversion program unit 3000 may program each of the segments s1, s2, s3, and s4 in the form of a corresponding specific function.

For example, the PAFE unit 500 may be configured to include at least one of a linear function calculation circuitry, a quadratic function calculation circuitry, a cubic function calculation circuitry, a logarithmic function calculation circuitry, an exponential function calculation circuitry, or a similar function calculation circuitry designed as hardware.

For example, the activation function conversion program unit 3000 may program the same activation function in different ways.

For example, the activation function conversion program unit 3000 may program a specific activation function only as a linear function.

For example, the activation function conversion program unit 3000 may program a specific activation function only as a quadratic function.

For example, the activation function conversion program unit 3000 may program a specific activation function only as a cubic function.

For example, the activation function conversion program unit 3000 may program a specific activation function only as a logarithmic function.

For example, the activation function conversion program unit 3000 may program a specific activation function only as an exponential function.

For example, the activation function conversion program unit 3000 may program each of a plurality of segments of a specific activation function as a corresponding approximation function.

For example, the activation function conversion program unit 3000 may program a plurality of segments of a specific activation function as a set of approximation functions with different functions.

FIGS. 4A-4D illustrate various cases of segmenting an activation function into a plurality of segments by an activation function programming method according to an example of the present disclosure.

Figure 4A:
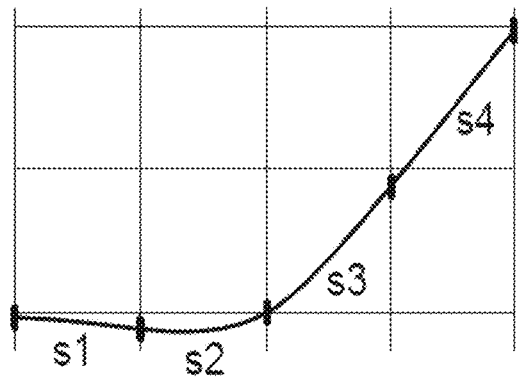
FIGS. 4A-4D are graphs illustrating various cases of segmenting an activation function into a plurality of segments according to an example of the present disclosure.

Referring to FIG. 4A, the PAF may be segmented to have a uniform width with a number of segments of four.

Figure 4B:
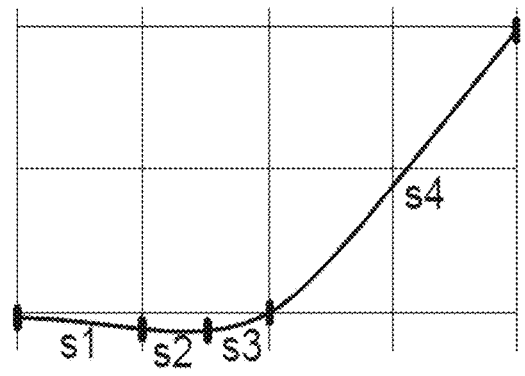

Referring to FIG. 4B, the PAF may be segmented to have four segments with different widths.

Figure 4C:
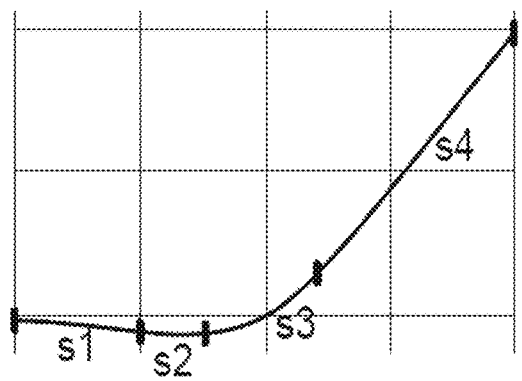

Referring to FIG. 4C, the PAF may be segmented to have four segments with different widths.

Figure 4D:
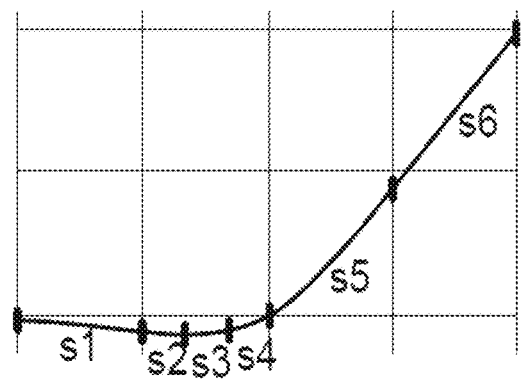

Referring to FIG. 4D, the PAF may be segmented to have six segments with different widths.

The number of segments and the width of each of the segments may be determined using segment data.

The activation function conversion program unit 3000 may be configured to segment a plurality of segments with different widths by analyzing non-linearity of the activation function. However, the present disclosure is not limited thereto.

The activation function conversion program unit 3000 may be configured to analyze the non-linearity of the activation function so that each of the plurality of segments is segmented with an optimal width. However, the present disclosure is not limited thereto.

In the present disclosure, the activation function may be implemented in various forms including characteristic sections. When the activation function is segmented into a plurality of segments, the number and width of the plurality of segments may be variously determined according to various shapes of the activation function.

For example, various activation functions, such as swish function, Mish function, sigmoid function, hyperbolic tangent (tanh) function, SELU function, gaussian error linear unit (GELU) function, SOFTPLUS function, ReLU function, Leaky ReLU function, Maxout function, ELU function, and the like, may have various shapes divided into a plurality of characteristic sections including a (substantially) linear section and/or a non-linear section. Accordingly, when approximating the non-linear activation function to be processable in hardware, segmenting in consideration of these characteristic sections, that is, if the number and width of segments are determined in consideration of the (substantial) linear section and the non-linear section, the activation function can be more efficiently approximated in response to the characteristics of each activation function.

Accordingly, in the method of approximating the activation function according to the present disclosure, the concept of segment data is proposed to segment the activation function in consideration of these characteristic sections of the activation function. Segment data may include discontinuity information of the activation function, derivative data, information on hardware in which the activation function is processed, and the like, and may include processed data thereof.

Hereinafter, a detailed process of segmenting the activation function into a plurality of segments using discontinuity information among segment data will be described with reference to FIGS. 5A-5C, 6A and 6B, and 7A and 7B.

Figure 5A:
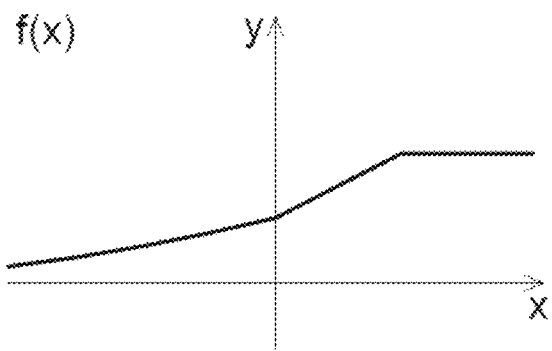
FIGS. 5A-5C are graphs illustrating segmentation of an activation function into a linear section and a non-linear section using slope change data among segment data according to an example of the present disclosure.
Figure 5B:
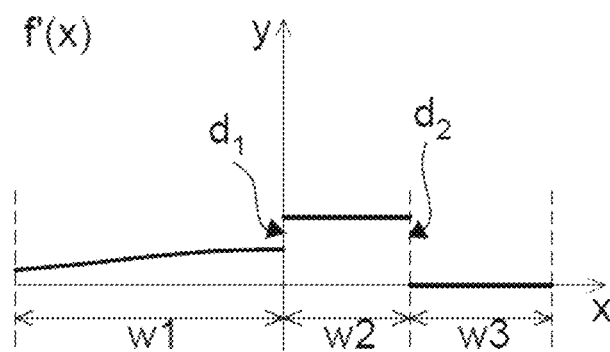
Figure 5C:
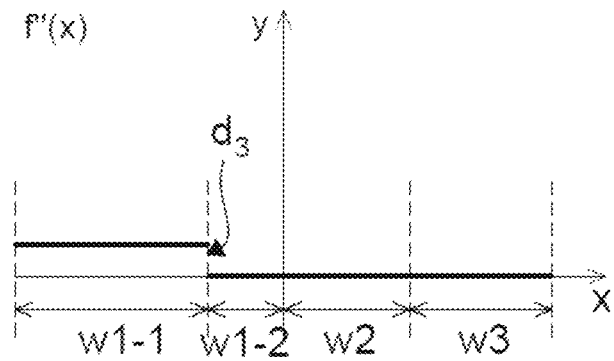

FIGS. 5A-5C illustrate an example of segmenting an activation function into a linear section or a non-linear section by using slope change data of segment data of the activation function programming method of the present disclosure.

The gradient change point of the activation function may mean a point where the gradient of the activation function changes. For example, the activation function conversion program unit 3000 may be configured to generate slope change data (e.g., differential data) for analyzing the gradient change point of the activation function. However, the slope change data of the present disclosure is not limited to differential data and may include similar data.

Slope change data according to examples of the present disclosure may include an nth differential value of an activation function, for example, a first derivative, a second derivative, a third derivative, and the like. Here, the slope change data may indicate a gradient change rate and a gradient change point related to an activation function.

Slope change data according to examples of the present disclosure may include an nth-order derivative value of the activation function, for example, a linear derivative value, a second-order derivative value, and a third-order derivative value. Here, the slope change data may indicate a gradient change rate and a gradient change point related to an activation function.

A process of searching for a gradient change point will be described below with reference to FIGS. 5A-5C.

Among the differential data for the activation function f(x) shown in FIG. 5A, the first derivative f(x) is shown in FIG. 5B. Also, among the differential data for the activation function f(x) shown in FIG. 5A, the second derivative f"(x) is shown in FIG. 5C.

For example, the activation function conversion program unit 3000 may be configured to extract a start point and an end point of a section in which the first derivative value does not change. As shown in FIG. 5B, the activation function conversion program unit 3000 generates slope change data corresponding to the first derivative value. Then, the activation function conversion program unit 3000 recognizes that there is no change in terms of first derivative values in each of the section w3 and the section w3 although the first derivative values are different from each other. Accordingly, the activation function conversion program unit 3000 may determine each of the section w2 and the section w3 as a linear section. That is, the slope change data corresponding to the first derivative value within the linear section does not change. However, since the first derivative values are different in each of the w2 and w3 sections, the slope change data corresponding to the first derivative values at the boundary between the w2 and w3 sections have discontinuous points d1 and d2. That is, since the slope change data corresponding to the first derivative at the boundary of each of the sections w2 and w3 is a discontinuous point, the boundary of each section w2 and w3 may correspond to a gradient change point.

In this case, the activation function conversion program unit 3000 may convert the linear section into a programmable parameter in the form of a corresponding linear function. Therefore, the linear section of the activation function to be programmed can be segmented into a linear function having a specific slope and a specific offset. The first derivative of the linear section may be a constant value. In other words, even if the linear section is approximated with a linear function, the approximation error value may be zero. Therefore, the activation function conversion program unit 3000 may determine that there is substantially no approximation error in each of the sections w2 and w3. That is, when the activation function conversion program unit 3000 approximates each of the sections w2 and w3 with a linear function, the calculation amount and power consumption of the PAFE unit 500 are minimized, and the approximation error value may also be zero.

The activation function conversion program unit 3000 may be configured to determine a section where the first derivative of the activation function is constant or nonzero as a section of quadratic function or higher term or a curve (non-linear function).

In the present disclosure, the term "linear section" in relation to differential data means a section in which the first derivative of an activation function is an integer or zero, or a section in which an activation function is expressed as a linear function, and the term "non-linear section" may mean a section in which the first derivative of the activation function is not an integer or zero. However, the determination of the linear section of the examples of the present disclosure is not determined only by the differential value. That is, the activation function conversion program unit 3000 may be configured to determine or classify a linear section in various ways by receiving an activation function.

The activation function conversion program unit 3000 may be configured to preferentially determine whether a linear section exists. The activation function conversion program unit 3000 may be configured to convert the linear section into a programmable parameter in the form of a linear function and convert the remaining non-linear section into a programmable parameter in the form of a specific function.

To elaborate, the differential data described in the examples of the present disclosure is merely one mathematical calculation method for calculating the slope of an activation function. Thus, the present disclosure is not limited to differential values, and it is possible to utilize substantially similar slope calculation methods.

The search for the gradient change point is not limited to the above method, and the activation function conversion program unit 3000 may be configured to determine a corresponding point as a gradient change point when a change in the first derivative of the activation function becomes greater than a specific threshold value along the X-axis.

Then, the activation function conversion program unit 3000 may be configured to extract the starting point and the ending point of a section in which the second derivative value does not change. As shown in FIG. 5C, the activation function conversion program unit 3000 generates slope change data corresponding to the second derivative. Then, the activation function conversion program unit 3000 determines that the second derivative values are different but not changing for the second derivative value in each of the sections w1-1 and w1-2. However, since the second derivative values are different in each of the w1-1 and w1-2 sections, the slope change data corresponding to the second derivative at the boundary between the w1-1 and w1-2 sections has a discontinuous point d3. That is, since the slope change data corresponding to the second derivative at the boundary between the section w1-1 and the section w1-2 is a discontinuous point d3, the boundary between the w1-1 section and the w1-2 section may correspond to the gradient change point.

In this case, the activation function conversion program unit 3000 may convert the non-linear section into a programmable parameter in the form of a corresponding quadratic function. Therefore, the non-linear section of the activation function to be programmed can be segmented into a quadratic function including coefficients of a quadratic term and coefficients of a linear function including a specific slope and a specific offset. The second derivative of the non-linear section may be a constant value. In other words, even if the non-linear section is approximated with a quadratic function, the approximation error value may be zero. Accordingly, the activation function conversion program unit 3000 may determine that there is substantially no approximation error in each of the sections w1-1 and w1-2. That is, when the activation function conversion program unit 3000 approximates each of the sections w1-1 and w1-2 with a quadratic function, the calculation amount and power consumption of the PAFE unit 500 are minimized, and the approximation error value may also be zero.

However, the examples of the present disclosure are not limited thereto, and it is possible that the sections w1-1 and w1-2 are approximated with a linear function. In this case, the approximation error value may increase, but power consumption of the NPU 1000 may be reduced by reducing the amount of calculation of the PAFE unit 500 of the NPU 1000. That is, the activation function conversion program unit 3000 may differently determine the programmable parameters according to different priorities among the calculation amount, the power consumption amount, and the approximation error value.

The above-described second derivative of the activation function may indicate a rate of change of the slope of the activation function. Since a section in which the second derivative of the activation function is relatively large is a section in which the rate of change of the slope is large, the segment of the activation function corresponding to such section has a large change in slope such that there is a significant increase or decrease. Conversely, since a section in which the second derivative of the activation function is relatively small is a section in which the change rate of the slope is small, the segment of the activation function corresponding to such section has a small change in slope such that there is a small increase or decrease.

In particular, a section in which the second derivative of the activation function is less than or equal to a specific threshold value is the section in which the rate of change of the slope is very small.

Accordingly, the activation function conversion program unit 3000 may be configured to determine the activation function of such section as a substantial linear function section in which the slope hardly changes.

For example, the activation function conversion program unit 3000 may be configured to determine a section in which the second derivative of the activation function is less than or equal to a threshold value is a "substantially linear section." The threshold for the second derivative of the activation function will be described later.

The differential order at which the differential value of the activation function becomes zero or an integer may represent the degree of change in the slope of the activation function. Specifically, in general, since the gradient of the function changes rapidly as the degree of the highest order term of the function increases, a section having a high degree of the highest order term of the activation function is a section having a steep slope change, and may be segmented to have a larger number of segments by distinguishing it from other sections.

The order of the highest order term of the activation function in a specific section may be determined through a differential order in which the differential value becomes zero or an integer in the specific section.

For example, in the case of an activation function in which the highest order term is third-order in a specific section, since the third-order derivative of the activation function becomes an integer (i.e., the coefficient of the highest order term) in a specific section and the fourth-order derivative of the activation function becomes zero, an activation function in which the third-order derivative is an integer or the fourth-order derivative is zero in a specific section may be determined to have the third-order of the highest order term in the specific section.

In various examples, a section in which the degree of the highest order term of the activation function is third-order or higher may be segmented to have a larger number of segments in distinction from other sections. For example, the number of segments may be determined as the maximum number of segmentable segments for the corresponding section in hardware in which the activation function is to be processed.

The gradient change point of the activation function may be identified using the slope change data (i.e., the first derivative f'(x)). Using the slope change data (i.e., the first derivative f'(x)), the activation function f(x) can be segmented into three sections w1, w2, and w3. including two linear sections w2 and w3.

That is, the activation function conversion program unit 3000 may determine and segment the linear sections w2 and w3 and the non-linear section w3 using slope change data of the activation function f(x) to be programmed.

That is, an activation function f(x) may be segmented according to points or sections where the first derivative f(x) is a constant (non-zero), zero, a curve below a threshold (non-linear function), or a curve (non-linear function). In other words, the activation function f(x) may be segmented according to a point where the activation function f(x) is not differentiable or a point where the first derivative f(x) is discontinuous.

Although the result of segmentation into three sections is shown in FIG. 5B, this is to briefly explain the process of segmenting into a linear section and a non-linear section, thus, it should be understood that the activation function f(x) may be segmented into four or more sections, that is, at least four segments, using the segment data.

For example, the linear section w1 may be further segmented into a plurality of sections using segment data according to the activation function programming method according to examples of the present disclosure. The activation function can be segmented into a larger number of segments and approximated by additional segmentation of the linear section w1, so that an approximation error can be reduced. In the present disclosure, the term "approximation error" means a difference between a specific segment of an activation function and a programmable segment that approximates the specific segment.

Figure 6A:
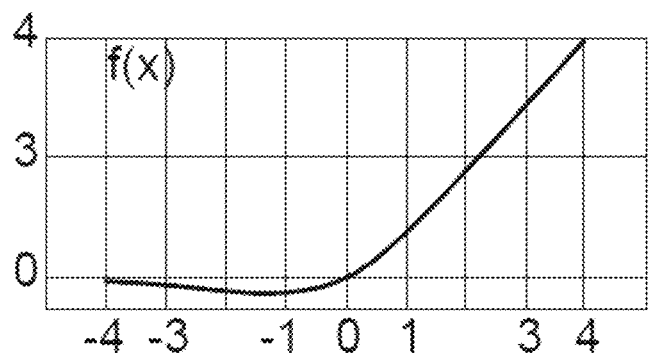
FIGS. 6A and 6B are graphs illustrating segmentation of an activation function into a substantially linear section and a non-linear section using slope change data among segment data according to an example of the present disclosure.
Figure 6B:

FIGS. 6A and 6B illustrate an example of segmenting an activation function into a substantially linear section and a non-linear section using slope change data among segment data in an activation function programming method of the present disclosure.

The absolute value of the second derivative f''(x) of the derivative data for the activation function f(x) shown in FIG. 6A is shown in FIG. 6B. The activation function conversion program unit 3000 may be configured to determine a substantially linear section by setting a specific threshold value to the second derivative f''(x). Referring to FIG. 6B, when the maximum value Max of the absolute value of the second derivative f''(x) of the activation function f(x) is 0.5, a threshold value Th may be set as 0.05, which is 10% of the maximum value Max. In other words, it can be determined such that the activation function has a linear characteristic as the second derivative f''(x) becomes smaller, and a non-linear characteristic as the second derivative f''(x) becomes larger.

That is, the threshold value Th may be determined as a relative ratio of the maximum value Max of the absolute value of the second derivative f''(x) of the activation function f(x). The threshold value Th of the substantially linear section may be determined based on whether an error occurring when approximating a non-linear section into a linear section, is acceptable. For example, the threshold value of the substantially linear section may be determined according to the level of the error value of each segment that determines the degree of deterioration of inference accuracy of the DNN to which PAF is applied.

In other words, as the threshold value of the substantially linear section increases, a segment of the linear section can be programmed more widely. Meanwhile, as the width of the segment increases, the number of segments may be reduced. That is, the total number and width of segments of the PAF may be different according to the threshold value of the substantially linear section.

The search for the substantially linear section may be performed after the search for the linear section. However, the present disclosure is not limited to the order of linear section search and substantial linear section search.

In the examples of FIG. 6B, the relative ratio may be determined to be 10%. However, the present disclosure is not limited thereto and may be determined as 5% of the maximum value Max according to the allowable error of the DNN. Using the differential data, that is, the second derivative f''(x), the activation function f(x) can be segmented by sections w1 and w3, in which the second derivative f''(x) is less than the threshold value Th of the substantially linear section, and the section w2, in which the second derivative f''(x) is greater than or equal to the threshold value Th of the substantially linear section. In the activation function f(x), a substantially linear sections w1 and w3 and a non-linear section w2 may be determined and segmented using the slope change data. When the first to third sections w1, w2, and w3 are determined, the first to third segments s1, s2, and s3 may be programmed as programmable segments using corresponding programmable parameters.

In FIG. 6B, the result of segmentation into three segments s1, s2, and s3 corresponding to the three sections w1, w2, and w3 is shown. This is to briefly explain the process of segmenting into a substantially linear section and a non-linear section. That is, it should be understood that the activation function f(x) can be segmented into four or more sections using the segment data.

For example, the non-linear section w2 may be further segmented into a plurality of sections using segment data according to an activation function programming method according to examples of the present disclosure. Approximation errors may be reduced by additional segmentation of the non-linear section w2.

Figure 7A:
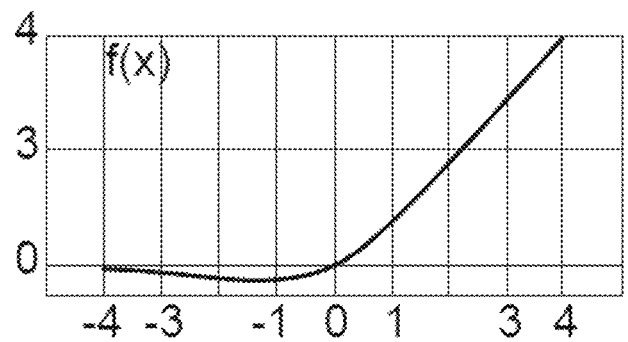
FIGS. 7A and 7B are graphs illustrating segmentation of an activation function into a substantially linear section and a non-linear section using slope change data among segment data according to another example of the present disclosure.
Figure 7B:

FIGS. 7A and 7B illustrate another example of segmenting an activation function into a substantially linear section and a non-linear section using slope change data among segment data in an activation function programming method of the present disclosure.

Here, in the activation function f(x), a non-linear section may be determined based on a threshold value Th of a substantially linear section of segment data, that is, an absolute value of a second derivative value f''(x). That is, a section equal to or greater than the threshold value Th of the substantially linear section may be determined as a non-linear section. Specifically, referring to FIG. 7B, the activation function conversion program unit 3000 may segment the activation function f(x) into a substantially linear section and a non-linear section using differential data, that is, a second derivative f''(x). Furthermore, the activation function conversion program unit 3000 may segment the non-linear section of the activation function f(x) into segments s2 and s3 corresponding to the two sections w2 and w3 as an example.

That is, the activation function conversion program unit 3000 may classify the substantially linear section w1 and w4 and the non-linear sections w2 and w3 using the slope change data of the activation function f(x), and then the non-linear sections w2 and w3 may be segmented.

The activation function conversion program unit 3000 may be configured to search for optimal programmable parameters corresponding to each segment in various ways. For example, the activation function conversion program unit 3000 may search for optimal programmable parameters capable of achieving specific performance among high-speed operation, low-power consumption, and suppression of deterioration of inference accuracy.

In FIG. 7B, segments s1, s2, s3, and s4 segmented into four sections w1, w2, w3, and w4 are shown. This is to briefly explain the process of segmenting into a substantially linear section and a non-linear section. Accordingly, it should be understood that the activation function f(x) may be segmented into five or more sections using segment data.

For example, the non-linear sections w2 and w3 may be further segmented into a plurality of sections using segment data according to an activation function programming method according to an example of the present disclosure. Specifically, the non-linear sections w2 and w3 may be segmented based on the maximum value Max of the second derivative f''(x). That is, a region from the threshold value Th of the substantially linear section to the maximum value Max of the second-order derivative f''(x) is segmented into a section w2. Further, the threshold value Th of the substantially linear section from the maximum value Max of the second derivative value f"(x) is segmented into a section w3.

An approximation error may be further reduced when additional segmentation is performed in the non-linear sections w2 and w3.

Figure 8A:
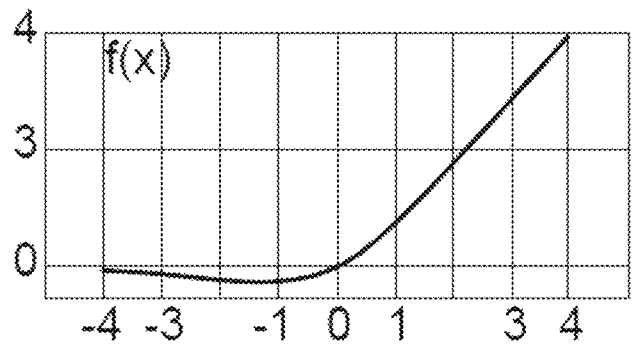
FIGS. 8A and 8B are graphs illustrating segmentation of an activation function into a substantially linear section and a non-linear section using slope change data among segment data according to another example of the present disclosure.
Figure 8B:
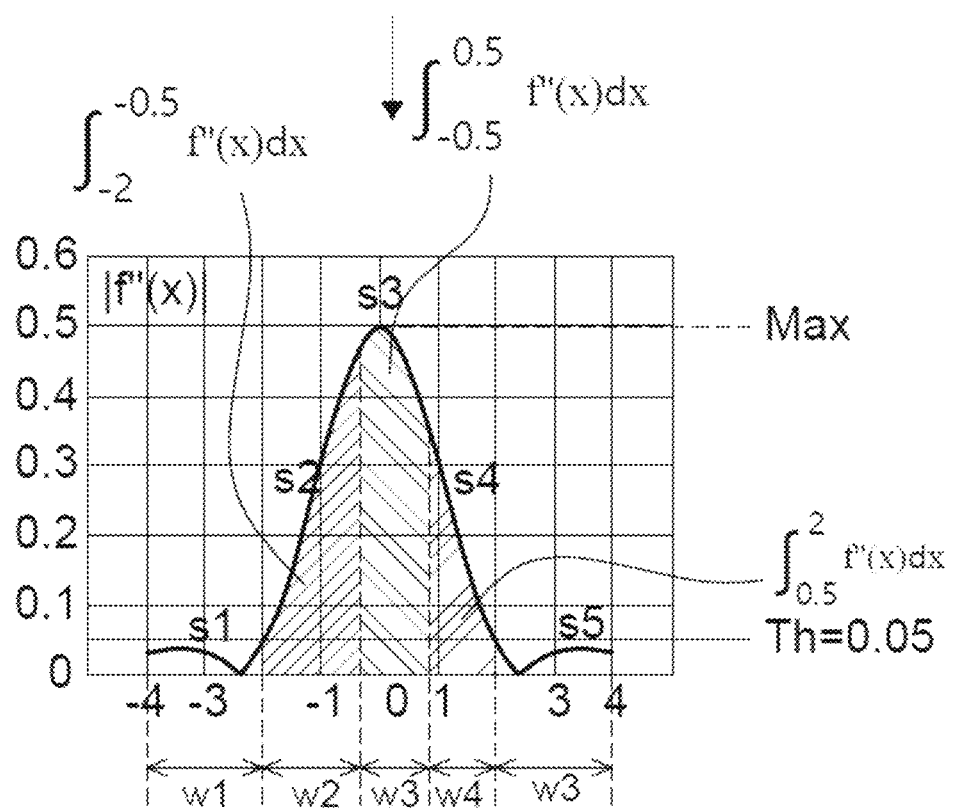

FIGS. 8A and 8B illustrate another example of segmenting an activation function into non-linear sections by using slope change data among segment data in an activation function programming method of the present disclosure.

In the activation function f(x), a non-linear section may be determined based on a threshold value Th of a substantially linear section of segment data, that is, an absolute value of a second derivative value f"(x). That is, a region equal to or greater than the threshold value Th of the substantially linear section may be determined as a non-linear section. Specifically, referring to FIG. 8B, the activation function conversion program unit 3000 may segment the activation function f(x) into a substantially linear section and a non-linear section using differential data, that is, a second derivative f"(x). Furthermore, the activation function conversion program unit 3000 may segment, for example, the non-linear section of the activation function f(x) into segments s2, s3, and s4 corresponding to the three sections w2, w3, and w4.

The activation function conversion program unit 3000 may classify substantially linear sections w1 and w5 and non-linear sections w2, w3, and w4, then segment the non-linear sections w2, w3, and w4 using the slope change data of the activation function f(x).

However, the example of the present disclosure is not limited to the substantially linear section, and the substantially linear section may also be segmented into non-linear sections. That is, the step of determining the substantially linear section may not be performed in some cases.

The activation function conversion program unit 3000 may be configured to search for preferred programmable parameters corresponding to each segment in various ways. For example, the activation function conversion program unit 3000 may search for optimal programmable parameters capable of achieving specific performance among high-speed operation, low-power consumption, and suppression of deterioration of inference accuracy.

In FIG. 8B, segments s1, s2, s3, s4, and s5 segmented into five sections w1, w2, w3, w4, and w5 are shown. This is to briefly explain the process of segmenting into a substantially linear section and a non-linear section. Accordingly, it should be understood that the activation function f(x) may be segmented into using segment data. However, the example of the present disclosure is not limited to the substantially linear section, and the substantially linear section may also be segmented into non-linear sections.

For example, the non-linear sections w2, w3, and w4 may be further segmented into a plurality of sections using segment data according to the activation function programming method according to an example of the present disclosure.

Specifically, the non-linear sections w2, w3, and w4 may be segmented based on the integral value ($\int f"(x)dx$) of the second derivative f"(x). In other words, the activation function conversion program unit 3000 may segment the non-linear sections based on the integral value of the slope change data.

When the value of the integral ($\int f"(x)dx$) of the second derivative f"(x) is high, an approximation error value between the PAF and the activation function may increase. That is, when the value of the integral ($\int f"(x)dx$) of the second derivative value f"(x) is high, an error may occur, resulting in deterioration of inference accuracy. On the other hand, as the value of the integral ($\int f"(x)dx$) of the second-order derivative f"(x) increases, the width of the segment may widen. Conversely, the smaller the value of the integral (f f"(x)dx) of the second derivative f"(x), the narrower the width of the segment may be.

Accordingly, the activation function conversion program unit 3000 may set an integral value ($\int f"(x)dx$) of the specific second derivative f"(x) as the integral threshold value of the segment approximation error. For example, the activation function conversion program unit 3000 may integrate the second derivative f"(x) from the end of the section w1. Accordingly, the section w2 may be from the end of the section w1 until the preset integration threshold of the segment approximation error reaches a specific value.

More specifically, in the section w2, the integral $$\left( \int_{-2}^{-0.5} f"(x)dx \right)$$

of the second derivative f"(x) may be segmented into s2 to correspond to the integral threshold value of the segment approximation error. Further, in the section w3, the integral $$\left( \int_{-0.5}^{-0.5} f"(x)dx \right)$$

of the second derivative f"(x) may be segmented into s3 to correspond to the integral threshold value of the segment approximation error. Further, in the section w4, the integral $$\left( \int_{0.5}^{2} f"(x)dx \right)$$

of the second derivative f"(x) may be segmented into s4 to correspond to the integral threshold value of the segment approximation error.

That is, all of the integral value $$\left( \int_{-2}^{-0.5} f"(x)dx \right)$$

of the second derivative f"(x) in the section w2, the integral value $$\left( \int_{-0.5}^{0.5} f"(x)dx \right)$$

of the second derivative f"(x) in the section w3, and the integral value $$\left( \int_{0.5}^{2} f"(x)dx \right)$$

of the second derivative f"(x) in the section w4 may be the same value as the integral threshold value of the segment approximation error.

However, the integral threshold of the segment approximation error can be affected by hardware data including at least one of the number of comparators of the PAFE unit 500 of the NPU 1000, the number of gates used to implement circuits of the PAFE unit 500, and the types of implemented arithmetic circuits (linear function circuit, quadratic function circuit, cubic function circuit, exponential circuit, logarithmic circuit, antilog circuit, and the like). That is, the activation function conversion program unit 3000 may be configured to determine an integral threshold value of segment approximation error in consideration of the hardware data.

That is, the smaller the integral threshold value of the segment approximation error, the closer the PAF can be to the activation function. In other words, when the integral threshold value of the segment approximation error decreases, the number of programmable segments increases, and thus the approximation error value of the PAF can be further reduced.

However, since the number of programmable segments is limited by hardware data, there is a limit to reducing the integral threshold value of the segment approximation error. That is, the lowest limit of the integral threshold value of the segment approximation error may be determined according to the hardware data.

Approximation errors can be further reduced when additional segmenting is performed in the aforementioned non-linear sections w2, w3, and w4. However, the example of the present disclosure is not limited to the substantially linear section, and the substantially linear section may also be segmented into non-linear sections. That is, the step of determining the substantially linear section may not be performed in some cases.

As shown in FIGS. 5A-5C, 6A and 6B, 7A and 7B, and 8A and 8B, the activation function conversion program unit 3000 may determine a linear section from the activation function before approximating the activation function by segmenting the activation function using the slope change data. When the activation function conversion program unit 3000 segments the activation function using the slope change data, it may determine a non-linear section from the activation function before approximating the activation function. When the activation function conversion program unit 3000 segments the activation function using the slope change data, it may determine a substantially linear section from the activation function before approximating the activation function.

A segment with a distinct linear section or substantially linear section can be approximated as a programmable segment expressed in the form of (slope a)*(input value x)+(offset b).

At this time, a segment with a linear section or substantially linear section is in the form of a linear function or substantially linear function with a substantially constant slope. Therefore, comparing the activation function with a programmable segment expressed as a slope and an offset, the programmed segment has no approximation error or can be minimized.

Therefore, if the activation function is programmed using the slope change data, the amount of calculation and power consumption for the linear section or the substantially linear section can be greatly reduced.

Therefore, the activation function programmed with a linear or substantially linear section according to the examples of the present disclosure is efficient and the approximation error is minimized, and thus it is possible to provide an improvement in the operation speed of DNN processed in the NPU 1000, a minimization of deterioration in inference accuracy, and a reduction in power consumption of the NPU 1000.

In various examples, the step S210 may include determining a linear section of the activation function based on the slope change data of the activation function.

In various examples, the step S210 may include determining a non-linear section of the activation function based on the slope change data of the activation function.

In various examples, the step S210 may include determining a substantially linear section of the activation function based on the slope change data of the activation function.

In various examples, the step S210 may include determining a linear section and a non-linear section of the activation function based on the slope change data of the activation function.

In various examples, the step S210 may include determining a substantially linear section and a non-linear section of the activation function based on the slope change data of the activation function.

In various examples, the step S210 may include determining a linear section, a substantially linear section, and a non-linear section of the activation function based on the differential data of the activation function.

However, the examples of the present time are not limited to the differential data of the activation function, and it is also possible to perform various mathematical analyzes capable of analyzing the slope change and linearity of the activation function.

In various examples, segment data may include information of hardware on which an activation function is processed. In the activation function programming method according to examples of the present disclosure, an activation function may be segmented using hardware information. The hardware data may include at least one of the number of comparators of the PAFE unit 500 of the NPU 1000, the number of gates used to implement circuits of the PAFE unit 500, and the types of implemented arithmetic circuits (linear function circuit, quadratic function circuit, cubic function circuit, exponential circuit, logarithmic circuit, antilog circuit, and the like).

For example, the number of segments for segmenting the activation function may be limited according to the number of comparators of the PAFE unit 500 of the NPU 1000. Accordingly, the activation function may be segmented into the maximum number of segments that can be processed by the NPU 1000 to be processed or the number of segments corresponding to the allocated resources of the NPU 1000. Accordingly, the activation function conversion program unit 3000 can program the activation function using predetermined hardware resources more efficiently or in a more customized manner.

In various examples, the step 220 may include approximating at least one of the plurality of segments to a programmable segment based on the gradient change point.

In various examples, the step 220 may include approximating at least one of the plurality of segments to a programmable segment based on the error value.

In the present disclosure, the term "error value" or "approximation error value" means the difference between a specific segment of an activation function and a programmable segment to which the specific segment is approximated. The approximation error value may include an average value, a minimum value, a maximum value, and an accumulated value. In other words, the activation function conversion program unit 3000 may be configured to calculate an average error value, a minimum error value, a maximum error value, an accumulated error value, and the like between a specific segment and an approximated programmable segment. The cumulative error value may be a value obtained by integrating error values between a specific segment and an approximated programmable segment.

Regarding the error value, the various activation functions can be divided into a plurality of characteristic sections including (substantially) linear sections and/or non-linear sections, and if these characteristic sections are segmented into segments of the same width, the error value for each segment varies significantly. Accordingly, in the activation function programming method according to examples of the present disclosure, in order to reduce an approximation error, at least one feature of these characteristic sections may be considered and approximated into programmable segments.

In various examples, the step S220 may include calculating an error value by comparing the gradient and offset of the programmable segment with a corresponding segment of the activation function.

In various examples, the step S220 may include determining a programmable parameter for converting at least one segment of an activation function into the programmable segment. In other words, the step S220 may include searching for optimal programmable parameters for converting at least one segment of the activation function into a programmable segment. Here, when the programmable segment is a linear function, the programmable parameters may include a gradient and an offset corresponding to the linear function. Here, when the programmable segment is a quadratic function, the programmable parameter may include coefficients of the quadratic term corresponding to the quadratic function. Coefficients of a quadratic function may include quadratic coefficients, linear coefficients, and constants. An approximation function of the programmable parameter may be determined in consideration of performance such as high-speed operation, low power consumption, and suppression of deterioration of inference accuracy. For example, as the formula of the approximation function becomes more complicated, the calculation speed may decrease and power consumption may increase. As the approximation error decreases, deterioration in inference accuracy may be reduced.

In various examples, the step S220 may include calculating an error value between at least one segment of the activation function and at least one candidate segment having a (temporary) gradient and a (temporary) offset. As the number of candidate segments increases, the possibility of searching for an optimal programmable parameter value increases, but the search time may increase.

In various examples, the step S220 may include determining a parameter of the at least one candidate segment as a programmable parameter of the programmable segment based on the calculated error values.

Accordingly, the activation function conversion program unit 3000 may provide programmed activation function data to the NPU 1000. Here, the programmed activation function data may include at least one programmed activation function. Here, the programmed activation function data may include programmable parameters corresponding to each programmable segment of at least one programmed activation function.

Hereinafter, a process of approximating at least one segment among a plurality of segments to a programmable segment based on an error value will be described in detail with reference to FIGS. 9, 10A and 10B, and 11A and 11B.

In the process of programming an activation function, a step may appear at a boundary between programmable segments. In the activation function programming method according to examples of the present disclosure, an approximation error can be greatly reduced by generating a predetermined step between programmable segments or at the start and/or end of one programmable segment.

Accordingly, in the present disclosure, an error value can be significantly reduced by allowing a step between programmable segments in the process of segmenting the activation function into a plurality of segments using segment data and approximating at least one segment among the plurality of segments to a programmable segment based on an error value.

Figure 9:
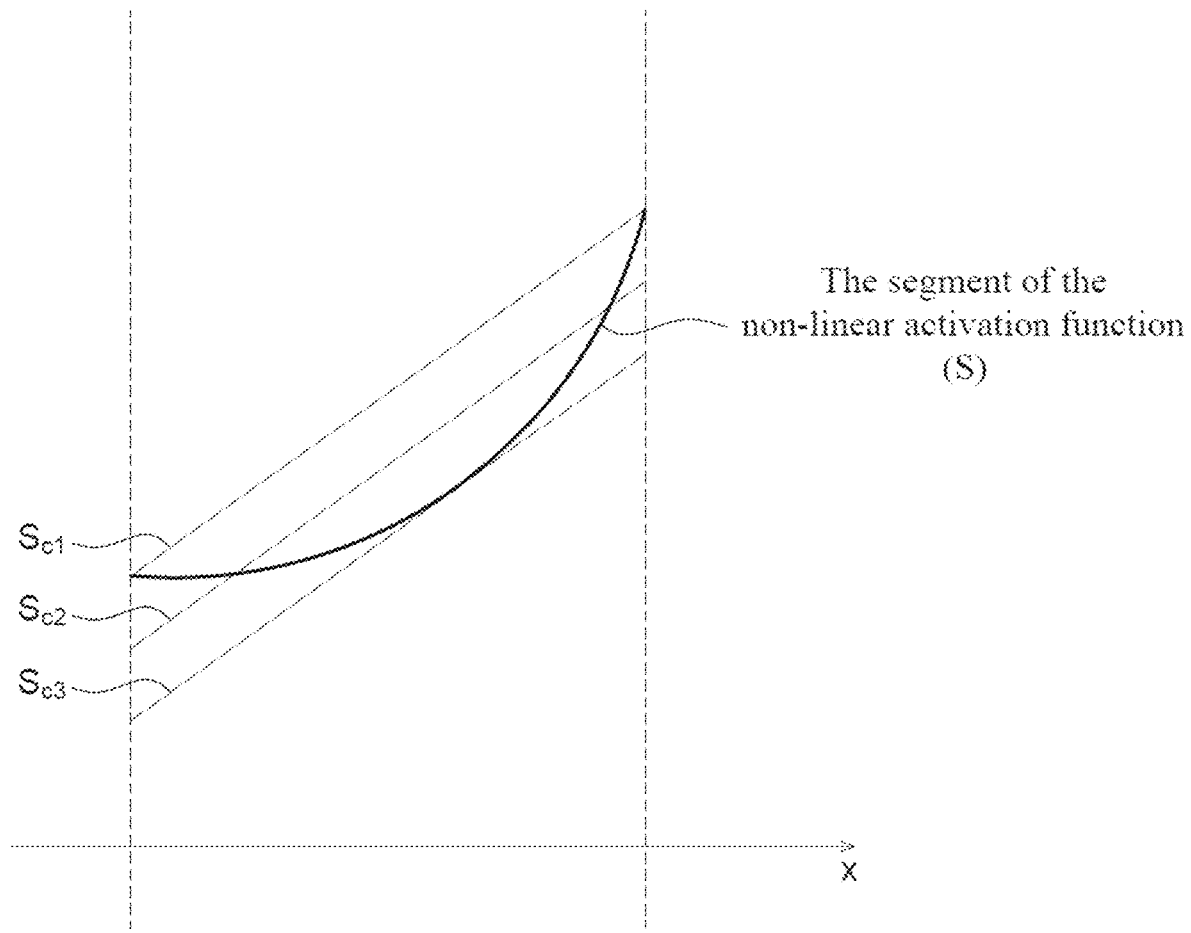
FIG. 9 is a graph illustrating conversion of one segment into one programmable segment using an error value according to an example of the present disclosure.

Referring to FIG. 9, a plurality of candidate segments Sc1, Sc2, and Sc3 for the segment s of the non-linear activation function are shown.

In examples of the present disclosure, the term "candidate segment" means a function that can become a programmable segment expressed by a "programmable parameter" using an activation function programming method.

For example, when the programmable segment is expressed as a linear function, the programmable segment may be expressed as (gradient a)*(input value x)+(offset b). Here, programmable parameters include gradient a and offset b.

For example, when the programmable segment is expressed as a quadratic function, the programmable segment can be expressed as (quadratic coefficient a)*(input value x2)+(linear coefficient b)*(input value x)+(constant c). Here, the programmable parameters include a quadratic coefficient a, a linear coefficient b, and a constant c.

Accordingly, the programmable parameter may be configured to have a form capable of expressing both a first-order function and a second-order function. However, the present disclosure is not limited to the format of programmable parameters.

Hereinafter, a linear function will be described as an example. The candidate segment may be in the form of a linear function corresponding to a programmable segment segmented using segment data. Candidate segments for one segment may be determined by a linear function passing through the start and end points of one segment.

For example, a candidate segment for a segment may be a linear function having an offset adjusted while having the same gradient as a linear function passing through the start and end points of the segment.

For example, the candidate segment for a segment may be a linear function having an offset adjusted while having a different gradient from a linear function passing through the start and end points of one segment.

For example, a candidate segment for a segment may be determined as one of the tangents of the segment.

In FIG. 9, to briefly describe a process of determining a programmable segment among a plurality of candidate segments, three candidate segments having a common gradient passing through the start and end points of the segment s are shown. The first candidate segment Sc1 is a linear function passing through the start and end points of the segment s, the second candidate segment Sc2 and the third candidate segment Sc3 are linear functions of which offsets are adjusted while having a common slope with the first candidate segment Sc1, and the third candidate segment Sc3 has an offset such that the candidate segment Sc3 is tangent to the segment s. The candidate segments shown in FIG. 9 are for briefly describing segments that can become approximated programmable segments, and the gradient and/or offset of actual candidate segments can be adjusted in various ways to reduce an error value.

In various examples, at least one segment among a plurality of segments may be approximated as a programmable segment by searching for an error value Δy. At this time, the activation function conversion program unit 3000 may determine the width of each of the plurality of segments as a uniform width. Subsequently, the activation function conversion program unit 3000 may approximate at least one segment among a plurality of segments to a programmable segment by searching for an error value Δy of at least one segment. However, the present disclosure is not limited thereto.

Figure 10A:
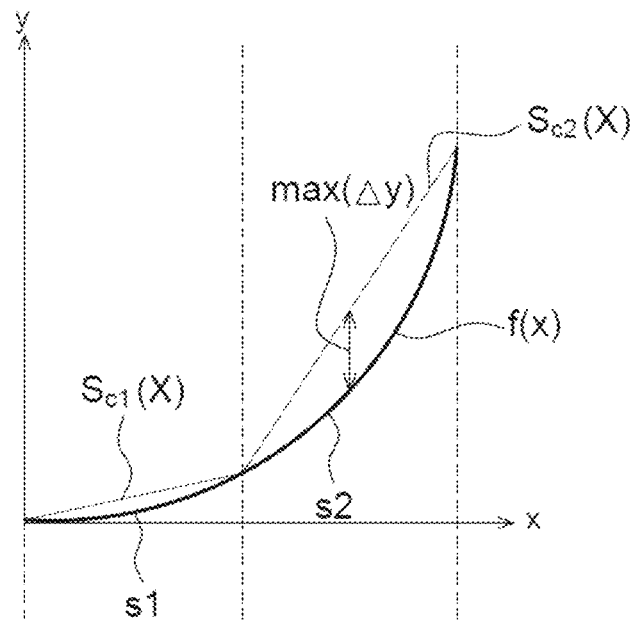
FIGS. 10A and 10B are graphs illustrating conversion of one segment into one programmable segment using a maximum error value according to an example of the present disclosure.
Figure 10B:
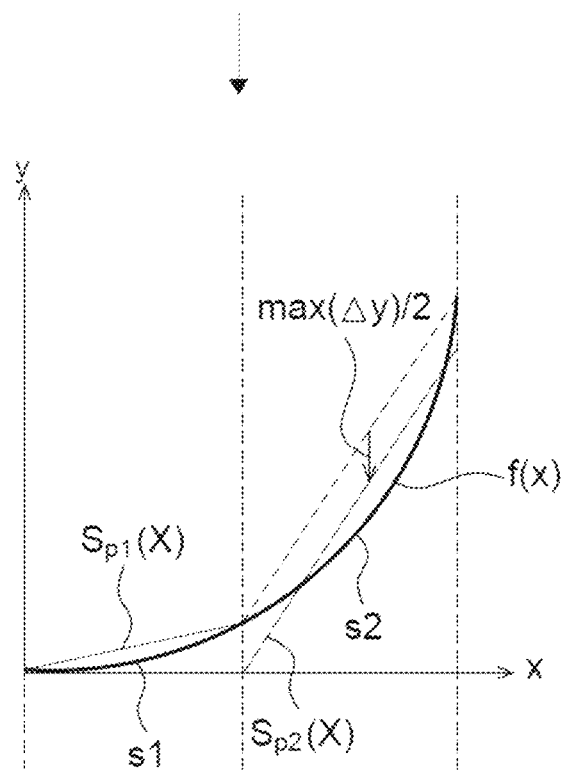

FIGS. 10A and 10B illustrate an example of approximating a segment to a programmable segment by searching for a maximum error value max(Δy), which is the largest value among error values Δy, in an activation function programming method of the present disclosure.

FIG. 10A shows segments s1 and s2 segmenting the activation function f(x), a first candidate segment sc1(x) corresponding to the first segment s1, and a second candidate segment sc2(x) corresponding to the second segment s2. In FIG. 10A, each of the candidate segments sc1(x) and sc2(x) searches for optimal programmable parameters (i.e., gradient and offset) representing each linear function passing through the start and end points of each of the segments s1 and s2.

As in an example shown in FIG. 10A, the activation function conversion program unit 3000 may calculate an error value Δy between the second segment s2 and the second candidate segment sc2(x), that is, the absolute value of f(x)−sc2(x), or |f(x)−sc2(x)|. The activation function conversion program unit 3000 may calculate a maximum error value max(Δy), which is the largest value among the error values Δy. In order to reduce the maximum error value max(Δy) of the second segment s2, as shown in FIG. 10B, the second candidate segment obtained by adjusting the candidate segment sc2(x) in the Y-axis direction (i.e., adjusting the offset) by max(Δy)/2, which is half of the maximum error value max(Δy), may be determined as the second programmable segment sp2(x) obtained by approximating the second segment s2.

When the first programmable segment sp1(x) obtained by approximating the first segment s1 is shown as in FIG. 10B, a step may appear between the first programmable segment sp1(x) and the second programmable segment sp2(x).

In FIG. 10B, such step at the junction of adjacent programmable segments in the Y-axis may be intentionally induced in the process of approximating the second segment s2 of the activation function f(x) to a programmable segment based on the error value |f(x)−sc2(x)|. That is, in the process of approximating a specific programmable segment to reduce the maximum error value within the specific programmable segment, a step may be generated at a point of boundary between adjacent programmable segments.

In other words, each programmable segment may be approximated independently of each other.

In other words, as the approximation error value of the PAF increases, deterioration of inference accuracy of the NPU 1000 using the PAF may increase. Conversely, as the approximation error value of the PAF decreases, deterioration in inference accuracy of the NPU 1000 using the PAF may decrease.

In various examples, at least one segment among the plurality of segments may be approximated as a programmable segment using an integral value ∫[sc(x)−f(x)]dx of the error value. The activation function conversion program unit 3000 may be configured to integrate or accumulate approximation error values of each segment.

In more detail, the first programmable segment sp1(x) and the second programmable segment sp2(x) may be programmed in different ways. That is, each programmable segment can be programmed by selecting a method such as a linear function, a quadratic function, a logarithmic function, an exponential function, and the like, respectively. Thus, each programmable segment can be programmed with the same function or can be programmed with a different function.

Figure 11A:
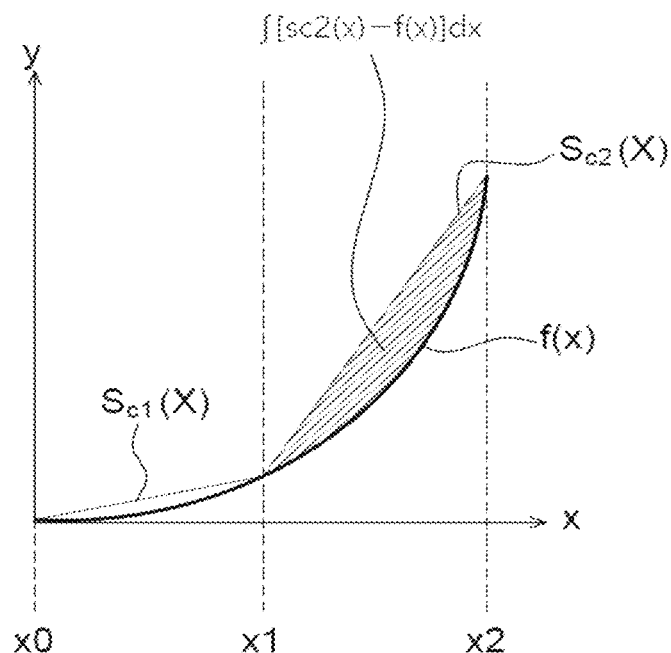
FIGS. 11A and 11B are graphs illustrating conversion of one segment into one programmable segment using an integral value for an error value according to an example of the present disclosure.
Figure 11B:
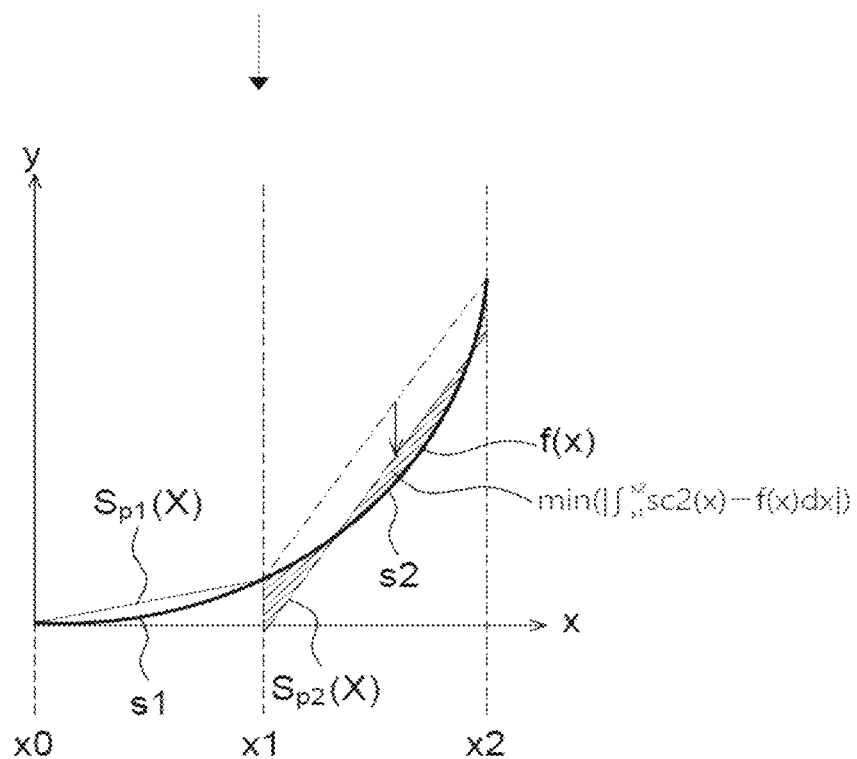

FIGS. 11A and 11B illustrate an example of approximating one segment to a programmable segment using an integral value ∫[sc(x)−f(x)]dx with respect to an error value in the activation function programming method of the present disclosure.

FIG. 11A shows segments s1 and s2 segmenting the activation function f(x), a first candidate segment sc1(x) corresponding to the first segment s1, and a second candidate segment sc2(x) corresponding to the second segment s2. In FIG. 11A, for each of the candidate segments sc1(x) and sc2(x), an optimal programmable parameter (i.e., gradient and offset) expressing a linear function is searched for the start and end points of each of the segments s1 and s2. Actually, the offset of the second candidate segment sc2(x) may be adjusted while having the same gradient as a linear function passing through the start and end points of the second segment s2. Alternatively, the offset may be adjusted while having a gradient different from that of the linear function passing through the start and end points of the second segment s2.

Referring to FIGS. 10A and 10B and 11A and 11B, the first segment s1 includes a start point x0 and an end point x1. Here, the start point x0 and the end point x1 may mean segment boundary values.

Referring to FIGS. 10A and 10B and 11A and 11B, the second segment s2 includes a start point x1 and an end point x2. Here, the start point x0 and the ending point x1 may mean segment boundary values.

For example, the first segment s1 may be set from a start point x0 to less than an end point x1.

For example, the second segment s2 may be set from a start point x1 to less than an end point x2.

Programmable parameters may be configured to include segment boundary values.

As shown in FIG. 11A, the activation function conversion program unit 3000 calculates an integral value $$\left(\int_{x1}^{x2} s_{c2}(x) - f(x)dx\right)$$

between the second segment s2 and the candidate segment sc1(x) as an approximation error value, and searches for a candidate segment having the smallest absolute value of the integral value $$\left(\int_{x1}^{x2} s_{c2}(x) - f(x)dx\right)$$

among the integral values $$\left(\int_{x1}^{x2} s_{c2}(x) - f(x)dx\right).$$

As shown in FIG. 11B, in order to reduce the error value, a candidate segment having the smallest absolute value of the integral value $$\left(\left|\int_{x1}^{x2} s_{c2}(x) - f(x)dx\right|\right),$$

that is, $$\min\left(\left|\int_{x1}^{x2} s_{c2}(x) - f(x)dx\right|\right),$$

may be determined as the second programmable segment sp2(x).

When the first programmable segment sp1(x) approximating the first segment s1 is shown in FIG. 11B, a predetermined step may appear in the Y-axis between the first programmable segment sp1(x) and the second programmable segment sp2(x). In FIG. 11B, such step may occur in the process of approximating the second segment s2 of the activation function f(x) to the second programmable segment sp2(x) based on the approximation error value $$\int_{x1}^{x2} s_{c2}(x) - f(x)dx.$$

However, deterioration of inference accuracy of the NPU 1000 using the PAF can be reduced if the approximation error value of each programmable segment is minimized even if a step exists.

In various examples, the step S220 may include searching for a minimum approximation error value between the programmable segment and the corresponding segment of the activation function. The approximation error value may be at least one of an average error value, a minimum error value, a maximum error value, and an accumulated error value.

For example, the step S220 may include searching for at least one minimum error value between at least one programmable segment and a corresponding segment of at least one activation function.

For example, the step S220 may include determining the slope and offset of the programmable segment based on the at least one minimum error value searched.

For example, the step S220 may approximating the at least one segment to the programmable segment according to the determined gradient and offset.

In various examples, the step S220 may include determining the programmable segment using machine learning using a loss function.

Figure 12:
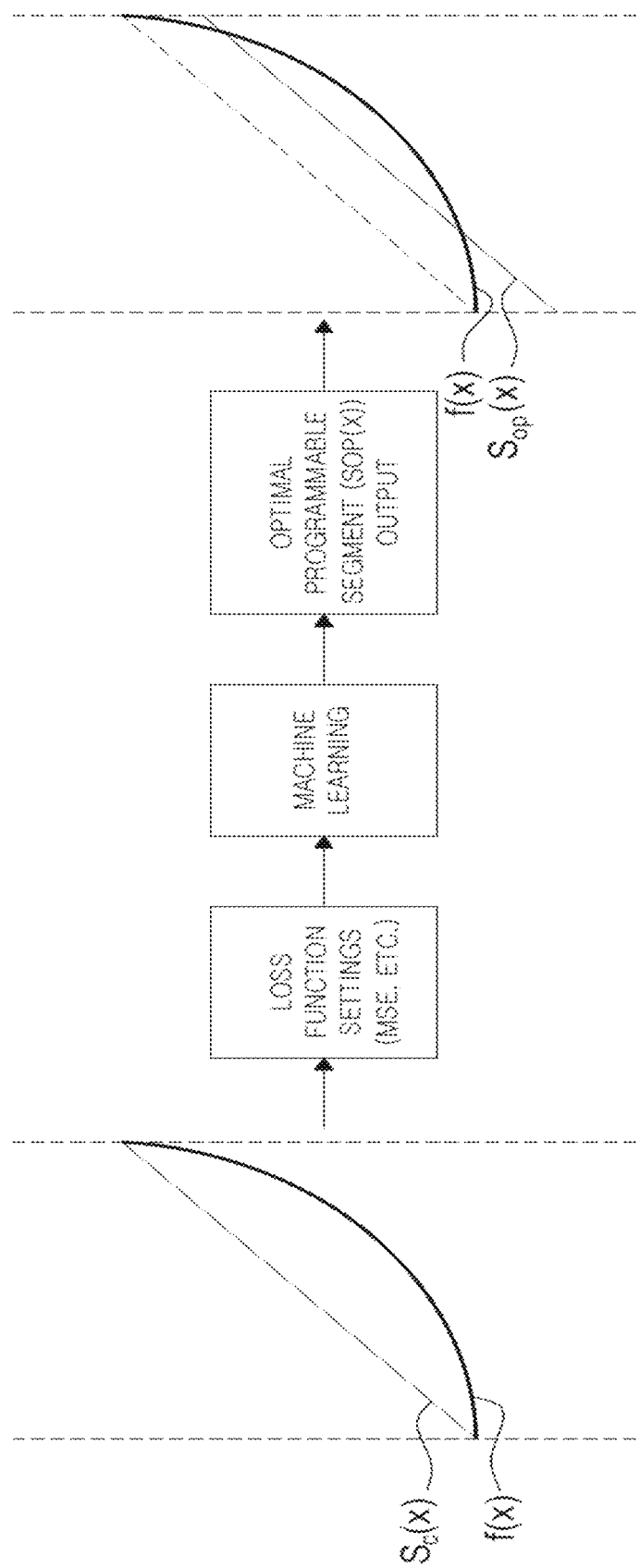
FIG. 12 is a graph illustrating approximation of one segment to one optimal programmable segment using machine learning according to an example of the present disclosure.

FIG. 12 illustrates an example of approximating one segment to an optimal programmable segment using machine learning in an activation function programming method of the present disclosure.

Referring to FIG. 12, the activation function conversion program unit 3000 may set a candidate segment sc(x) for the activation function f(x) as an initial value of the loss function. The activation function conversion program unit 3000 may determine a candidate segment having the smallest value of the loss function as an optimal programmable segment sop(x) through machine learning. Accordingly, an optimized programmable parameter may be explored.

For optimized parameter search, learning may be repeatedly performed. One-time learning may mean one epoch. As the number of times of learning increases, the error value may be reduced. If the number of trainings is too small, it can lead to under-fitting. Too many training times can lead to over-fitting.

As the loss function, mean squared error (MSE), root mean squared error (RMSE), and the like may be used, but is not limited thereto. In the present disclosure, a candidate segment used as an initial value for a loss function may be, for example, a linear function, a quadratic function, a cubic function, or the like approximated to correspond to segmented segments using segment data. However, examples according to the present disclosure are not limited to the above functions. That is, the loss function may be used after the activation function f(x) is segmented into a plurality of segments using segment data.

Accordingly, machine-learning using the loss function may be performed after considering characteristics of the activation function thereof, such as a plurality of characteristic sections including a (substantial) linear section and/or a non-linear section of the activation function, an approximation error, and the like. Therefore, the calculation amount and search time of the optimized programmable parameter search can be reduced, and deterioration in inference accuracy of the NPU 1000 due to the use of PAF can be minimized.

In addition, according to examples of the present disclosure, an effect of reducing the number of unnecessary segments may be provided. That is, according to examples of the present disclosure, it is also possible to minimize the number of segments. In other words, if the sum of approximation error values of two adjacent programmable segments is less than a preset threshold value, the two programmable segments may be integrated into one programmable segment.

In various examples, the step S210 may include segmenting the activation function into a plurality of segments using an integral (accumulated value) of the second derivative of the activation function. Here, the accumulated value of the second derivative may be used as segment data.

For example, the step S210 may include calculating an accumulated value of the second derivative of the activation function.

For example, the step S210 may include segmenting the activation function into a plurality of segments based on the integral threshold of the segment approximation error (i.e., the threshold of the accumulated second derivative).

Furthermore, the activation function programming method according to the present disclosure may include a step of firstly adjusting the threshold of the accumulated value of the second derivative when the number of the plurality of segments determined by segmenting the activation function into a plurality of segments using a comparing of the accumulated value of the second derivative to a target number, and re-segmenting the activation function into another number of plurality of segments based on the adjusted threshold. Specifically, it can be adjusted such that: (1) when the number of the determined plurality of segments is greater than the target number, the threshold is adjusted to increase, and (2) when the determined number of the plurality of segments is less than the target number, the threshold is adjusted to decrease.

In various examples, the activation function conversion program unit 3000 may segment the activation function into a plurality of segments based on a threshold value of the accumulated value of the second derivative. In this case, the activation function conversion program unit 3000 may segment all sections of the activation function based on the threshold value of the accumulated value of the second derivative or a portion of sections of the activation function based on the threshold value of the accumulated value of the second derivative. In particular, the activation function conversion program unit 3000 may determine that some section of the activation function as a non-linear section rather than a (substantially) linear section, and may segment only a partial section that is a non-linear section based on a threshold value of the accumulated value of the second derivative value. The activation function conversion program unit 3000 may segment the remaining sections that are not non-linear sections by the activation function programming method described in various examples of the present disclosure.

Figure 13:
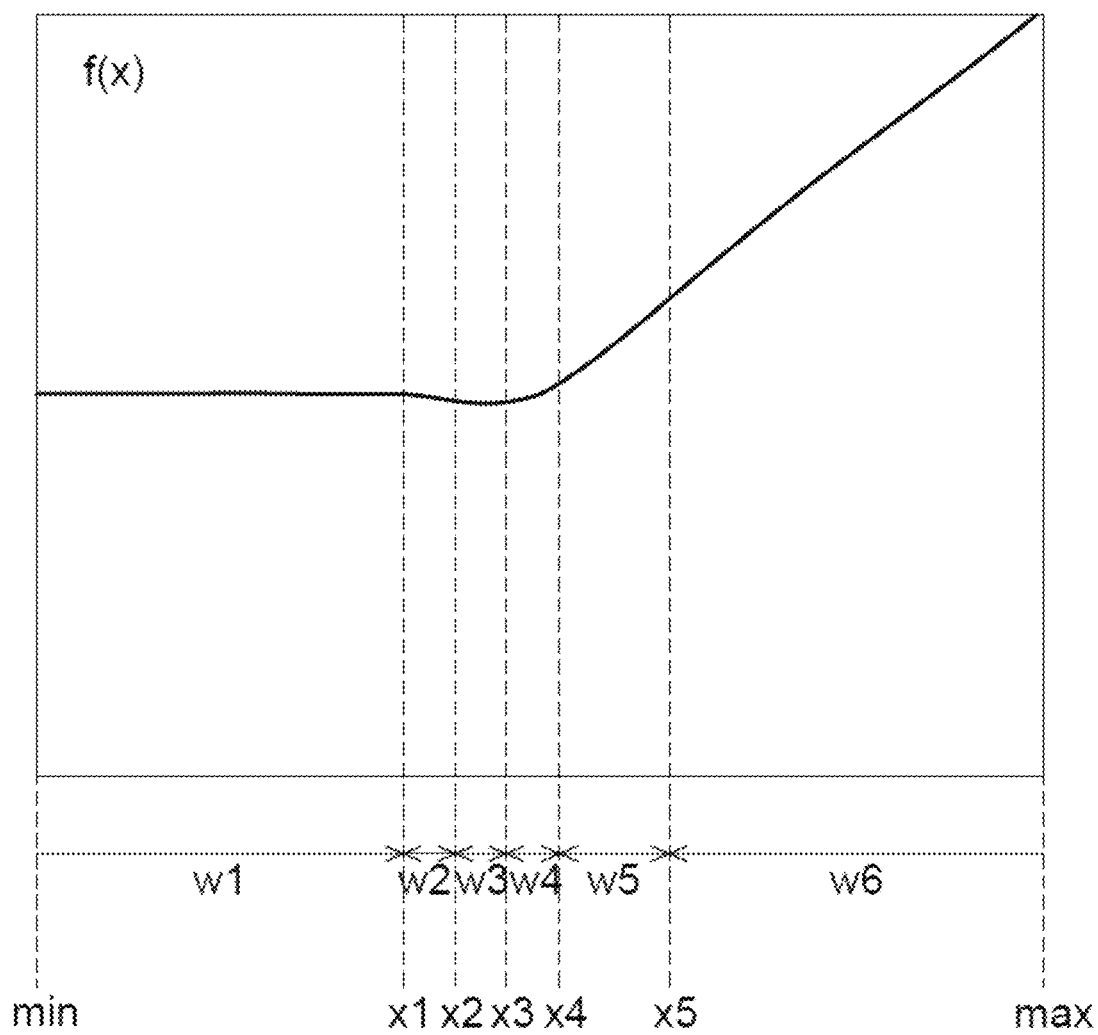
FIG. 13 is a graph illustrating segmentation of an activation function using an accumulation value and a threshold value of second derivatives of an activation function according to an example of the present disclosure.

FIG. 13 illustrates an example of segmenting an activation function using an integral threshold of segment approximation errors of the activation function in the activation function programming method of the present disclosure.

Referring to FIG. 13, the activation function f(x) may be segmented using the accumulated value of second derivatives of the activation function f(x), that is, $\int f''(x)dx$. A point of the minimum value (min) of the X-axis of the activation function f(x) may be determined as a starting point or a point of the maximum value (max) of the X-axis may be determined as the starting point. However, the present disclosure is not limited thereto, and the starting point may also be a particular point.

The PAF may be programmed to include a plurality of segment boundary values x1, x2, x3, x4, and x5, for example.

The PAF may be further programmed to include, for example, a minimum value (min) and a maximum value (max). The minimum value (min) and maximum value (max) may be utilized when implementing clipping for improving programming efficiency of an activation function according to examples of the present disclosure. A value less than or equal to the minimum value may be output as a minimum value. A value greater than or equal to the maximum value may be output as the maximum value.

The activation function f(x) is segmented, from the starting point, for each section in which the accumulated value of the second derivative of the activation function f(x) reaches the threshold value $E_{Th}$ (i.e., the integral threshold value of the segment approximation error).

For example, the activation function conversion program unit 3000 may determine w1 when $$\int_{min}^{x1} f''(x)dx = E_{Th},$$

w2 when $$\int_{x1}^{x2} f''(x)dx = E_{Th},$$

w3 when $$\int_{x2}^{x3} f''(x)dx = E_{Th},$$

w4 when $$\int_{x3}^{x4} f''(x)dx = E_{Th},$$

w5 when $$\int_{x4}^{x5} f''(x)dx = E_{Th},$$

and w5 when $$\int_{x5}^{max} f''(x)dx = E_{Th}.$$

To elaborate, it is also possible to set a different value of $E_{Th}$ for each segment. That is, it is possible to set a plurality of $E_{Th}$ values, such as $E_{Th1}$ and $E_{Th2}$ values, depending on the case.

In addition, the programmable activation function used in the neural network operation may be configured to process only input values within a limited range. For example, the minimum value (min) of the X-axis, which is an input value of the programmable activation function, may be minus six, and the maximum value (max) may be six. According to the above configuration, there is an effect that the data size of the programmed activation function can be reduced. However, the present disclosure is not limited thereto.

Referring to FIG. 13, since the accumulated value of the second derivative of the activation function is the rate of change of the slope of the activation function, it can be determined such that: (1) in the activation function f(x), widths w2, w3, and w4 of the segments corresponding to sections having a relatively large gradient change rate are determined to be relatively narrow, and (2) in the activation function f(x), widths w1 and w6 of the segments including the portion that is a linear function with no rate of change of the slope are determined to be relatively wide.

Figure 14:
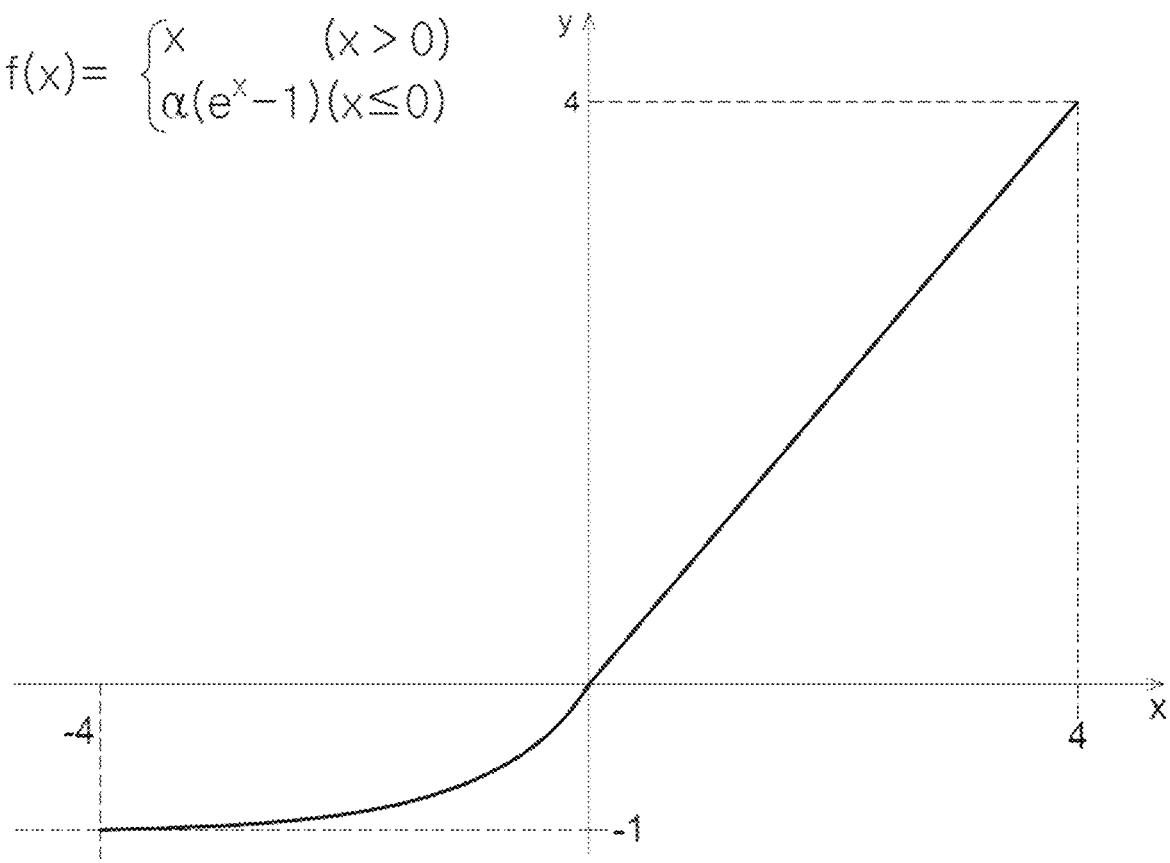
FIG. 14 is graph illustrating an exponential linear unit (ELU) activation function.
Figure 15:
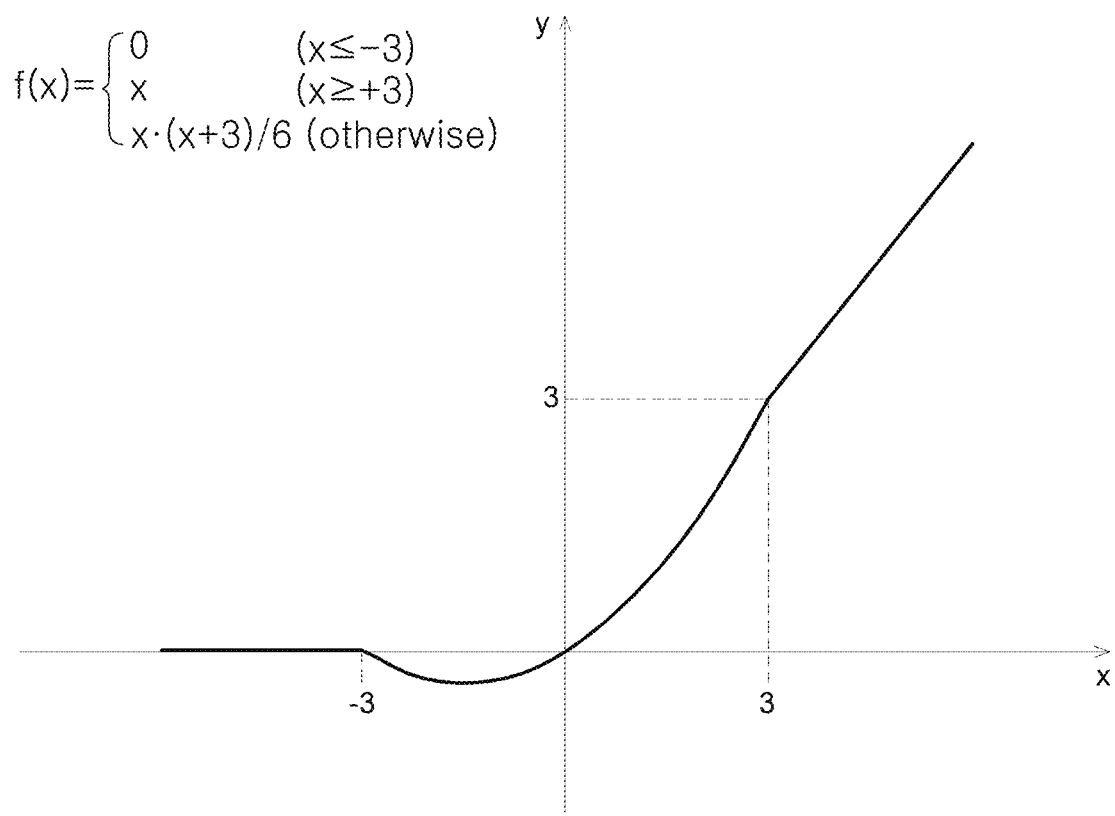
FIG. 15 is a graph illustrating a Hardswish activation function.

FIGS. 14 and 15 illustrate an ELU activation function and a Hardswish activation function, respectively.

The ELU activation function f(x) is x for x>0 and α(ex−1) for x≤0 (where α is a hyperparameter).

As shown in FIG. 14, the ELU activation function has a linear section when the x value is zero or more, and has a non-linear section when the x value is less than zero. That is, the ELU activation function has characteristics which are divided into a linear section and a non-linear section.

The Hardswish activation function f(x) is 0 for x≤−3, x for x≥+3, and x*(x+3)/6 for −3<x<+3.

As shown in FIG. 14, the Hardswish activation function has a linear section when the value of x is less than minus three or greater than three, and has a non-linear section otherwise. That is, the Hardswish activation function has characteristics which are divided into a linear section and a non-linear section.

However, the present disclosure is not limited to the ELU activation function and the Hardswish activation function, and there are various activation functions having characteristics divided into a linear section and a non-linear section.

In particular, in the field of neural networks, various customized activation functions in which various linear and non-linear functions are combined to improve the accuracy of neural networks have been proposed. In this case, the activation function programming method according to examples of the present disclosure may be more effective.

In the activation function programming method according to the present disclosure, the activation function conversion program unit 3000 may distinguish a linear section and a non-linear section of the activation function, furthermore, a substantially linear section and a non-linear section, so that the activation function can be selectively segmented into a plurality of segments. Accordingly, the activation function programming method according to the present disclosure is efficient and minimizes approximation errors, particularly in programming for approximating activation functions having (substantially) linear and non-linear sections, and thus, it is possible to provide an improvement in the operation speed of a neural network model processed in the NPU 1000, a minimization of deterioration in inference accuracy, and a reduction in power consumption of the NPU 1000. In the activation function programming method according to the present disclosure, the activation function conversion program unit 3000 may generate programmable parameters of at least one segment. The NPU 1000 may process at least one programmed activation function based on the above information. The NPU 1000 may receive the information and process at least one programmed activation function.

Coordinates of start and end points of a section of a plurality of segments may be defined as segment boundary values. That is, each segment may be displayed as a segment boundary value. That is, according to the activation function programming method according to the present disclosure, the programmable parameter may include a segment boundary value. In various examples, the activation function programming method according to the present disclosure may further include approximating at least one segment among the plurality of segments using a predetermined lookup table, a non-linear approximation equation, and the like.

In the activation function programming method according to the present disclosure, a plurality of segments is segmented using segment data, and since the segmented plurality of segments can be selectively approximated with programmable segments, there may be a section determined not to be approximated with PAF. If storing in a look-up table, non-linear approximation, and the like for such section is available in hardware in a predetermined manner, such section may be approximated using a predetermined and stored look-up table, non-linear approximation, and the like.

In various examples, an activation function programming method according to the present disclosure may further include determining not to approximate at least one of the plurality of segments as a programmable segment. For example, a segment having a very complicated shape or a segment having low importance in a DNN may be determined not to be approximated as a programmable segment. These segments may be processed in another predetermined manner, or if the number of such segments is large, they may be combined and processed in another predetermined manner.

In various examples, the activation function programming method according to the present disclosure may handle the programming method for each segment in a separate manner.

The activation function programming method according to examples of the present disclosure may include selecting an activation function for neural network operation, and converting the activation function into a programmable activation function. Referring to FIG. 13, as an example, the programmed activation function may include a plurality of segments having a specific width, and the specific width may be determined based on a specific threshold, that is, for each segment in which the accumulated value of the second derivative of the selected activation function reaches the threshold.

A device including a programmable activation function generator according to another example of the present disclosure may be provided. The activation function conversion program may be configured to generate segment data for segmenting the activation function, to segment the activation function into a plurality of segments using the generated segment data, and to convert at least one segment among a plurality of segments into a programmable segment.

At least one of the plurality of segments may have a different width than other segments.

The activation function conversion program may be configured to determine the number and width of a plurality of segments based on segment data, and to segment the activation function into a plurality of segments based on the determined number and width.

Segment data may include slope change data (e.g., differential data) of an activation function.

Segment data may include information of hardware capable of processing an activation function. The activation function conversion program may be configured to receive hardware information.

The activation function conversion program may be configured to determine a substantially linear section and a non-linear section of the activation function based on the slope change data of the activation function, and to segment the activation function into a plurality of segments according to the determined substantially linear section and non-linear section.

The activation function conversion program searches for programmable parameters for approximating at least one segment to a programmable segment. The activation function conversion program may be configured to approximate at least one segment to a programmable segment according to a searched optimal programmable parameter.

The apparatus may further include a PAFE unit, and the PAFE unit may be configured to approximate the at least one segment using a predetermined non-linear approximation equation.

Hereinafter, an NPU configured to process an activation function programmed by an activation function programming method according to an example of the present disclosure will be described in detail.

For convenience of description, an NPU of an apparatus for performing an activation function programming method according to an example of the present disclosure will be described with reference to FIG. 1.

Figure 16:
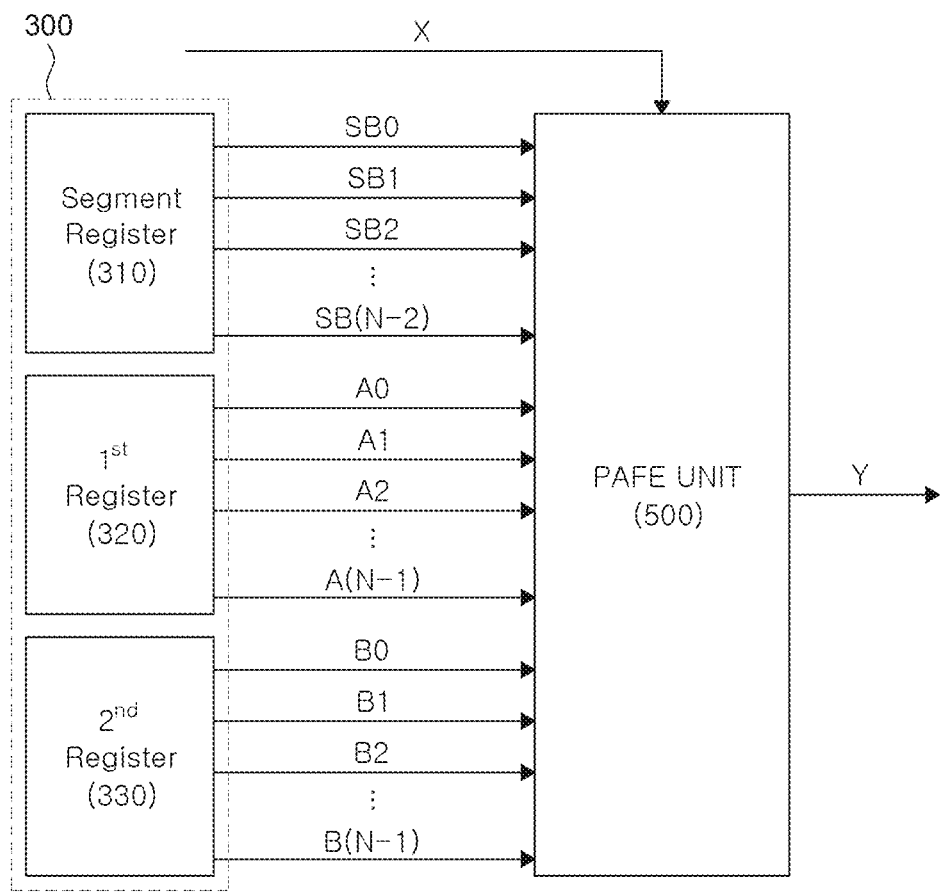
FIG. 16 is a conceptual diagram illustrating a PAFE unit configured to process a programmed activation function according to an example of the present disclosure.

FIG. 16 illustrates a PAFE unit 500 configured to process a programmed activation function according to an example of the present disclosure.

The PAFE unit 500 is an example of a circuit configured to program an activation function as a linear function. The activation function programming method may be implemented by one of various programming examples of the present disclosure described above. Hereinafter, the PAFE unit 500 may be referred to as the PAFE unit 500. The activation function conversion program unit 3000 may be configured to determine the type of programmable parameter based on the provided hardware information. For example, when the PAFE unit 500 includes only a linear function calculation circuit, the activation function conversion program unit 3000 may operate so that all programmable segments become a linear function. For example, when the PAFE unit 500 includes a linear function calculation circuit and a quadratic function calculation circuit, the activation function conversion program unit 3000 may operate so that all programmable segments become a linear function or a quadratic function.

The memory 300 may include a segment register 310, a first register 320, and a second register 330. For example, at least one register may be implemented by setting an address of at least one memory or a register map. For example, the at least one register may be implemented by allocating a dedicated memory or at least one dedicated register. That is, the memory 300 of the PAFE unit 500 may be configured to store programmed activation function data.

The segment register 310 stores information about a section of a plurality of segments.

Specifically, the coordinates of the start and end points of the X-axis of the section of the plurality of segments determined by one of the methods proposed by the activation function conversion program unit 3000 may be stored in the segment register 310. Coordinates of the start and end points of a section of a plurality of segments may be defined as a segment boundary value (SB). That is, sections of a plurality of segments may be determined by the segment boundary values SB0 to SB(N−2).

For F example, in order to define a section of N segments, N−1 segment boundary values SB0 to SB(N−2) may be required.

For example, a section from negative infinity-o to the first segment boundary value SB0 may be defined based on the coordinates of the X-axis using the first segment boundary value SB0. In addition, a section from the last segment boundary value SB(N−2) to positive infinity ∞ may be defined based on the X-axis coordinate using the last segment boundary value SB(N−2). However, it is not limited thereto, and it is also possible to appropriately clip by setting the maximum and minimum values for an infinite range.

Then, T a section of N−1 segments existing between the first segment boundary value SB0 and the last segment boundary value SB(N−2) may be defined by using the segment boundary values (SB1, SB2 . . . ) between the first segment boundary value SB0 and the last segment boundary value SB(N−2). Further, the segment register 310 provides the PAFE unit 500 with a plurality of segment boundary values SB0 to SB(N−2). Accordingly, the PAFE unit 500 may obtain information about sections of a plurality of segments.

The PAFE unit 500 may be configured to receive data from the segment register 310.

That is, the section of segments of the programmed activation function may be set in the PAFE unit 500.

In the case of a first-order polynomial, the first register 320 may be configured to store the gradients A0 to A(N−1) for a plurality of programmable segments.

For example, in the case of a first-order polynomial, the first register 320 may be used as a gradient register.

In other words, the first register 320 may be set to store a specific value such as a gradient according to a programming method.

For a first-order polynomial, the second register 330 may be configured to store offsets B0 to B(N−1) for a plurality of programmable segments.

For example, in the case of a first-order polynomial, the second register 330 may be used as an offset register.

In other words, the second register 330 may be set to store a specific value such as an offset according to a programming method.

Specifically, sections of N segments may be approximated as N programmable segments by the activation function conversion program unit 3000. Further, each programmable segment includes a specific gradient A and a specific offset B value. That is, a specific register of the memory 300 may selectively store a specific value.

In other words, in an example approximated by a linear function, in the section from the minimum value to the first segment boundary value SB0, the gradient of the programmable segment can be expressed as the first gradient A0, and the offset of the programmable segment is expressed as the first offset B0. Here, the minimum value Min may be negative infinity −∞.

In the section between the last segment boundary value SB(N−2) and the maximum value, the gradient of the programmable segment can be expressed as the last slope A(N−1), and the offset of the programmable segment may be expressed as the last offset B(N−1). Here, the maximum value Max may be positive infinity co.

Accordingly, the first register 320 may store the gradients A0 to A(N−1) for each of the N programmable segments. Also, the second register 330 may store offsets B0 to B(N−1) for each of the N programmable segments.

The activation function conversion program unit 3000 may be configured to provide programmed activation function data to be processed by the NPU to the memory 300.

TABLE 1

| Programmed Activation Function #1 | | | | | |
|---|---|---|---|---|---|
| | Comparator 0 | Comparator 1 | Comparator 2 | . . . | Comparator (N-2) |
| Comparator | | | | | |
| Segment Boundary (SB) | SB0 | SB1 | SB2 | . . . | SB(N-2) |
| Comparator Enable (En) | En0 | En1 | En2 | . . . | En(N-2) |
| Selector | | | | | |
| Segment (S) | $-\infty < S0 \leq SB0$ | $SB0 < S1 \leq SB1$ | $SB1 < S2 \leq SB2$ | . . . | $SB(N-2) < S(N-1) \leq +\infty$ |
| Gradient (A) | A0 | A1 | A2 | . . . | A(N-1) |
| Offset (B) | B0 | B1 | B2 | . . . | B(N-1) |
| Min | | | $-\infty$ | | |
| Max | | | $\infty$ | | |

Referring to Table 1, data for driving the programmed activation function, may be configured to be generated in the activation function conversion program unit 3000 and stored in the memory 300, for example, segment register 310, first register 320, and second register 330 of the NPU.

For example, the segment register 310 may be configured to store the segment boundary value SB of Table 1.

For example, the first register 320 may be configured to store the gradient A of Table 1. The gradient A may be referred to as a coefficient of a linear term.

For example, the second register 330 may be configured to store the offset B of Table 1. Offset B may be referred to as a bias.

The controller 100 and/or the DMA 200 may instruct the memory 300 to store data of the programmed activation function of Table 1. However, examples of the present disclosure are not limited thereto, and data of the programmed activation function may be configured to be stored in at least one of a register inside the controller 100, a register inside the PAFE unit 500, a separate memory, and a separate register. That is, the storage location of the data of the programmed activation function is not limited to a specific location.

Referring to Table 1, an example of programmed activation function data is disclosed.

For example, the programmed activation function data may be configured to include a segment boundary value SB.

For example, the programmed activation function data may be configured to include the section of each segment S.

For example, the programmed activation function data may include a gradient A for each segment S.

For example, the programmed activation function data may include an offset B for each segment S.

Further, under the control of the controller 100, the first register 320 may output the gradients A0 to A(N−1) for each of the N programmable segments to the PAFE unit 500. Further, under the control of the controller 100, the second register 330 may output offsets B0 to B(N−1) for each of the N programmable segments to the PAFE unit 500.

Accordingly, the PAFE unit 500 may receive gradients A0 to A(N−1) and offsets B0 to B(N−1) for each of the programmable segments. That is, the PAFE unit 500 may receive information on a plurality of programmable segments through the first register 320 and the second register 330.

TABLE 2

| | Programmed ReLU | | | | |
|---|---|---|---|---|---|
| | Comparator 0 | Comparator 1 | Comparator 2 | ... | Comparator (N-2) |
| | Comparator | | | | |
| Segment Boundary (SB) | 0 | N/A | N/A | ... | N/A |
| Comparator Enable (En) | H | L | L | ... | L |
| | Selector | | | | |
| Segment (S) | $-\infty < S0 \leq 0$ | $0 < S1 \leq +\infty$ | N/A | ... | N/A |
| Gradient (A) | 0 | 1 | N/A | ... | N/A |
| Offset (B) | 0 | 0 | N/A | ... | N/A |
| Min | | | $-\infty$ | | |
| Max | | | $\infty$ | | |

Referring to Table 2, data for driving the programmed ReLU may be configured to be generated in the activation function conversion program unit 3000 and may be stored in the memory 300, for example, segment register 310, first register 320, and second register 330 of the NPU.

For example, the segment register 310 may be configured to store the segment boundary value SB of Table 2.

For example, the first register 320 may be configured to store the gradient A of Table 2.

For example, the second register 330 may be configured to store the offset B of Table 2.

In the case of a programmed ReLU, it can be programmed to have only one segment boundary value SB. As described above, determining to have only one segment boundary value SB may be performed by approximation methods according to various examples of the present disclosure.

In the case of the programmed ReLU, since only the first segment boundary value SB1 is programmed, only one comparator may be required for the operation of the PAFE unit 500. Therefore, unnecessary comparators can be disabled.

As the comparator activation (En) signal of Table 2 is input to the PAFE unit 500, unnecessary comparator power consumption can be reduced.

TABLE 3

| | Programmed ReLU with clipping | | | |
|---|---|---|---|---|
| | Comparator 0 | Comparator 1 | Comparator 2 | ... | Comparator (N-2) |
| | Comparator | | | | |
| Segment Boundary (SB) | 0 | N/A | N/A | ... | N/A |
| Comparator Enable (En) | H | L | L | ... | L |
| | Selector | | | | |
| Segment (S) | $-6 < S0 \leq 0$ | $0 < S1 \leq +6$ | N/A | ... | N/A |
| Gradient (A) | 0 | 1 | N/A | ... | N/A |
| Offset (B) | 0 | 0 | N/A | ... | N/A |
| Min | | | $-6$ | | |
| Max | | | 6 | | |

Referring to Table 3, data for driving the programmed ReLU to which clipping is applied may be configured to be generated in the activation function conversion program unit 3000 and may be stored in the memory 300, for example, segment register 310, first register 320, and second register 330 of the NPU.

For example, the segment register 310 may be configured to store the segment boundary value SB of Table 3.

For example, the first register 320 may be configured to store the gradient A of Table 3.

For example, the second register 330 may be configured to store the offset B of Table 3. When clipping is applied, the minimum and maximum values of the input values of the activation function can be limited.

In addition, in the PAFE unit 500, both the data for driving the programmed ReLU of Table 2 and the data for driving the programmed ReLU with clipping of Table 3 can be stored in the NPU 1000. Also, the activation function conversion program unit 3000 may be configured to provide both data for driving the programmed ReLU and data for driving the programmed ReLU with clipping to the NPU 1000.

The NPU 1000 may be configured to selectively input a plurality of programmed activation functions stored in the NPU 1000 to the PAFE unit 500 according to compiled DNN information.

For example, the NPU 1000 may use the programmed activation function data of Table 2 for the first neural network operation, and may control the PAFE unit 500 to use data of the programmed activation function of Table 3 for the second neural network operation.

TABLE 4

Programmed ReLU6

|  | Comparator 0 | Comparator 1 | Comparator 2 | ... | Comparator (N-2) |
|---|---|---|---|---|---|
|  |  | Comparator |  |  |  |
| Segment Boundary (SB) | 0 | 6 | N/A | ... | N/A |
| Comparator Enable (En) | H | H | L | ... | L |
|  |  | Selector |  |  |  |
| Segment (S) | $-\infty < S0 \leq 0$ | $0 < S1 \leq 6$ | $6 < S2 \leq +\infty$ | ... | N/A |
| Gradient (A) | 0 | 1 | 0 | ... | N/A |
| Offset (B) | 0 | 0 | 6 | ... | N/A |
| Min |  |  | $-\infty$ |  |  |
| Max |  |  | $\infty$ |  |  |

Referring to Table 4, data for driving the program of the program may be produced in the activation function conversion program unit 3000 and stored in the memory 300, for example, segment register 310, first register 320, and second register 330 of the NPU.

For example, the segment register 310 may be configured to store the segment boundary value SB of Table 4.

For example, the first register 320 may be configured to store the slope A of Table 4.

For example, the second register 330 may be configured to store the offset B of Table 4.

In the case of the program, there may be two segment boundary values SB. As mentioned above, judging to have two segment boundary values SB can be performed by approximation methods according to the various examples of the present disclosure.

In addition, in the NPU 1000, the PAFE unit 500 may store data for driving the programmed ReLU in Table 2, may store data for driving the programmed ReLU with clipping in Table 3, and may store data for driving the programmed ReLU6 in Table 4. In addition, the activation function conversion program unit 3000 may be configured to provide all data for driving the programmed ReLU, the programmed ReLU with clipping, and the programmed ReLU6 to the NPU 1000.

The NPU 1000 may be configured to selectively enter the plurality of programmed activated functions stored in the NPU 1000 according to the compiled DNN information.

For example, NPU 1000 may control the PAFE unit 500 to use data from the programmed activation function of Table 2 for the first neural network operation, data from the programmed activation function of Table 3 for the subsequential second neural network operation, and data from the programmed activation function of Table 4 for the subsequential third neural network operation. In the case of the programmed ReLU6, only the first segment boundary value SB1 and the second segment boundary value SB2 were programmed, only two comparators may be required for the operation of the PAFE unit 500. Therefore, unnecessary comparators can be disabled.

In summary, the NPU 1000 may store a plurality of programmed activation functions. The NPU 1000 may selectively input data of a particular activation function in the PAFE unit 500 to process a particular neural network operation. In addition, the PAFE unit 500 may input data from the programmed activation function in real time without changing the hardware to process the neural network operation.

Figure 17:
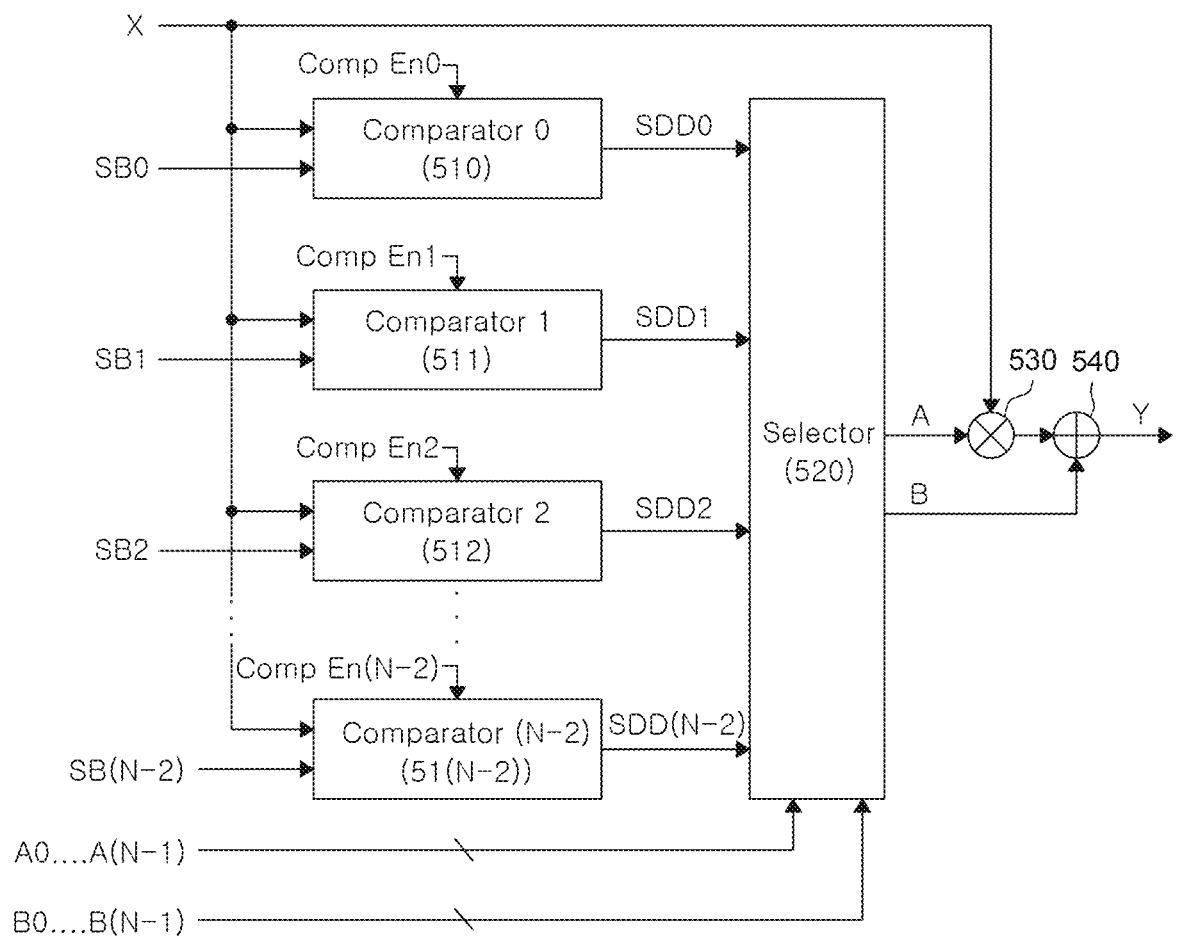
FIG. 17 is a conceptual diagram illustrating a PAFE unit of an NPU of a device configured to process a programmed activation function according to an example of the present disclosure.

FIG. 17 illustrates a PAFE unit of an NPU of an apparatus configured to process the programmed activation function according to the example of the present disclosure.

The exemplary PAFE unit 500 configured to process the programmed activation function with linear function may be configured to include a plurality of comparator (comparator 0 to comparator (N-2)) and (510 to 51(N-2)), a selector 520, multiplier 530, and an adder 540. However, the examples of present disclosure are not limited thereto, and it is possible to distinguish the region of each segment by configuring the circuit in various ways. In addition, the PAFE unit 500 may be modified to further include additional circuit configuration to process the activation function with other programming methods other than the linear function.

In an example of this disclosure, since the PAFE unit 500 is an example configured to process the primary function, the PAFE unit 500 may be configured to process the linear function by input of the segment register 310, the first register 320, and the second register 330. However, the PAFE unit 500 may be modified to further include additional registers to process various approximation functions.

Each of the plurality of comparators 510, 511, 512 ... 51(N-2) compares the input value X calculated in at least one processing element 400 with each of the plurality of segment boundary values SB0 to SB(N-2), respectively.

For example, if the input value X is larger than each of the segment boundary values SB0 to SB(N-2), each of the plurality of comparators 510 to 51(N-2) may output the output value of the first level. On the other hand, if the input value X is less than or equal to each of the segment boundary values SB0 to SB(N-2), each of the plurality of comparators 510 to 51(N-2) may output the output value of the second level.

The first level described above may mean a high level, and the second level described above may mean the low level. Alternatively, the first level described above may mean a low level, and the second level described above may mean the high level.

Accordingly, the section of the segment to which the input value X belongs to the section of the plurality of segments may be determined by the output value output from each of the plurality of comparators 510 to 51(N-2). The output values output from each of the plurality of comparators 510 to 51(N-2) described above can be referred to as section determination data (SDD).

For example, if the first segment boundary value SB0 is −4, the first segment boundary value SB0 is input to the first comparator 510. In the first comparator 510, the input value X calculated in the processing element is input.

For example, if the second segment boundary value SB1 is −2, the second segment boundary value SB1 is input to the second comparator 511. In the second comparator 511, the input value X calculated in the processing element is input.

In other words, the input value X calculated in the processing element can be input at the same time as a plurality of comparators.

For example, when the first segment boundary value SB0 is −4, the second segment boundary value SB1 is −2, and the input value X is −3, the first section determination data SDD1, and the output value of the first comparator (comparator 0 and 510) is output to the first level, and a plurality of section determination data SDD1 to SDD(N−2), except the first section determination data SDD1, which is the output value of the remaining comparators comparator 1 to comparator (N−2), can be output to the second level. Therefore, through the section determination data SDD, an output value output from each of the plurality of comparators 510 to 51(N−2), the input value X can be determined that the segment boundary value SB corresponds to the segments between −4 and −2.

The section determination data SDD1 to SDD(N−2) may be corresponding to the segment S described above in Tables 1 to 4 described above.

Table 5 describes the determination of the segment S of the programmed activation function according to the results of section determination data SDD1 to SDD(N−2).

TABLE 5

|  | Range | SDD0 | SDD1 | SDD2 | ... | SDD(N−2) |
|---|---|---|---|---|---|---|
| Segment (S0) | min < X ≤ SB0 | L | L | L | ... | L |
| Segment (S1) | SB0 < X ≤ SB1 | H | L | L | ... | L |
| Segment (S2) | SB1 < X ≤ SB2 | H | H | L | ... | L |
| Segment (S(N−1)) | SB(N−2) < X ≤ max | H | H | H | ... | H |

Referring to Table 5, the segment S exemplified in Table 1 or Table 4 may be determined according to the output of section determination data SDD0, SDD1, SDD2, and SDD(N−2). When the specific segment S is determined, the corresponding gradient A and the offset B may be selected. However, the examples of the present disclosure are not limited thereto, and it is also possible to determine the corresponding segment by configuring a circuit that determines the segment in various ways. In addition, the PAFE unit 500 may be modified by configuring the circuit to process the activation function in another manner other than the comparator.

On the other hand, operation status of each of the plurality of comparators 510 to 51(N−2) may be determined according to each of the enable signals Comp En 1 to Comp En(N−2).

That is, if each of plurality of the enable signals Comp En 1 to Comp En(N−2) is a first level, each of the plurality of comparators 510 to 51(N−2) may operate to compare the input value X and the segment boundary value SB0 to SB(N−2). Conversely, if each of plurality of the enable signals Comp En 1 to Comp En(N−2) is a second level, each of the plurality of comparators 510 to 51(N−2) may operate to not compare the input value X and the segment boundary value SB0 to SB(N−2). That is, each comparator can be deactivated.

As described above, the number of segment boundary values SB0 to SB(N−2) is determined according to the number of segments of the programmed activation function. For example, when the number of segments is N, the number of segment boundary values SB0 to SB(N−2) is N−1.

For example, even when the activation function conversion program unit 3000 programs the same activation function, the first programmed activation function may be programmed to have ten segments, and the second programmed activation function may be programmed to have five segments. Accordingly, the PAFE unit 500 may differently control the number of comparators activated in the PAFE unit 500 according to each programmed activation function data, even if the activation function is the same. Accordingly, accuracy of neural network calculation and power consumption of the NPU 1000 may also vary according to programming. That is, it is possible to provide a high-performance activation function calculation function or a low-power activation function calculation function even with the same activation function according to user requirements.

Meanwhile, according to the maximum number of segment boundary values SB, the number of the plurality of comparators that use the segment boundary values SB as inputs should also vary.

For example, when the maximum number of segment boundary values SB is ten, at least eleven or more comparators may be provided. That is, the minimum number of comparators may be the maximum number of segment boundary values.

Accordingly, each of the plurality of comparators 510 to 51(N−2) may determine whether or not to operate based on each of the plurality of comparator enable signals Comp En 1 to Comp En(N−2). Accordingly, power consumption of the NPU can be reduced by controlling unnecessary comparator operations according to the number of segments.

However, due to hardware limitations, the number of comparators may be limited. Accordingly, the number of segments for segmenting the activation function may be limited according to the number of comparators of the PAFE unit 500. That is, the activation function may be segmented into the maximum number of segments that can be processed by the NPU 1000 to be processed or the number of segments corresponding to the allocated resources of the NPU 1000.

Meanwhile, according to the programming method according to examples of the present disclosure, it is possible to distinguish between a linear section and a non-linear section of an activation function, and it is possible to minimize the number of segments by providing a variable segment width while minimizing an error value. Therefore, there is an advantage in that the number of gates counts of hardware of the PAFE unit 500 of the NPU 1000 can be minimized by minimizing the number of comparators.

In addition, the activation function programming method according to examples of the present disclosure may be configured to program a specific activation function based on information of the maximum comparator that can be provided.

Then, the selector 520 outputs a gradient A for a programmable segment corresponding to a section of a segment to which an input value X belongs among a plurality of gradients A0 to A(N-1) for a plurality of programmable segments according to the section determination data SDD0 to SDD(N-2).

Specifically, the first register 320 provides the selector 520 with a plurality of gradients A0 to A(N-1) for each of the plurality of programmable segments. Then, the selector 520 may determine the section of the segment to which the input value X belongs among the sections of the plurality of segments according to the section determination data SDD0 to SDD(N-2) output from each of the plurality of comparators 510 to 51(N-2). Also, the selector 520 may output a gradient A for a programmable segment corresponding to a section of the determined segment among a plurality of gradients A0 to A(N-1) for a plurality of programmable segments.

The selector 520 outputs an offset B for a programmable segment corresponding to a section of a segment to which an input value X belongs among a plurality of offsets B0 to B(N-1) for a plurality of programmable segments according to section determination data SDD0 to SDD(N-2).

Specifically, the second register 330 provides a plurality of offsets B0 to B(N-1) for each of the plurality of programmable segments to the selector 520. Further, the selector 520 may determine a section of a segment to which the input value X belongs among a section of a plurality of segments according to section determination data SDD0 to SDD(N-2) output from each of the plurality of comparators 510 to 51(N-2). Then, the selector 520 may output an offset B for a programmable segment corresponding to a section of the determined segment among a plurality of offsets B0 to B(N-1) for a plurality of programmable segments.

Accordingly, the selector 520 may output the gradient A and offset B of the programmable segment corresponding to the section of the segment to which the input value X belongs.

Meanwhile, the selector 520 may be a multiplexer composed of a plurality of switching elements controlled according to the section determination data SDD0 to SDD(N-2), but the configuration of the selector 520 may be variously changed.

The programmed activation function calculation unit of the PAFE unit 500 may refer to a circuit unit configured to receive an input value X, a gradient A, and an offset B and calculate an output value Y.

The programmed activation function calculator of the PAFE unit 500 may include at least one multiplier 530 and an adder 540.

The programmed activation function calculator of the PAFE unit 500 may be a hard-wired circuit.

The multiplier 530 of the programmed activation function operator multiplies the input value X by the gradient A of the programmable segment corresponding to the section of the segment to which the input value X belongs.

Specifically, the multiplier 530 multiplies the input value X calculated in the at least one processing element 400 by the gradient A for the programmable segment output from the selector 520. That is, the input value X may be a calculated value of at least one processing element 400. However, the present disclosure is not limited thereto.

Accordingly, the multiplier 530 may multiply the input value X by the gradient A for the programmable segment and output the result. That is, the output of the multiplier 530 can be expressed as A×X.

Then, the adder 540 of the programmed activation function operator adds the offset B for the programmable segment corresponding to the section of the segment to which the input value X belongs to the output value of the multiplier 530 of the programmed activation function operator.

Specifically, the adder 540 adds an offset B for the programmable segment to a value obtained by multiplying the input value X by the gradient A for the programmable segment. That is, the output of the adder 540 can be expressed as A×X+B.

Accordingly, the adder 540 may output an activation value to which PAF is applied to the input value X of the calculation value.

That is, the PAFE unit 500 according to an example of the present disclosure may be a circuit configuration configured to implement an activation function programmed as a linear function.

For example, the PAFE unit 500 pipelined with at least one processing element 400 according to an example of the present disclosure may also be configured as a hard-wired circuit configured to implement an activation function programmed as a linear function.

As described above, the PAFE unit 500 of the NPU of the apparatus for performing the activation function programming method according to an example of the present disclosure is configured of only a plurality of comparators 511 to 51(N-2), selectors 520, multipliers 530, and adders 540, and all activation functions can be programmed and applied to the input value X.

Since each of the plurality of comparators 511 to 51(N-2), selector 520, multiplier 530, and adder 540 described above is relatively simplified hardware, an apparatus for performing an activation function programming method according to an example of the present disclosure has an effect of processing all activation functions with only simplified hardware.

Meanwhile, the conventional activation function processing device could only process predefined activation functions. However, the apparatus for performing the activation function programming method according to an example of the present disclosure can program and apply activation functions that are not predefined, so that all programmed activation functions can be applied. In particular, since the PAFE unit 500 can adjust the number of segments according to the characteristics of various activation functions, it is possible to minimize approximation errors by using the minimum number of comparators. In particular, since the PAFE unit 500 can adjust the width of each segment according to the characteristics of various activation functions, approximation errors can be minimized by using the minimum number of comparators. In particular, since the PAFE unit 500 can adjust the width and number of segments according to characteristics of various activation functions, approximation errors can be minimized by using the minimum number of comparators.

Hereinafter, an NPU of an apparatus for performing an activation function programming method according to another example of the present disclosure will be described in detail.

Since the NPU of an apparatus for performing an activation function programming method according to an example of the present disclosure and the NPU of an apparatus for performing an activation function programming method according to another example of the present disclosure differ only in the technical characteristics of the PAFE unit, the PAFE unit will be mainly described.

Figure 18:
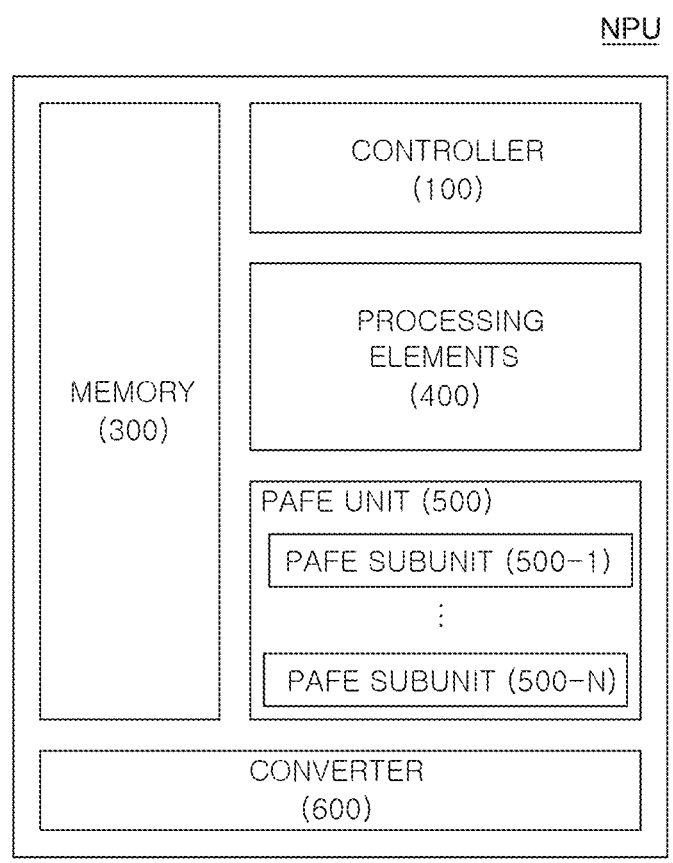
FIG. 18 is a conceptual diagram illustrating an NPU of a device for processing a programmed activation function according to another example of the present disclosure.
Figure 19:
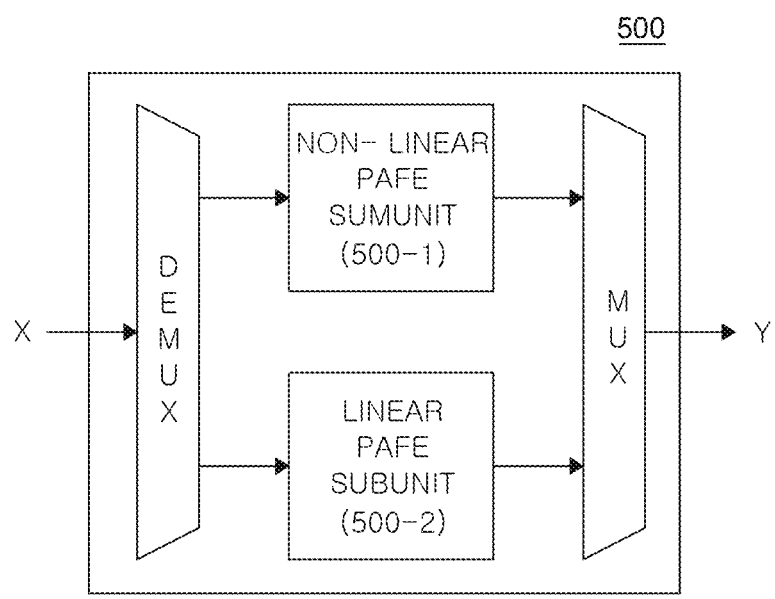
FIG. 19 is a conceptual diagram illustrating a PAFE unit of an NPU of a device for processing a programmed activation function according to another example of the present disclosure.

FIG. 18 illustrates an NPU of an apparatus for processing a programmed activation function according to another example of the present disclosure, and FIG. 19 illustrates a PAF unit 500 of the NPU.

PAF unit 500 of the NPU of the apparatus for processing the programmed activation function may include a plurality of PAF subunits 500-1 to 500-N. In addition, each of the first PAFE subunit 500-1 to Nth PAF subunit 500-N may process different activation functions or the same activation function. That is, the activation functions programmed in each of the first PAFE subunit 500-1 to Nth PAF subunit 500-N may be the same as or different from each other.

In terms of the number of processing elements 400, the amount of data to be processed by the PAFE subunit 500-1 to 500-N may increase. Therefore, the number of PAFE subunits 500-1 to 500-N may be determined in consideration of the number of processing elements 400.

That is, if the maximum data bandwidth of the processing element 400 corresponding to the input value X, which is an output value of the processing element 400, is larger than the maximum data bandwidth that the PAFE unit 500 can process, then the number of PAFE subunits 500-1 to 500-N may increase. Therefore, the bottlenecks of the lack of data bandwidth of the PAFE subunit 500-1 to 500-N can be solved.

For example, as shown in FIG. 19, the PAFE unit 500 may include a demultiplexer (DEMUX) and a multiplexer (MUX) and a plurality of PAFE subunits. The demultiplexer (DEMUX) selectively forwards the input value X to the non-linear PAF subunit 500-1 or the linear PAF subunit 500-2. The input value that should be applied to non-linear PAF is fed to the first PAFE subunit 500-1. In addition, the input value that should be applied to the linear PAF may be fed to the second PAFE subunit 500-2.

In addition, the first PAFE subunit 500-1 stores the programmed activation function of non-linear activation function. Therefore, the first PAFE subunit 500-1 may process non-linear PAF. In contrast, the second PAFE subunit 500-2 stores the programmed activation function of linear activation function. Therefore, the second PAFE subunit 500-2 may process linear PAF.

In addition, since the first PAFE subunit 500-1 may be configured to process non-linear activation functions, the first PAFE subunit 500-1 may include more comparators than the second PAFE subunit 500-2. On the other hand, since the second PAFE subunit 500-2 may have fewer comparators than the first PAFE subunit 500-1, the second PAFE subunit 500-2 can operate with lower power consumption. One of the first PAFE subunit 500-1 and the second PAFE subunit 500-2 may be optionally disabled according to the type of programmed activation function processed by the NPU 1000 to reduce power consumption.

In addition, the multiplexer MUX may receive an output value with a non-linear PAF from the first PAFE subunit 500-1 and the output value with a linear PAF from the second PAFE subunit 500-2.

In addition, the multiplexer MUX may collect and output a non-linear PAF applied output from the first PAFE subunit 500-1 and a linear PAF applied output from the second PAFE subunit 500-2.

Therefore, the multiplexer MUX may output an activation value with linear PAF and non-linear PAF to the computational value that is an input value X.

According to the example of the present disclosure, the first PAFE subunit 500-1 and the second PAFE subunit 500-2 may be configured to handle the specific sections of the activation function, respectively, to process the activation function having both linear and nonlinear sections.

For example, the ELU activation function shown in FIG. 14 has a linear section when the X value is zero or more, and has a nonlinear section when the X value is less than zero. That is, the ELU activation function is characterized by a linear section and a non-linear section. Here, the first PAFE subunit 500-1 may be configured to process the non-linear section of the ELU activation function. The second PAFE subunit 500-2 may be configured to process the linear section of the ELU activation function.

Hereinafter, the NPU of the apparatus for performing the activation function programming method according to another example of the present disclosure will be described in detail.

Since the NPU of an apparatus for performing an activation function programming method according to an example of the present disclosure and the NPU of an apparatus for performing an activation function programming method according to another example of the present disclosure differ only in the technical characteristics of the PAF library 700, the PAF library 700 will be mainly described.

Figure 20:
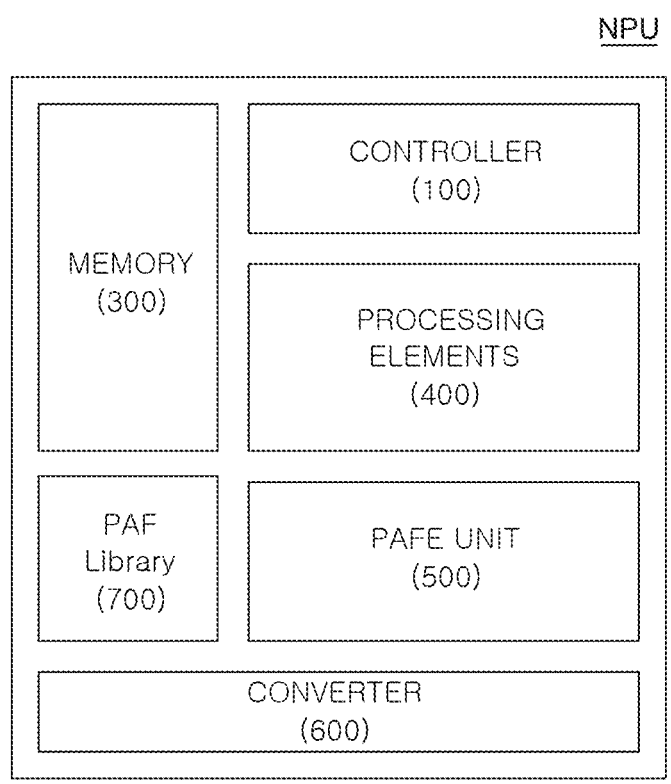
FIG. 20 is a conceptual diagram illustrating an NPU of a device for processing a programmed activation function according to another example of the present disclosure.

FIG. 20 illustrates an NPU of an apparatus for processing the programming activation function according to another example of the present disclosure. The NPU may further include the controller 100, the memory 300, at least one processing element 400, and the PAFE unit 500, as well as the PAF library 700.

The PAF library 700 may store a PAF that approximates the activation function. Specifically, the PAF library 700 may store the gradients A0 to A(N−1) and offset B0 to B(N−1) information for the plurality of programmable segments that make up the PAF. Specifically, the PAF library 700 may store a plurality of PAFs. In addition, the PAF library 700 may store the gradients A0 to A(N−1) and offset B0 to B(N−1) information for plurality of programmable segments for each of the plurality of PAFs. However, by the activation function conversion program, the plurality of PAFs is not limited to the linear function and can be approximated by selectively combining second-order polynomials, third-order polynomials, log functions and the like. For example, the PAF library 700 may be configured to store each programmed activated function data shown in Tables 2 to 4. Therefore, the PAF library 700 may be configured to store both the programmed ReLU, the programmed ReLU with the clipping, and the programmed ReLU6. In addition, as needed, the controller 100 may be controlled to select the specific activation function from the PAF library 700 and enter it into the PAFE unit 500.

The plurality of programmed active functions stored in the PAF library 700 may be approximating the representative activation function. For example, representative activation functions may be Swish function, Mish function, sigmoid function, hyperbolic tangent (TANH) function, SELU function, gaussian error linear unit (GELU) function, SOFTPLUS function, ReLU function, Leaky ReLU function, Maxout function, ELU function, and the like.

Therefore, the PAFE unit 500 may select the PAF required of the plurality of PAFs stored in the PAF library 700 according to the control of the controller 100. In addition, the PAFE unit 500 may import information such as gradient A0 to A(N−1) and offset B0 to B(N−1) from the plurality of programmable segments for the selected PAF from the PAF library 700.

As described above, the apparatus for performing the activation function programming method according to another example of the present disclosure may program the frequently used activation functions and store it in the PAF library 700.

Therefore, in an apparatus for performing the activation function programming method according to another example of the present disclosure, the PAF library 700 can store the PAF without the need for the activation function conversion program to program all the activation functions.

Therefore, there is an advantage that the processing speed of the apparatus for performing the activation function programming method according to another example of the present disclosure can be improved, and the power consumption for driving the activation function conversion program can be reduced.

Hereinafter, the NPU of the apparatus for performing the activation function programming method according to another example of the present disclosure will be described in detail.

Since the NPU of an apparatus for performing an activation function programming method according to an example of the present disclosure and the NPU of an apparatus for performing an activation function programming method according to another example of the present disclosure differ only in at least one processing element (PE) array and PAFE unit, this difference will be mainly described.

Figure 21:
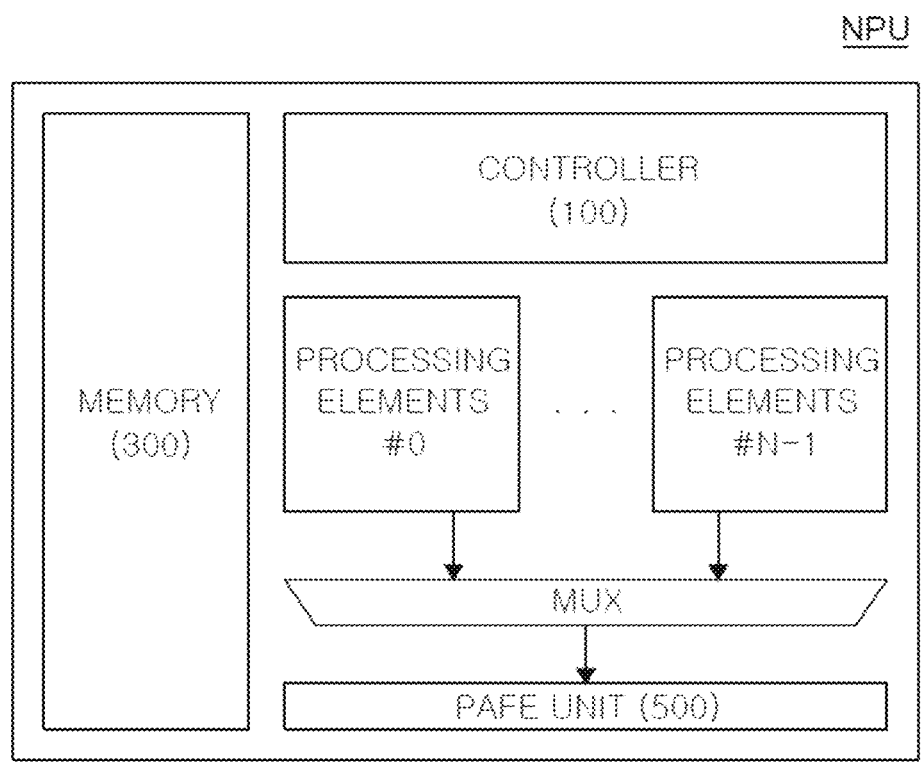
FIG. 21 is a conceptual diagram illustrating an NPU of a device for processing a programmed activation function according to another example of the present disclosure.

FIG. 21 illustrates an NPU of an apparatus for processing the programming activation function according to another example of the present disclosure. As shown in FIG. 21, in the NPU of the apparatus for performing the activation function programming method according to another example of the present disclosure, multiple processing elements #0 to #N−1 can be grouped. The grouped processing elements can be referred to as at least one processing element.

In other words, multiple processing elements may include the zeroth processing element #0 to N−1th processing element. Each of the plurality of processing elements #0 to #N−1 can be referred to as a processing element (PE) thread or PE core. Hereinafter, at least one of the plurality of processing elements will be referred to as a PE core.

On the other hand, the structure of each PE core can be different from one another. For example, each PE core may be one of input stationary type, weight stationary type, and output stationary type.

Further, depending on the setting, each PE core can be driven individually. That is, each PE core is not driven at the same time, and can be driven sequentially according to the operation of the PAFE unit 500.

In addition, the number of processing elements included in each plurality of PE core, multiply and accumulate (MAC) operators, and arithmetic logic unit (ALU) operators, may be different. Thus, the size of each PE core may be different.

Further, each PE core can be connected to the PAFE unit through a multiplexer (MUX). Specifically, the multiplexer (MUX) receives a plurality of computational values output from each PE core and outputs at least one of the plurality of computational values to the PAFE unit. It is also possible to dispose a buffer memory more between the PAFE unit 500 and a PE core. However, it is not limited thereto.

Thus, one PAFE unit may process a plurality of computational values output from each PE core. Thus, the number of PAFE units provided in the apparatus for performing the activation function programming method according to another example may be reduced. In the end, this can reduce the manufacturing cost of the apparatus for performing the activation function programming method.

Figure 22:
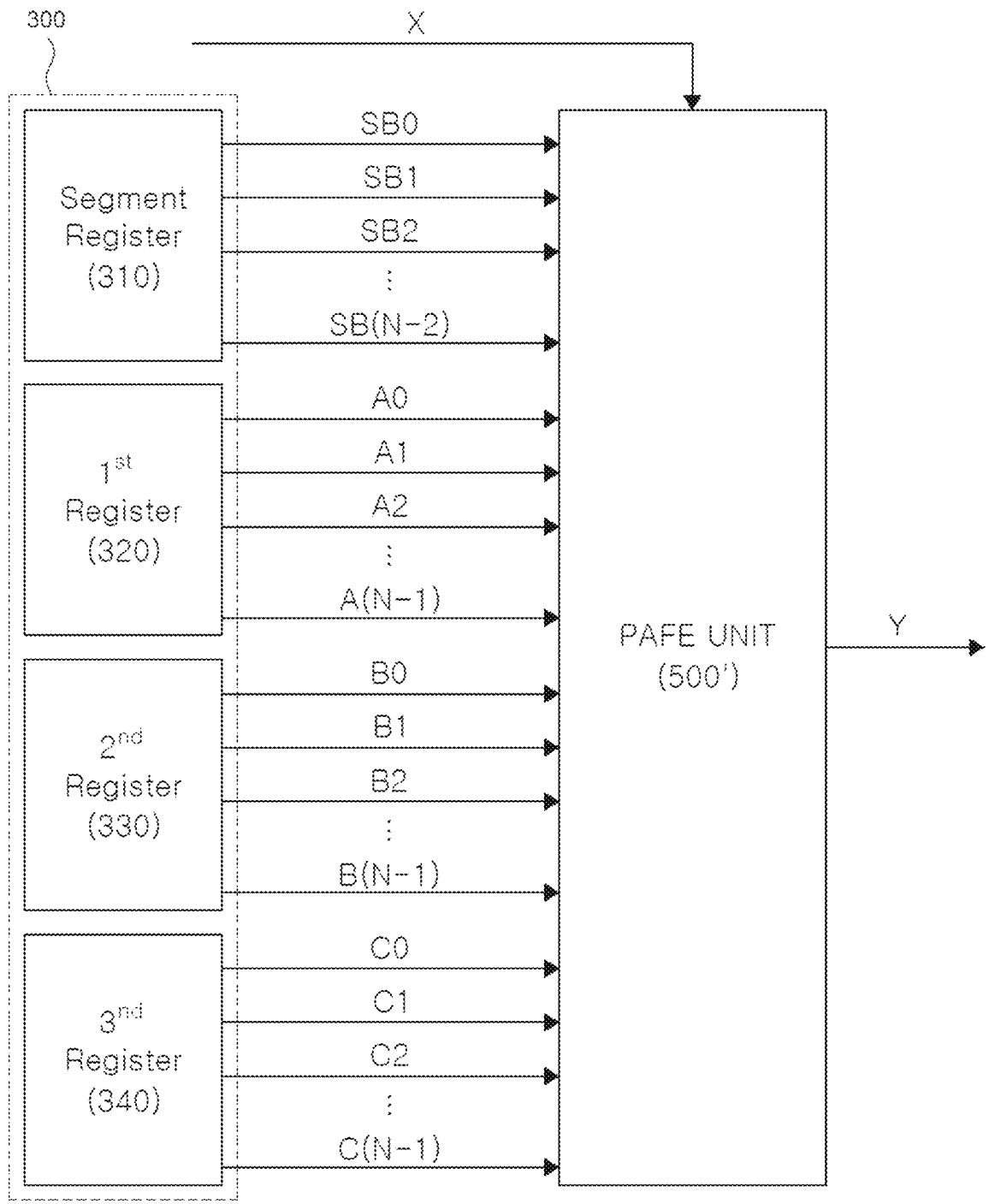
FIG. 22 is a conceptual diagram illustrating a PAFE unit configured to process a programmed activation function according to another example of the present disclosure.
Figure 23:
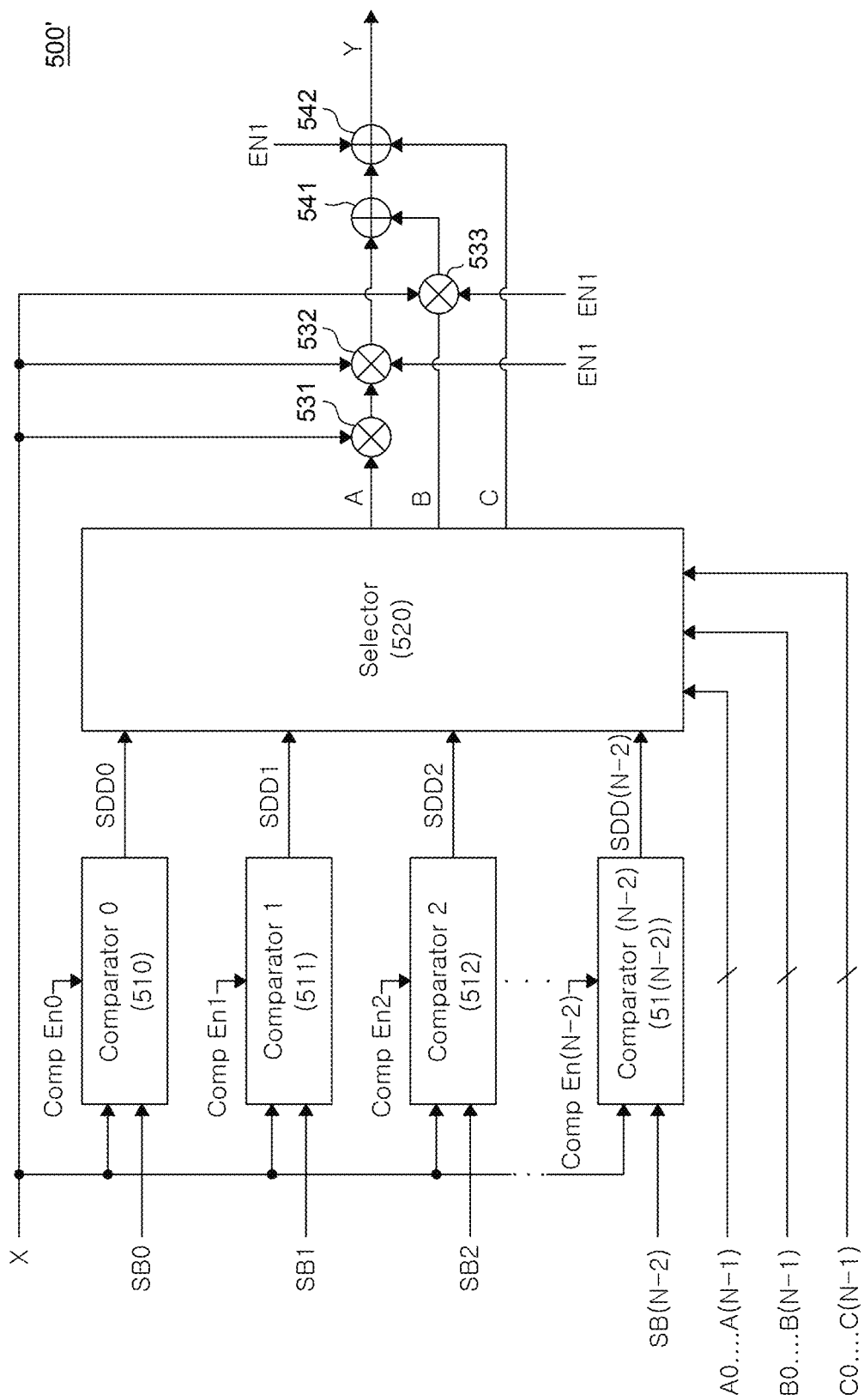
FIG. 23 is a conceptual diagram illustrating a PAFE unit of an NPU of a device for processing a programmed activation function according to another example of the present disclosure.

According to another example of the present disclosure, FIG. 22 illustrates a PAFE unit 500' configured to handle the programming activation function, and FIG. 23 illustrates a PAFE unit 500' of an NPU of an apparatus for processing the programming activation function.

Each of the plurality of programmable segments of the PAF applied to the PAFE unit 500' shown in FIGS. 22 and 23 may operate as a linear or quadratic function. Therefore, the coefficients A, B, and C for the above-described programmable segments may include a coefficient of quadratic term A, a coefficient of linear term B, and an offset C.

Accordingly, the activation function conversion program unit 3000 may be configured to provide the programmed activation function data to be processed in the NPU and the memory 300.

TABLE 6

| Programmed Activation Function #2 | | | | | |
|---|---|---|---|---|---|
| | Comparator 0 | Comparator 1 | Comparator 2 | ... | Comparator (N-2) |
| | | Comparator | | | |
| Segment Boundary (SB) | SB0 | SB1 | SB2 | ... | SB(N-2) |
| Comparator Enable (En) | En0 | En1 | En2 | ... | En(N-2) |
| | | Selector | | | |
| Segment (S) | $-\infty < S0 \le SB0$ | $SB0 < S1 \le SB1$ | $SB1 < S2 \le SB2$ | ... | $SB(N-2) < S(N-1) \le +\infty$ |
| Coefficient of quadratic term (A) | A0 | A1 | A2 | ... | A(N-1) |
| Coefficient of linear term (B) | B0 | B1 | B2 | ... | B(N-1) |
| Offset (C) | C0 | C1 | C2 | ... | C(N-1) |
| Min | | | $-\infty$ | | |
| Max | | | $\infty$ | | |

Referring to Table 6, data for driving the programmed activated function may be generated in the activation function conversion program unit 3000 and configured to be stored in the memory 300, for example, the segment register 310, the first register 320, the second register 330 and the third register 340, of the NPU.

For example, the segment register 310 may be configured to store the segment boundary value SB of Table 6.

For example, the first register 320 may be configured to store a coefficient of quadratic term A of Table 6.

For example, the second register 330 may be configured to store a coefficient of linear term B of Table 6. For example, the third register 340 may be configured to store an offset C of Table 6.

The controller 100 and/or DMA 200 may instruct the data of the programmed activation function in Table 6 to be stored in in the memory 300. Examples of the present disclosure are not limited thereto, and the data of the programmed activation function may be configured to be stored in at least one of a register in the controller 100, a register in the PAFE unit 500', a separate memory, and a separate register. That is, the storage location of the data of the programmed activation function is not limited to a specific location.

Referring to Table 6, an example of the programmed activation function data is disclosed.

For example, the programmed activation function data may be configured to include a segment boundary value SB.

For example, the programmed activation function data may be configured to include a range of segment segments S for each segment.

For example, the programmed activation function data may be configured to include the coefficient of quadratic term A and the coefficient of linear term B for each segment.

For example, the programmed activation function data may be configured to include an offset C for each segment.

Example PAFE units configured to process the programmed activation function of quadratic term may be configured to include a plurality of comparators 0 to (N−2) (or comparators 511 to 51(N−2)), a selector 520, a plurality of multipliers 531, 532, and 533, and a plurality of adders 541 and 542.

Each of the plurality of comparators 510 to 51(N−2) compares the input value X calculated in the at least one processing element 400 with each of a plurality of segment boundary values SB0 to SB(N−2). For example, when the input value X is greater than each of the plurality of segment boundary values SB0 to SB(N−2), each of the plurality of comparators 510 to 51(N−2) may output a first level output value. Conversely, when the input value X is less than or equal to each of the plurality of segment boundary values SB0 to SB(N−2), each of the plurality of comparators 510 to 51(N−2) may output a second level output value.

Accordingly, the section of the segment to which the input value X belongs may be determined among the sections of the plurality of segments through output values output from each of the plurality of comparators 510 to 51(N−2).

Meanwhile, the operation of each of the plurality of comparators 510 to 51(N−2) may be determined by each of the plurality of comparator enable signals Comp En1 to Comp En(N−2).

Further, according to the section determination data SDD0 to SDD(N−2), the selector 520 outputs coefficients A, B, C of the programmable segment corresponding to the section of the segment to which the input value X belongs among the coefficients of the plurality of programmable segments A0 to A(N−1, B0 to B(N−1), and C0 to C (N−1).

Specifically, the first register 320 provides coefficients of a quadratic term A0 to A(N−1), coefficients of a linear term B0 to B(N−1), and offsets C0 to C (N−1) for each of a plurality of programmable segments to the selector 520.

Also, the selector 520 may determine a section of a segment to which the input value X belongs among sections of a plurality of segments according to section determination data SSD0 to SSD (N−2) output from each of the plurality of comparators 510 to 51(N−2).

Further, the selector 520 outputs a coefficient of quadratic term A, a coefficient of linear term B, and an offset C for the programmable segment corresponding to the section of the determined segment among the coefficients of quadratic term A0 to A(N−1), the coefficients of linear term B0 to B(N−1), and the offsets C0 to C (N−1) for the plurality of programmable segments.

Accordingly, the selector 520 may output the coefficient of quadratic term A, the coefficient of the linear term B, and the offset C of the programmable segment corresponding to the section of the segment to which the input value X belongs.

Meanwhile, the selector 520 may be a multiplexer composed of a plurality of switching elements controlled according to the section determination data SDD, but the configuration of the selector 520 may be variously changed.

The programmed activation function calculation unit of the PAFE unit 500' may mean a circuit unit configured to receive an input value X, a coefficient of quadratic term A, a coefficient of linear term B, and an offset C as an input and calculate an output value Y.

The programmed activation function calculator of the PAFE unit 500' may be configured to include a plurality of multipliers 531, 532, and 533 and a plurality of adders 541 and 542 to process a quadratic function or a linear function.

The programmed activation function calculation unit of the PAFE unit 500' may be a hard-wired circuit.

The plurality of multipliers of the programmed activation function calculator may include a first multiplier 531, a second multiplier 532, and a third multiplier 533.

The first multiplier 531 multiplies the coefficient of the quadratic term A for the programmable segment corresponding to the section of the segment to which the input value X belongs and the input value X.

Specifically, the first multiplier 531 multiplies the input value X calculated in the at least one processing element 400 by the coefficient of the quadratic term A for the programmable segment output from the selector 520.

Accordingly, the first multiplier 531 may multiply the input value X by the coefficient of the quadratic term A for the programmable segment and output the result. That is, the output of the first multiplier 531 can be expressed as A×X.

Then, the second multiplier 532 multiplies the output value output from the first multiplier 531 by the input value X. In detail, the second multiplier 532 multiplies the input value X calculated by the at least one processing element 400 by the output value output from the second multiplier 532.

Thus, the output of the second multiplier 532 can be expressed as A×X². However, the above-described configuration is only an example for implementing A×X², and it is also possible to implement modifications through various circuit combinations.

The third multiplier 533 multiplies the coefficient of the linear term B for the programmable segment corresponding to the section of the segment to which the input value X belongs and the input value X.

Specifically, the third multiplier 533 multiplies the input value X calculated in the at least one processing element 400 by the coefficient of the linear term B for the programmable segment output from the selector 520.

Accordingly, the third multiplier 533 may multiply the input value X by the coefficient of the linear term B for the programmable segment and output the result. That is, the output of the third multiplier 533 can be expressed as B×X.

The plurality of adders may include a first adder 541 and a second adder 542.

The first adder 541 adds the output value of the third multiplier 533 to the output value of the second multiplier 532.

Specifically, the first adder 541 may output a sum of a quadratic term and a linear term of each of a plurality of programmable segments composed of quadratic terms. That is, the output of the first adder 541 can be expressed as $A \times X^2 + B \times X$.

Then, the second adder 542 adds the offset C for the programmable segment corresponding to the section of the segment to which the input value X belongs to the output value of the first adder 541.

Specifically, the adder 540 adds the offset C for the programmable segment to the sum of the quadratic term and the linear term of the programmable segment composed of quadratic terms. That is, the output of the second adder 542 can be expressed as $A \times X^2 + B \times X + C$.

Accordingly, the adder 540 may output an activation value to which an activation function programmed as a quadratic function is applied to an input value X as an operation value.

According to the configuration as described above, the PAFE unit 500' enables processing of an operation of a second-order polynomial.

Meanwhile, operations of the second multiplier 532, the third multiplier 533, and the second adder 542 may be controlled by the first enable signal EN1.

Specifically, when the second multiplier 532, the third multiplier 533, and the second adder 542 do not operate due to the first enable signal EN1, the operation is as described below.

The first multiplier 531 multiplies the coefficient of the quadratic term A for the programmable segment corresponding to the section of the segment to which the input value X belongs and the input value X.

Specifically, the first multiplier 531 multiplies the input value X calculated in the at least one processing element 400 by the coefficient of the quadratic term A for the programmable segment output from the selector 520.

Accordingly, the first multiplier 531 may multiply the input value X by the coefficient of the quadratic term A for the programmable segment and output the result. That is, the output of the first multiplier 531 can be expressed as $A \times X$.

Also, the second multiplier 532 and the third multiplier 533 do not operate, and the output of the first multiplier 531 is input to the first adder 541 as it is. That is, the calculator deactivated by the first enable signal EN1 may be bypassed.

Then, the first adder 541 adds the coefficient of the linear term B for the programmable segment corresponding to the section of the segment to which the input value X belongs to the output value of the first multiplier 531.

Specifically, the first adder 541 adds the coefficient of the linear term B for the programmable segment to the value obtained by multiplying the input value X by the coefficient of the second-order term A for the programmable segment. That is, the output of the first adder 541 can be expressed as $A \times X + B$.

Also, the second adder 542 does not operate, and the output of the first adder 541 is output as it is. That is, the calculator deactivated by the first enable signal EN1 may be bypassed.

That is, the first adder 541 may output an activation value to which an activation function programmed as a linear function is applied to an operation value that is an input value X.

According to the configuration described above, the PAFE unit 500' enables processing of an operation of a first-order polynomial.

As described above, some components of the plurality of multipliers and the plurality of adders may be controlled by the first enable signal EN1. Therefore, according to the first enable signal EN1, the PAFE unit can be driven not only when each of the programmable segments is a second-order polynomial but also when each of the programmable segments is a first-order polynomial.

In other words, it is also possible that at least one processing element 400 and the PAFE unit 500', which are pipelined according to an example of the present disclosure, consists of hard-wired circuitry configured to implement an activation function programmed as both a quadratic function and a linear function.

Therefore, there is an advantage of being able to process PAFs in various cases with one PAFE unit.

Figure 24:
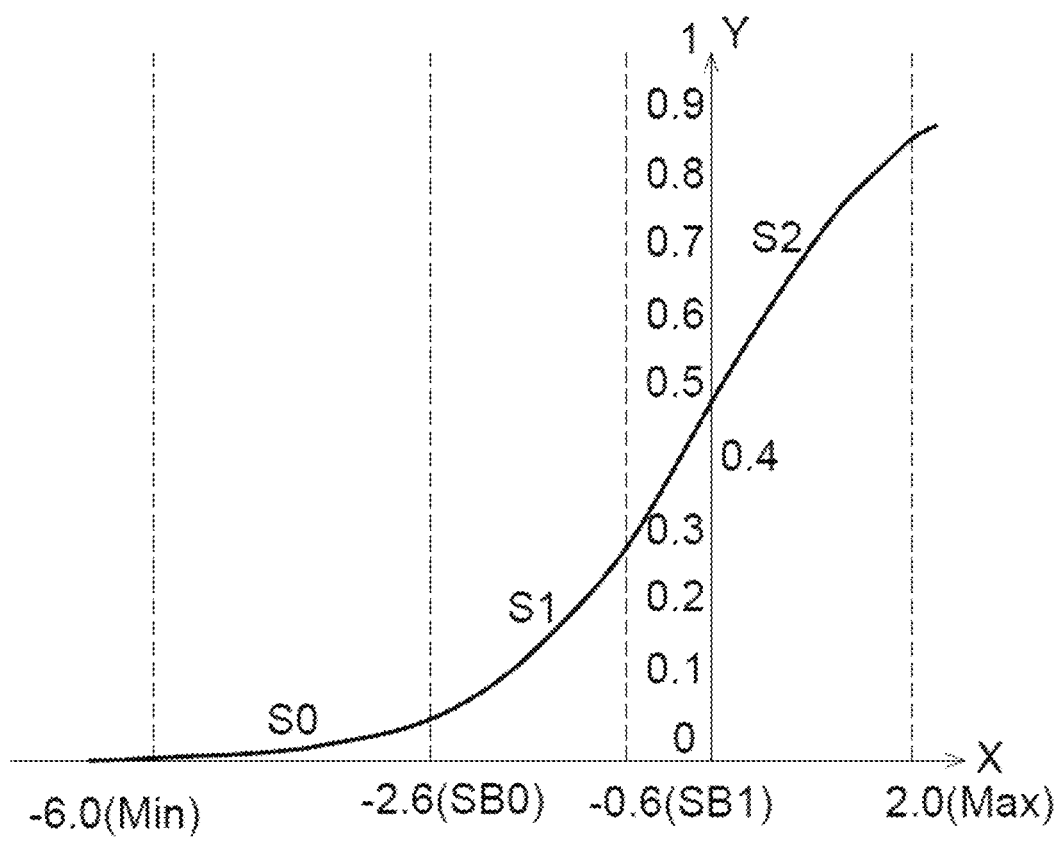
FIG. 24 is a graph illustrating an example in which a device for processing a programmed activation function approximates a sigmoid activation function to a programmable activation function according to another example of the present disclosure.

FIG. 24 illustrates an example in which an apparatus for processing a programmed activation function approximates a sigmoid activation function to a programmed activation function, according to another example of the present disclosure.

As described above, each of a plurality of programmable segments of a PAF applied in a PAFE unit of an apparatus for performing an activation function programming method according to another example of the present disclosure is a second-order polynomial. To elaborate, at least a portion of the sigmoid function, for example, only the −6.0 to 2.0 range, can be approximated by dividing it into three segments.

For example, when approximating the sigmoid activation function with PAF, it can be approximated as follows.

In the section S0 where the input value X is greater than −6.0 or is less than or equal to −2.6, the programmable segment can be approximated by $0.07X^2 + 0.08X + 0.23$. Further, in the section S1 where the input value X is greater than −2.6 or is less than or equal to −0.6, the programmable segment can be approximated by $0.05X^2 + 0.3X + 0.25$. Further, in the section S2 where the input value X is greater than −0.6 or is less than or equal to 2, the programmable segment can be approximated by $-0.03X^2 + 0.26X + 0.5$.

Accordingly, the programmable parameters can be corresponded according to the format of Table 6.

For example, A0 in Table 6 may be 0.07. B0 in Table 6 may be 0.08. C0 in Table 6 may be 0.23.

For example, A1 in Table 6 may be 0.05. B1 in Table 6 may be 0.3. C1 in Table 6 may be 0.52.

For example, A2 in Table 6 may be −0.03. B2 in Table 6 may be 0.26. C2 in Table 6 may be 0.5.

For example, SB0 in Table 6 may be −2.6. SB1 in Table 6 may be −0.6.

For example, Min in Table 6 may be −6.0. Max in Table 6 may be 2.0.

For example, the segment boundary value SB of the segment, the coefficient of the quadratic term A, the coefficient of the linear term B and the offset C may also be derived by approximating each segment to an optimal programmable segment using machine-learning in the activation function programming method according to the example of FIG. 12.

The coefficients in FIG. 24 are only examples derived by machine-learning and may be modified in various ways. For example, some of the programmable segments S0 and S2 may correspond to a linear section, and another part of the programmable segments S1 may correspond to a non-linear section.

Accordingly, some of the programmable segments S0 and S2 may be approximated with a linear function, and another portion S1 of the programmable segments may be approximated with a quadratic function.

Figure 25:
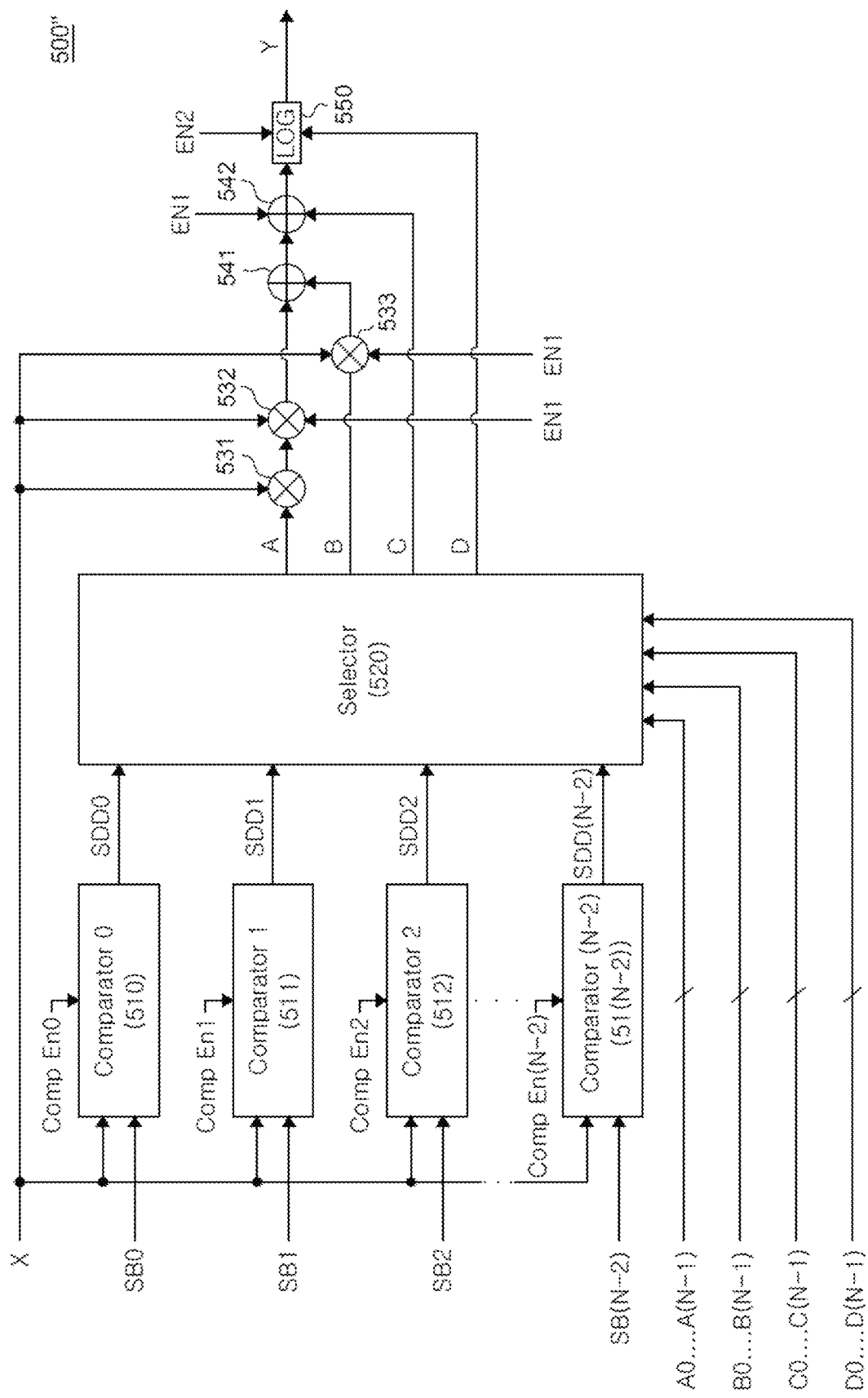
FIG. 25 is a conceptual diagram illustrating a PAFE unit of an NPU of a device for processing an activation function programmed according to another example of the present disclosure.

In some examples, a log operator may be further included in the output terminal of the PAFE unit. Referring to FIG. 25, a PAFE unit 500" including a log operator will be described in detail.

FIG. 25 illustrates a PAFE unit of an NPU of an apparatus for processing an activation function programmed according to another example of the present disclosure.

Referring to FIG. 25, the PAFE unit 500" may include a plurality of comparators 0 to (N−2) (or comparators 511 to 51(N−2)), a selector 520, a plurality of multipliers 531, 532, and 533, and a plurality of adders 541 and 542, as well as a log operator 550.

Since there is a difference between the PAFE unit shown in FIG. 23 and the PAFE unit shown in FIG. 25 only in whether the log operator 550 operates, this difference will be described in detail.

The operation of the log operator 550 can be controlled by the second enable signal EN2. When the second enable signal EN2 is applied to the log operator 550, the log coefficient D may be input to the log operator 550. When the log operator 550 is activated, the operators 531, 532, 533, 541, and 542 related to the coefficient of the second-order term A, the coefficient of the first-order term A, and the offset C may be deactivated.

That is, the output of the log operator 550 may be expressed as log D.

That is, the logarithmic operator 550 may output an activation value to which a PAF including a logarithmic operation is applied to an input value X.

Each of the plurality of programmable segments of the PAF applied in the PAFE unit shown in FIG. 25 may operate as a linear function, a quadratic function, or a logarithmic function. Accordingly, the coefficients A, B, C, and D for the above-described programmable segment may include a coefficient of a quadratic term A, a coefficient of a linear term A, an offset C, and a log D.

For example, the programmed activation function data may include a quadratic coefficient A for each segment. The coefficient of the quadratic term A may be stored in the second register of the memory.

For example, the programmed activation function data may include coefficients of a linear term B for each segment. The coefficient of the linear term B may be stored in a third register of the memory.

For example, the programmed activation function data may include an offset C for each segment. Offset C may be stored in a fourth register of memory.

For example, the programmed activation function data may include a logarithmic coefficient D for each segment. The logarithmic coefficient D may be stored in a fifth register of the memory.

As described above, the application of the PAF including the logarithmic operation by adding the logarithmic operator 550 to the PAFE unit has been described. However, as an operator added to the output terminal of the PAFE unit, not only the log operator 550 but also various types of operators may be added.

In other words, the programmed activation function data may be determined according to the operator circuit configuration of the programmed activation function calculator of the PAFE unit and supportable equations.

Figure 26:
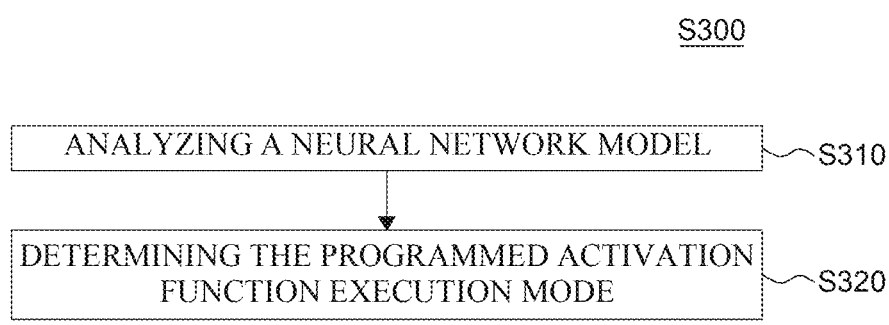
FIG. 26 is a schematic flowchart illustrating a method of executing an activation function according to one example of the present disclosure.

According to one example of the present disclosure, FIG. 26 illustrates a method of programming an activation function.

Referring to FIG. 26, a method S300 of activation function execution may include a step S310 of analyzing a neural network model and a step S320 of determining the programmed activation function execution mode (PAFE mode).

In the step S310 of analyzing a neural network model, the processor 2000 or an external compiler may identify target activation functions included in each layer of the neural network or deep neural network (DNN) to be processed by the NPU 1000.

TABLE 7

| | Programmed Activation Function #3 | | | |
|---|---|---|---|---|
| | Comparator 0 | Comparator 1 | Comparator 2 | . . . | Comparator (N-2) |
| | Comparator | | | | |
| Segment Boundary (SB) | SB0 | SB1 | SB2 | . . . | SB(N-2) |
| Comparator Enable (En) | En0 | En1 | En2 | . . . | En(N-2) |
| | Selector | | | | |
| Segment (S) | $-\infty < S0 \leq SB0$ | $SB0 < S1 \leq SB1$ | $SB1 < S2 \leq SB2$ | . . . | $SB(N-2) < S(N-1) \leq +\infty$ |
| Coefficient of quadratic term (A) | A0 | A1 | A2 | . . . | A(N-1) |
| Coefficient of linear term (3) | B0 | B1 | B2 | . . . | B(N-1) |
| Offset (C) | C0 | C1 | C2 | . . . | C(N-1) |
| log (D) | D0 | D1 | D2 | . . . | D(N-1) |
| Min | | | $-\infty$ | | |
| Max | | | $\infty$ | | |

Referring to Table 7, data for driving the programmed activation function may be configured to be generated in the activation function conversion program unit 3000 and stored in the memory 300, for example, the segment register 310, the first register 320, the second register 330, the third register 340, and the fourth register 350 of the NPU.

For example, the programmed activation function data may be configured to include a segment boundary value SB. The segment boundary value SB may be stored in a first register of the memory.

For example, the programmed activation function data may include a range of segments S for each segment.

For example, each layer of a DNN may contain operations of the following representative activation functions: swish function, Mish function, sigmoid function, hyperbolic tangent (tanh) function, SELU function, Gaussian Error Linear Unit (GELU) function, SOFTPLUS function, ReLU function, Leaky ReLU function, Maxout function, ELU function and the like.

Then, in the step S310 of analyzing the neural network model, it is determined whether the target activation function can be partially linearly approximated.

For example, the ReLU family of functions, i.e., the ReLU function, the Leaky ReLU function, the Maxout function, and the ELU function, may have at least one linear interval and may be piecewise linearly approximated, while other functions are not piecewise linearly approximated.

Then, in the step S310 of analyzing the neural network model, the error rate, which is the difference between the programmed activation function and the target activation function, may be calculated.

The error rate may use the mean absolute error (MAE), which is a statistical metric used to measure the difference between a predicted value and an actual value according to Equation 1 below.
Equation 1
where n is the number of data points, $y_i$ is the value of the target activation function, and $x_i$ is the $$MAE = \frac{\sum_{i=1}^{n} |y_i - x_i|}{n}$$

value of the activation function programmed by the first programmed activation function. However, the calculation method of the error rate is not limited to MAE, but can be based on various error rate calculation methods such as mean squared error (MSE), root mean squared error (RMSE), mean absolute percentage error (MAPE), and the like.

Then, in the step S320 of determining the programmed activation function execution method, a programmed activation function execution method can be determined according to the type of the target activation function and the error rate.

Specifically, if the target activation function can be linearly approximated, the error rate, which is the difference between the programmed activation function and the target activation function, may be lower than the threshold value. That is, if the target activation function can be linearly approximated, or if the error rate is lower than the threshold, the first programmed activation function execution mode (hereinafter referred to as the first PAFE mode) can be used to generate an activation value.

In other words, if the target activation function can be linearly approximated, or if the error rate is lower than the threshold, the controller 100 may be controlled to execute the activation function in the first PAFE mode.

Conversely, if the target activation function is not linearly approximated, the error rate, which is the difference between the programmed activation function and the target activation function, may be higher than the threshold. In other words, if the target activation function is not linearly approximated, or if the error rate is higher than the threshold, a second programmed activation function execution mode (hereinafter referred to as the second PAFE mode) may be used to generate an activation value.

In other words, if the target activation function is not linearly approximated or if the error rate is higher than the threshold, the controller 100 may utilize the second PAFE mode to execute the activation function.

However, in the step S320 of determining the programmed activation function execution mode, the criteria for determining the programmed activation function execution method are not limited to the type of target activation function and the error rate, and the programmed activation function execution method can be determined according to the user's configuration received from the user.

Figure 27:
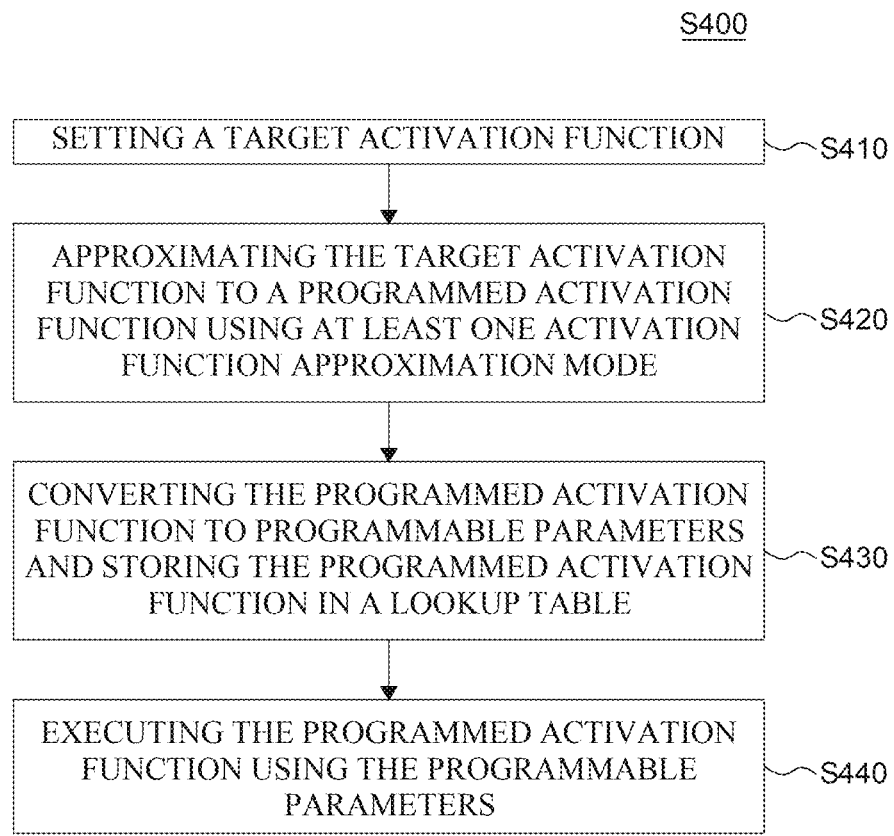
FIG. 27 is a diagram illustrating operation in a first PAFE mode, according to one example of the present disclosure.
Figure 28:
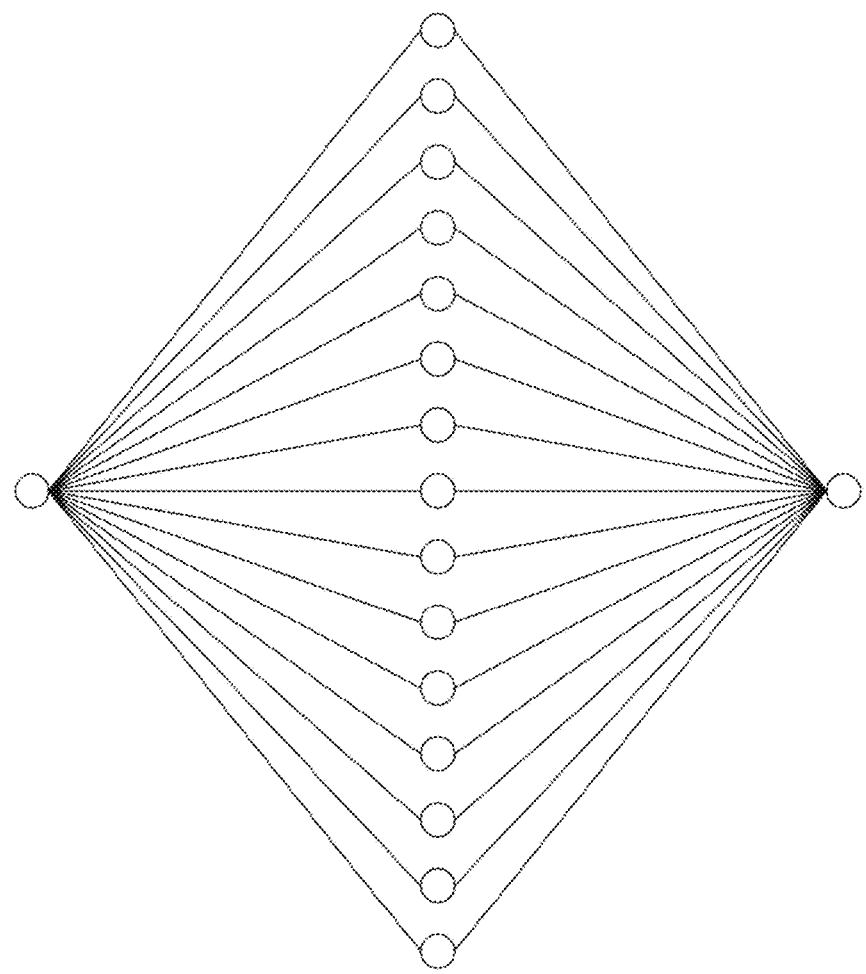
FIG. 28 is a diagram illustrating a neural network used for approximation computation in the first PAFE mode, according to one example of the present disclosure.

Referring to FIGS. 27 and 28, a first PAFE mode is described below. FIG. 27 is a flowchart illustrating a first PAFE mode according to one example of the present disclosure. FIG. 28 is a diagram illustrating a neural network used for approximation computation of a first PAFE mode according to one example of the present disclosure.

Referring to FIG. 27, the first PAFE mode S400 includes a step S410 of setting a target activation function, a step S420 of approximating the target activation function to a programmed activation function using at least one activation function approximation mode, a step S430 of converting the programmed activation function to programmable parameters and storing the programmed activation function in a lookup table, and a step S440 of executing the programmed activation function using the programmable parameters.

In the step S410, the activation function that is the target activation function to be programmed is set. For example, the target activation function can be a swish function, a Mish function, a sigmoid function, a hyperbolic tangent (tanh) function, a SELU function, a gaussian error linear unit (GELU) function, a SOFTPLUS function, a square root (SQRT) function, and other nonlinear functions.

In the step S420, the target activation function may be approximated to the programmed activation function via at least one activation function approximation mode. For example, in the step S420, the target activation function is approximated to the programmed activation function through training of a neural network.

Referring to FIG. 28, the neural network used to approximate the target activation function may comprise two layers and a plurality of rectified linear unit (ReLU) functions disposed between the two layers. In other words, the neural network used to approximate the target activation function may comprise two neural networks and a plurality of rectified linear unit (ReLU) functions disposed between the two neural networks.

The first neural network section means between the nodes of the input layer and the nodes of the hidden layer. That is, the first neural network section may be referred as the first layer.

The second neural network section means between the nodes of the hidden layer and the nodes of the output layer. That is, the second neural network section may be referred as the second layer.

At least one neuron in the first neural network section include a connection network including weights connecting nodes of the input layer and nodes of the hidden layer.

At least one neuron in the second neural network section include a connection network including weights connecting nodes of the hidden layer and nodes of the output layer and a corresponding activation function.

More specifically, the first neural network section includes at least one neuron. Each of the plurality of neurons in the first neural network section has one node in the input layer as an input and each of the plurality of nodes in the hidden layer as an output.

For example, the number of neurons in the first neural network section may be fifteen. Accordingly, the number of nodes in the plurality of hidden layers may be fifteen. However, the number of neurons in the first neural network section and the number of nodes in the hidden layer may be varied as desired.

Further, the first neural network section may be a fully connected layer in which one node of the input layer as an input and a plurality of nodes of the hidden layer as outputs are fully connected. Accordingly, each of the plurality of neurons in the first neural network section may have a weight and a bias.

That is, the weight of each of the plurality of neurons in the first neural network section may be represented by $n_1, n_2, \ldots n_{15}$, and the bias of each of the plurality of neurons in the first neural network section may be represented by $b_1, b_2, \ldots b_{15}$.

Thus, when input x is input to the first neural network section, each of the plurality of nodes in the hidden layer may output $z_i = n_i * x + b_i$. Then, a rectified linear unit (ReLU) function may be applied to the output of each of the plurality of neurons in the first neural network section.

Rectified linear unit (ReLU) (z) can be expressed as max(0, z), which means that all negative values can be converted to zero when the ReLU function is applied.

Therefore, the output value of the first neural network section with the rectified linear unit (ReLU) function applied can be expressed as $ReLU(n_i * x + b_i)$.

The second neural network section also includes at least one neuron. Each of the plurality of neurons in the second neural network section has each of the plurality of nodes in the hidden layer as an input and one node in the output layer as an output.

For example, the number of neurons in the second neural network section may be fifteen. Accordingly, the number of plurality of nodes in the hidden layer may be fifteen. However, the number of neurons in the second neural network section and the number of nodes in the hidden layer can be varied as needed.

Furthermore, the second neural network section may be a fully connected layer in which the plurality of nodes of the hidden layer as inputs and one node of the output layer as outputs are fully connected. Accordingly, each of the plurality of neurons included in the second neural network section may have a weight. That is, the weight of each of the plurality of neurons included in the second neural network section may be represented by $m_1, m_2, \ldots m_{15}$.

Accordingly, the second neural network section may be given as an input the output value of the first neural network section, or $ReLU(n_i * x + b_i)$.

Therefore, the output of the second neural network section is the sum of the output of the first neural network section, $ReLU(n_i * x + b_i)$, multiplied by the weight of the second neural network section.

Therefore, one node of the output layer, which is the output of the second neural network section, can be output with an operation value according to Equation 1.

$$\sum_{i=1}^{15} m_i \times ReLU(n_i \times x + b_i) \qquad \text{Equation 2}$$

By performing the above-described operation of the neural network, the error between the approximated programmed function and the target activation function is calculated, and the training of the neural network is repeatedly performed so that the error value is minimized. Through the training process described above, the activation function conversion program unit can approximate the target activation function to the programmed activation function.

Finally, by calculating the breaking point of the programmed activation function, linear sections of the programmed activation function can be set. Each linear section can then be segmented into a first-order function with a specific slope and a specific offset.

However, the present disclosure is not limited to the training of the neural network of step S420, namely, approximating the target activation function to a programmed activation function comprising a plurality of programmable segments, wherein the plurality of programmable segments are set.

In other words, the method of setting the plurality of programmable segments included in the programmed activation function in the step S420 may correspond to any one of a polynomial approximation, a Chebyshev polynomial approximation, a spline interpolation, a Fourier Series approximation, and a rational function approximation. For example, a polynomial approximation may be used to approximate an expression such as a sigmoid function, and a spline interpolation may be used to smoothly connect data points. However, the method of approximating the target activation function to the programmed activation function in step S520 is not limited to the above examples and may be performed using a variety of approximation methods.

In other words, in the step S420, the approximation of the target activation function to a programmed activation function comprising a plurality of programmable segments may be varied as follows.

Specifically, as described above with reference to FIG. 3, in the step S420, all of the programmable segments may correspond to a first order function. However, without limitation, at least one programmable segment may be represented by polynomial functions, logarithmic functions, exponential functions, and the like.

As described above with reference to FIG. 4, in the step S420, all programmable segments may be set to have the same or different widths.

As described above with reference to FIG. 5, in the step S420, the gradient change data (e.g., first derivative data) may be used to separate the target activation function into linear and nonlinear segments to set the programmable segments.

Figure 6B:
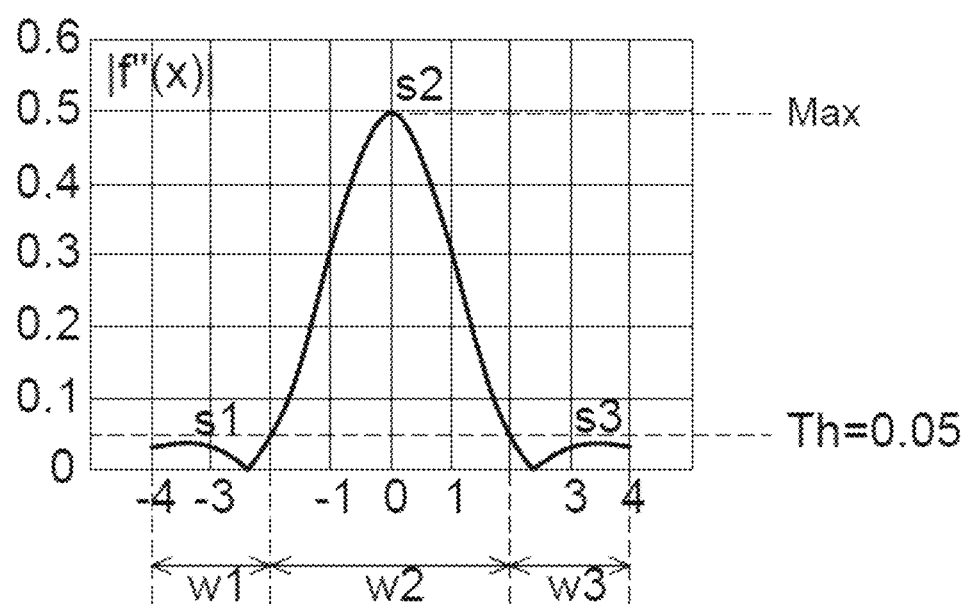
Figure 7B:
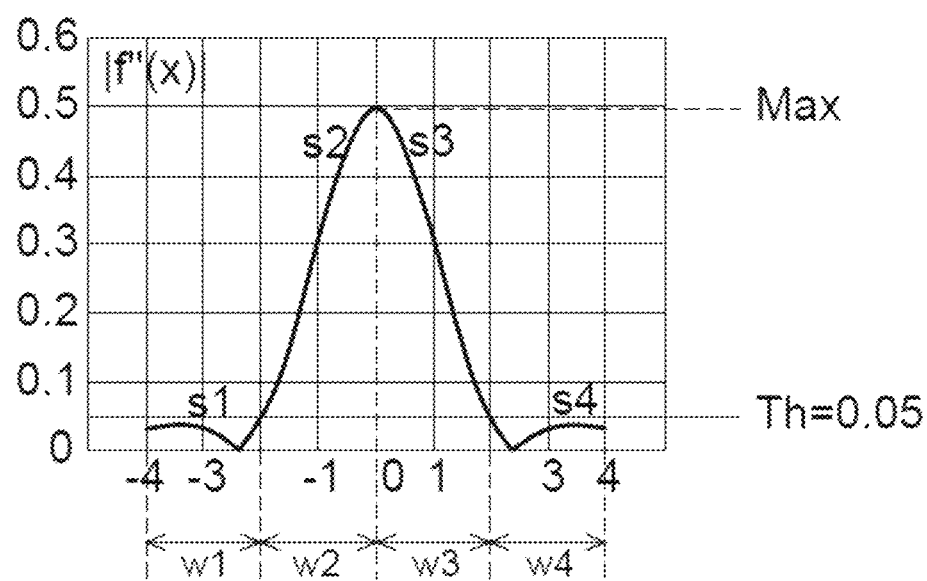

As described above with reference to FIGS. 6 through 8, in the step S420, the gradient change data (e.g., second derivative data) may be used to set programmable segments to separate the target activation function into substantially linear and nonlinear segments.

As described above with reference to FIGS. 9 through 11, in the step S420, the error rates of the plurality of candidate segments may be calculated to set the programmable segments.

As described above with reference to FIG. 12, in the step S420, the programmable segment may be set using machine learning and, as described above with reference to FIG. 13, in the step S420, the programmable segment may be set using an integral threshold of the segment approximation error of the target activation function.

In the step S430, the programmed activation function is converted into programmable parameters, slope and offset, and stored in a lookup table.

As described above, each of the programmed activation functions can be segmented into a first-order function with a specific slope and a specific offset for each of the linear segments.

Accordingly, the specific slope and specific offset, which are programmable parameters for each of the linear segments can be stored in the lookup table.

In the step S440, the PAFE unit 500 may generate an activation value by executing a programmed activation function generated by the activation function conversion program unit 3000 on the operational value output from the at least one processing element 400 to generate the activation value.

That is, in the step S440, the PAFE unit 500 may be provided with at least one programmable parameter, a specific slope and a specific offset, generated in response to the programmed activation function, to execute the programmed activation function to generate an activation value.

The specifics of this are the same as described above with respect to FIGS. 16 and 17, and thus redundant description may be omitted.

Figure 29:
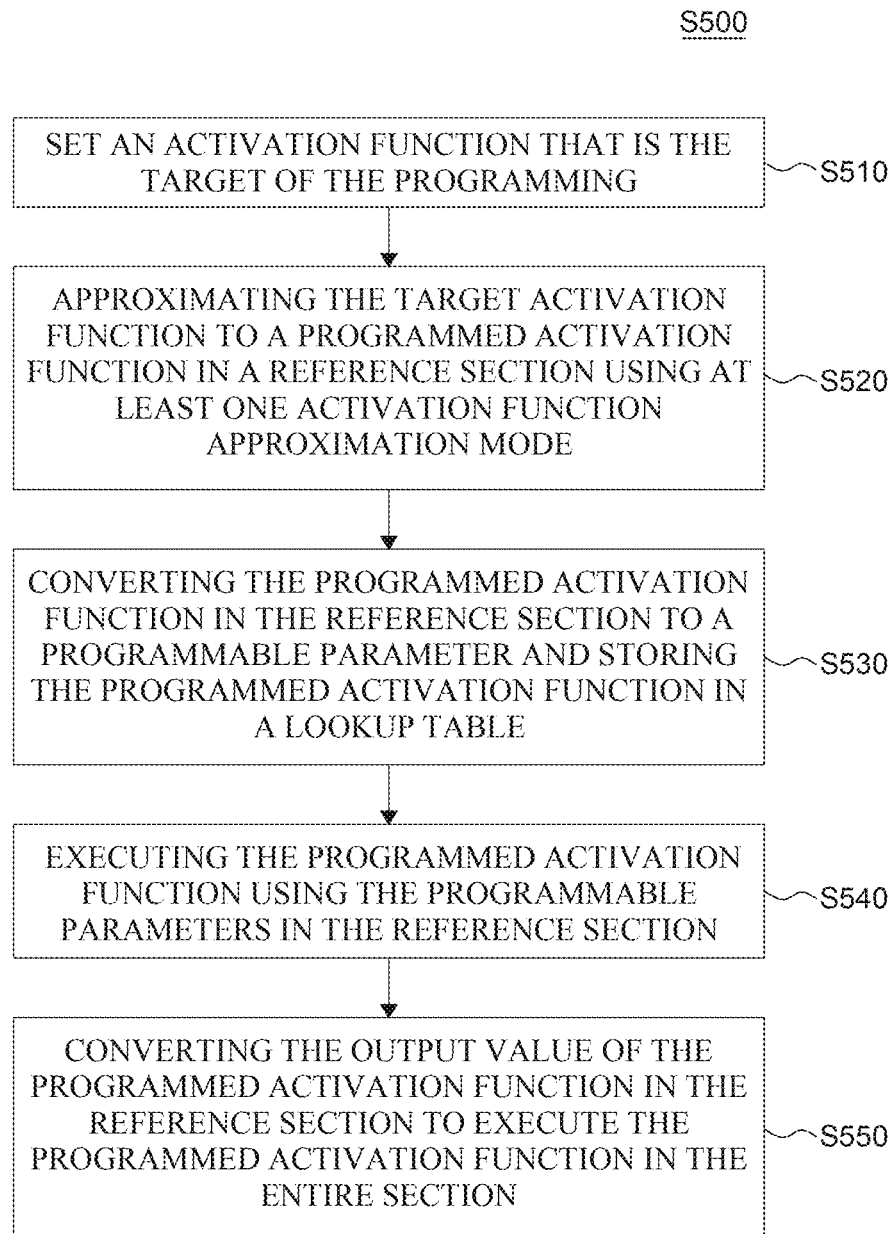
FIG. 29 is a flowchart illustrating operations in a second PAFE mode, according to one example of the present disclosure.
Figure 30:
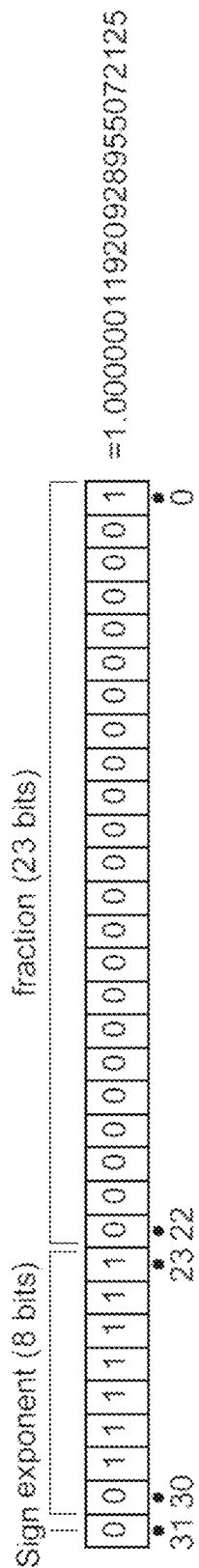
FIG. 30 is a diagram illustrating an IEEE standard 754 representation of an arbitrary floating point as an input to a target activation function.
Figure 31:
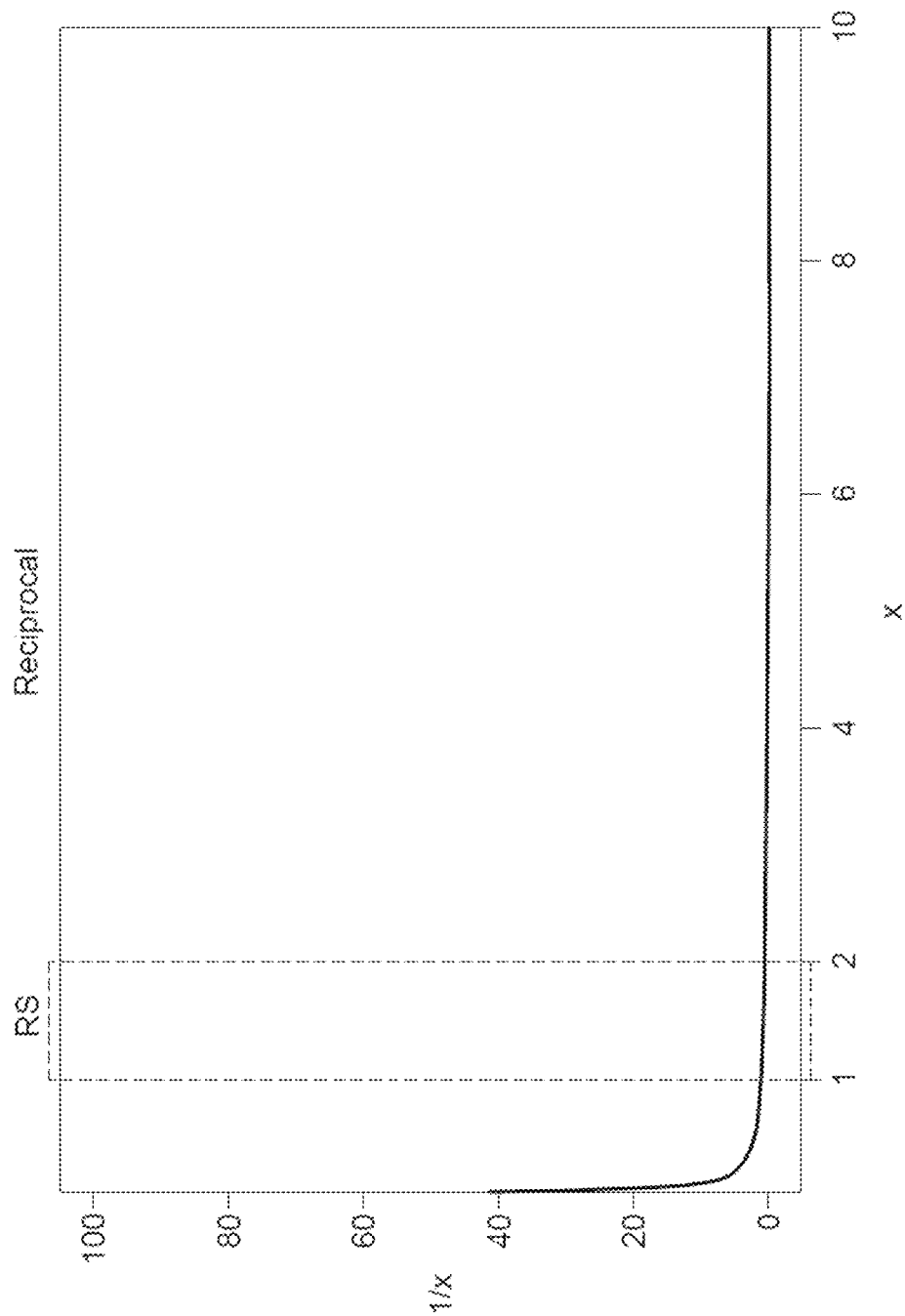
FIG. 31 is a diagram illustrating a reference section in a reciprocal function that is a target activation function.
Figure 32:
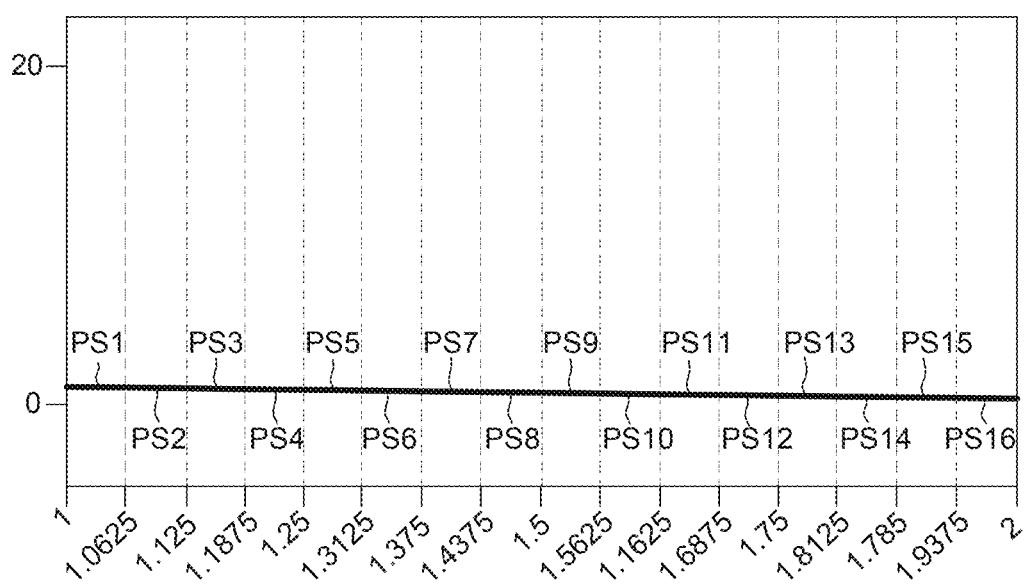
FIG. 32 is a diagram illustrating an activation function programmed in the reference section according to the second PAFE mode, according to one example of the present disclosure.
Figure 33:
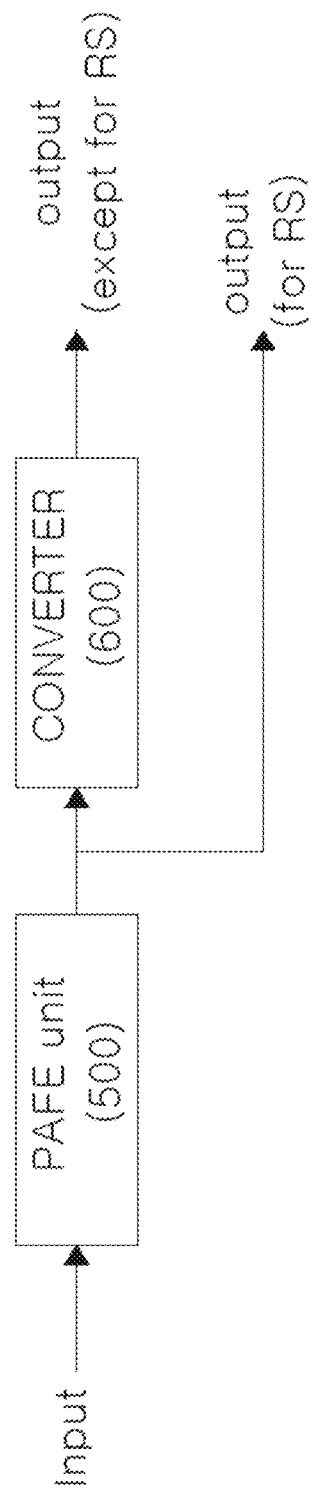
FIG. 33 is a diagram illustrating a PAFE unit and converter operating in the second PAFE mode according to one example of the present disclosure.

Referring to FIGS. 29 through 35, the second PAFE mode is described in which the target activation function is set to a reciprocal function. FIG. 29 is a flowchart illustrating operating in a second PAFE mode, according to one example of the present disclosure. FIG. 30 is a diagram illustrating an IEEE standard 754 representation of an arbitrary floating point as an input to a target activation function. FIG. 31 is a diagram illustrating a reference section in a reciprocal function that is a target activation function. FIG. 32 is a diagram illustrating an activation function programmed in the reference section to operate in the second PAFE mode, according to one example of the present disclosure. FIG. 33 is a diagram illustrating a PAFE unit and converter operating in the second PAFE mode, according to one example of the present disclosure.

Referring to FIG. 29, operation in the second PAFE mode S500 may include setting a target activation function S510, approximating the target activation function to a programmed activation function in a reference section using at least one activation function approximation method S520, converting the programmed activation function in the reference section to a programmable parameter and storing the programmed activation function in a lookup table S530, executing the programmed activation function using the programmable parameters in the reference section S540, and converting the output value of the programmed activation function in the reference section to execute the programmed activation function in the entire section S550.

In the step S510, an activation function that is the target of the programming is set. For example, the target activation function may be a reciprocal function. In this regard, an arbitrary floating point, 1.00000011920928955072125, expressed in IEEE standard 754, may be represented as shown in FIG. 30.

However, the form of the input is not limited to floating-point, and brain-floating point (BF16) may be applied to improve the computational efficiency of the neural processing unit, reduce memory usage, reduce power consumption, and the like. However, the examples of the present disclosure are not limited and may include dynamic floating-point, variable precision floating-point (VPFP), custom floating-point (CFP), flexible floating-point (FFP), and the like.

VPFP refers to a floating-point format that allows the bit widths of exponent and mantissa to be set or adjusted dynamically. VPFP allows for flexible precision levels based on specific calculations to optimize power and performance. The dynamic floating-point format, used interchangeably with variable precision, allows mantissa and exponent sizes to be adjusted on-the-fly during runtime to respond to data characteristics in real time.

CFP refers to an application-specific format where the bit allocation for the mantissa and exponent is tailored to the needs of a particular use case. This can be useful for hardware implementations that choose the correct bit width to optimize hardware resources and data accuracy.

FFP refers to a floating-point format that allows for adjustable bit allocation between the exponent and mantissa. FFP may be implemented in hardware accelerators to provide an optimal balance between range and precision.

That is, the format of a number processed by the PAFE unit 500 according to various examples of the present disclosure may comprise an exponent of a first bit width and a mantissa of a second bit width.

As illustrated in FIG. 30, the IEEE 754 floating-point representation comprises three components. The most significant bit (e.g., 31st bit) represent the sign part, the bits 23 to 30 represent the exponent part, and the bits 0 to 22 represent the mantissa part.

If expressed as a formula, it can be represented as Equation 3.

$$x = (-1)^s \times m \times 2^e \quad \text{Equation 3}$$

where x represents an input in the form of a floating-point number, parameter s denotes the sign of the input x, parameter e represents the exponent of the input x, and parameter m indicates the mantissa of the input x.

Since the target activation function is a reciprocal function, the activation value (f(x)) is expressed by applying the reciprocal function to the input, which is equal to equation 4.

$$f(x) = \frac{1}{x} = \frac{1}{(-1)^s \times m \times 2^e} = \frac{1}{m} \times 2^{-e} \quad \text{Equation 4}$$

In other words, assuming that the sign is positive (s is assumed to be 0), the activation value f(x) can be expressed as the product of 1/m and 2^(−e).

If the exponent part e of the input is zero, the activation value f(x) may be expressed as 1/m, which may refer to the activation value f(x) in the reference section.

For example, as shown in FIG. 31, when the exponent part e of the input is 0, the input x may correspond to 1 to 2. Hereinafter, the section in which the value of input x is between 1 and 2 is defined as the reference section RS.

In the step S520, the target activation function at the reference section is approximated to the programmed activation function using at least one activation function approximation method.

In one example, in the step S520, the programmed activation function for the reference section RS can be derived in the same way as step S420 of the first PAFE mode S400 described above with reference to FIG. 28. In other words, in the step S520, the target activation function may be approximated as the programmed activation function by training the neural network for the reference section RS with an input of 1 or 2.

Specifically, referring to FIG. 32, in the step S520, the activation function programmed for operating in the at least one activation function approximation mode may include a plurality of programmable segments (PS 1 to PS16) in the form of a first order function with a specific slope and a specific offset for each of the 16 segments within the reference section RS.

More specifically, for example, a first programmable segment PS1 may be calculated from an input within the reference section RS from 1 to 1.0625, a second programmable segment PS2 may be derived from an input within the reference section from 1.0625 to 1.125, a third programmable segment PS3 may be derived from an input within the reference section from 1.125 to 1.1875, a fourth programmable segment PS4 may be derived from an input within the reference section from 1.1875 to 1.25, a fifth programmable segment PS5 may be derived from an input within the reference section from 1.25 to 1.3125, a sixth programmable segment PS6 may be derived from an input within the reference section from 1.325 to 1.375, a seventh programmable segment PS7 may be derived from an input within the reference section from 1.375 to 1.4375, an eighth programmable segment PS8 may be derived from an input within the reference section from 1.4375 to 1.5, a ninth programmable segment PS9 may be derived from an input within the reference section from 1.5 to 1.5625, a tenth programmable segment PS10 may be derived from an input within the reference section from 1.5625 to 1.625, an eleventh programmable segment PS11 may be derived from an input within the reference section from 1.625 to 1.6875, a twelfth programmable segment PS12 may be derived from an input within the reference section from 1.6875 to 1.75, a thirteenth programmable segment PS13 may be derived from an input within the reference section from 1.75 to 1.8125, a fourteenth programmable segment PS14 may be derived from an input within the reference section from 1.8125 to 1.875, a fifteenth programmable segment PS15 may be derived from an input within the reference section from 1.875 to 1.9375, and a sixteenth programmable segment PS16 may be derived from an input within the reference section from 1.9375 to 2.

However, the present disclosure is not limited to training a neural network in the step S520, i.e., in the method of approximating the target activation function to a programmed activation function comprising a plurality of programmable segments, the method of setting the plurality of programmable segments is not limited to training a neural network.

That is, the method of setting the plurality of programmable segments included in the programmed activation function in the step S520 may correspond to any one of a polynomial approximation, a Chebyshev polynomial approximation, a spline interpolation, a Fourier series approximation, and a rational function approximation. For example, a polynomial approximation may be used to approximate an expression such as a sigmoid function, and a spline interpolation may be used to smoothly connect data points. However, the method of approximating the target activation function to the programmed activation function in the step S520 is not limited to the above, and may be performed using various approximation methods.

In other words, in the step S520, the method of approximating the target activation function to a programmed activation function comprising a plurality of programmable segments may vary as follows.

Specifically, as described above with reference to FIG. 3, in the step S520, all of the programmable segments may correspond to a first order function. However, without limitation, all programmable segments may be represented by polynomial functions, logarithmic functions, exponential functions, and the like.

As described above with reference to FIG. 4, in the step S520, all the programmable segments may be set to have the same or different widths.

As described above with reference to FIG. 5, in the step S520, the gradient change data (e.g., first derivative data) may be used to separate the target activation function into linear and nonlinear segments to set the programmable segments.

As described above with reference to FIGS. 6 through 8, in the step S520, the gradient change data (e.g., second derivative data) may be used to set programmable segments of the target activation function to distinguish substantially linear and nonlinear intervals.

As described above with reference to FIGS. 9 to 11, in the step S520, the error rates of the plurality of candidate segments may be calculated, respectively, to set the programmable segments.

As described above with reference to FIG. 12, in step S520, the programmable segment may be set using machine learning.

As described above with reference to FIG. 13, in step S520, the programmable segment may be set using an integral threshold of the segment approximation error of the target activation function.

In the step S530, the programmed activation function in the reference section RS is converted into programmable parameters, slope and offset, and stored in a lookup table.

As described above, the programmed activation function may be segmented into programmable segments PS 1 to PS16, which are first-order functional forms having a specific slope and a specific offset with respect to the reference section RS.

Accordingly, a specific slope and a specific offset, which are programmable parameters at each of the programmable segments PS 1 to PS16 with respect to the reference section, may be stored in the lookup table.

Referring to FIG. 33, in the step S540, the PAFE unit 500 may execute the programmed activation function for the reference section RS to generate an activation value output (for RS) in the reference section RS.

That is, in the step S540, the PAFE unit 500 may be provided with at least one programmable parameter, a specific slope and a specific offset, generated in response to the activation function programmed for the reference section RS, and may execute the activation function programmed for the reference section RS to generate an activation value output (for RS) in the reference the RS.

In other words, the activation value in the reference section RS output by the PAFE unit 500 may be expressed as a first activation value.

Since the details are identical to those described above with reference to FIGS. 16 and 17, a redundant description will be omitted.

In the step S550, the output value of the activation function programmed in the reference section is converted to execute the activation function programmed in the entire section.

Hereinafter, with further reference to FIGS. 34 and 35, a step S550 of executing the programmed activation function in the entire section by converting the output value of the programmed activation function in the reference section RS will be described in detail.

Figure 34:
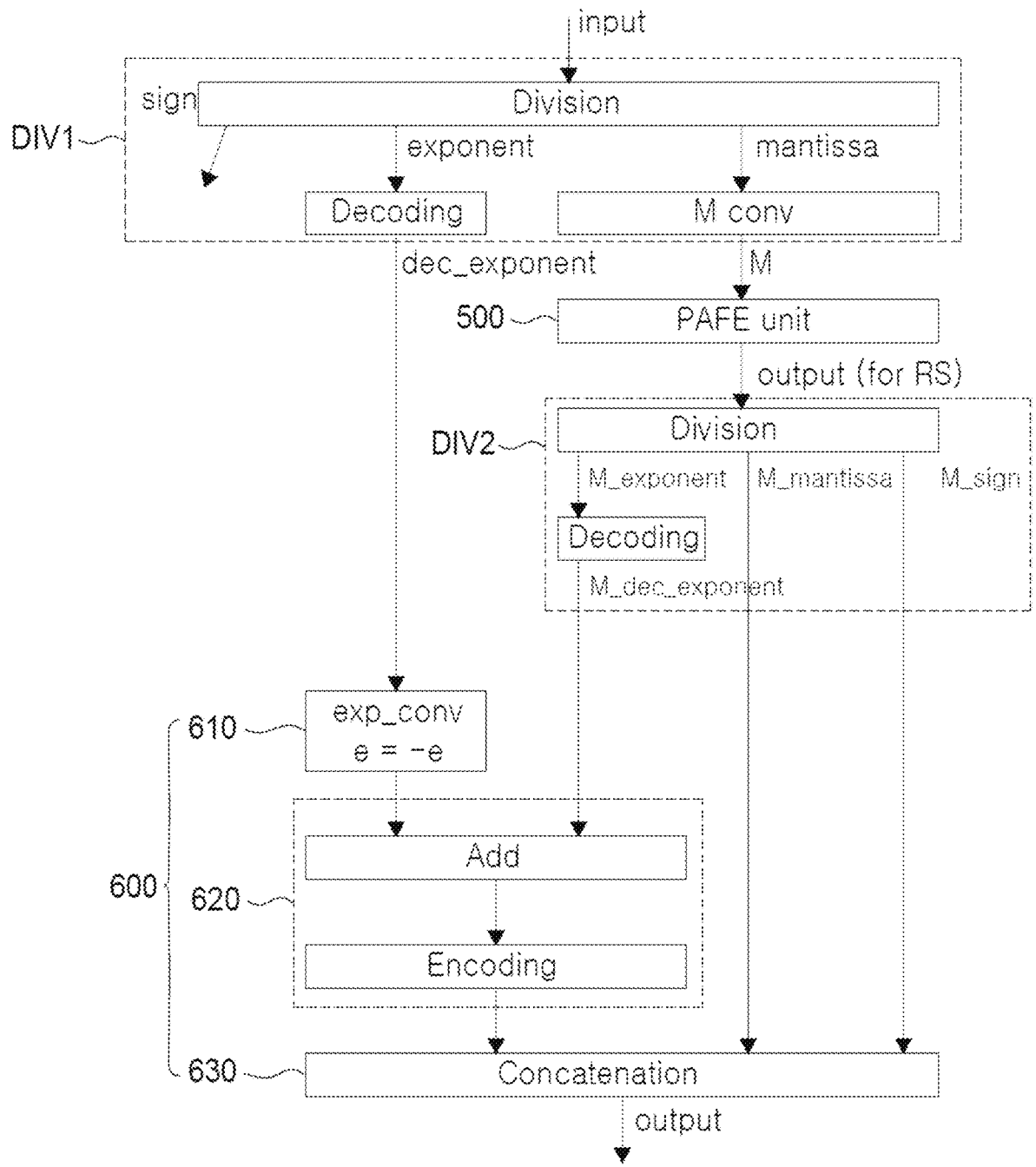
FIG. 34 is a drawing illustrating a configuration of a PAFE unit and converter operating in the second PAFE mode, according to one example of the present disclosure.

FIG. 34 is a drawing illustrating a configuration of a PAFE unit and converter operating in the second PAFE mode, according to one example of the present disclosure. FIG. 35 is a graph illustrating converting the activation value of a reference section in the second PAFE mode, according to one example of the present disclosure.

In the step S550, the converter 600 may convert the activation value in the reference section RS outputted in the step S540 output (for RS) to output an activation value in all sections except the reference section RS output (except for RS). In other words, the activation value output (except for RS) in all sections except the reference section RS output by the converter 600 may be expressed as a second activation value.

In other words, in the step S550, the converter 600 may convert the first activation value output (for RS) in the reference section RS outputted in the step S540 to output the second activation value output (except for RS) in all sections except the reference section RS.

Thus, by using the converter 600 in the step S550, the programmed activation function can be executed in all sections. Referring to FIG. 34, the converter 600 for operating in the second PAFE mode may include first to third subcircuits 610, 620, 630.

The first subcircuit 610 may apply a minus sign to the exponent part e of the input.

In other words, the first subcircuit 610 may apply a reciprocal function, which is a target activation function, to the exponent part e of the input to generate an output value-e with a negative sign applied to the exponent part e of the input.

The Add unit of the second subcircuit 620 may add the output value-e from the first subcircuit 610 to the exponent part M_dec_exponent of the first activation value output from the PAFE unit 500.

The Encoding unit of the second subcircuit 620 may encode and output the sum of the exponent part M_dec_exponent of the first activation value output from the PAFE unit 500 and the output value-e from the first subcircuit 610.

The third subcircuit 630 may generate a final output by concatenating the output value of the second subcircuit 620 and the mantissa part M_mantissa and the sign part M_sign of the first activation value output from the PAFE unit 500.

Referring to the structure of the converter 600 shown in FIG. 34, in the step S550, the detailed operation of the PAFE unit 500 and the converter 600 will be described as follows.

The Division unit of the first divider circuit DIV1 may factorize an input in floating-point form into a sign part, an exponent part, and a mantissa part.

Specifically, as shown in FIG. 30, the floating-point representation of IEEE 754 is composed of three parts. The most significant bit 31 bit represents the sign part, the 23 bit to 30 bit part represents the exponent part, and the 0 bit to 22 bit part represents the mantissa part. The first divider circuit DIV1 may decode the exponent into 8-bit integer data dec_exponent and transmits it to the first subcircuit 610.

The M conv circuit of the first divider circuit DIV1 may convert the mantissa back to a floating-point form M (e.g., 24 bits floating-point) and transmits it to the PAFE unit 500.

The exp_conv unit of the first subcircuit 610 may apply the target activation function, the reciprocal function, to the exponential part e of the input represented by an integer form (e.g., 8 bits integer), such that a negative sign is applied to the exponential part e of the input. In other words, the first subcircuit 610 may apply the target activation function, the reciprocal function, to the exponential part e of the input to generate an output value-e with a negative sign applied to the exponential part e of the input.

The PAFE unit 500 may execute the programmed activation function on the mantissa of the input to generate a first activation value output (for RS) in the reference section RS.

The Division unit of the second divider circuit DIV2 may factorize the first activation value output (for RS) in the reference section RS into a sign part M_sign, an exponent part M_exponent and a mantissa part M_mantissa.

The Decoding unit of the second division circuit DIV2 may decode the exponent M_exponent into an integer data form (e.g., 8 bits integer) and transmits it to the second subcircuit 620.

The sign part M_sign of the activation value output (for RS) in the reference section RS described above may be represented as 0, and the exponent part M_exponent may be represented as 00000000.

The second divider circuit DIV2 may transmit the sign part M_sign and the mantissa part M_mantissa of the first activation value (output (for RS)) in the reference section RS to the third subcircuit 630.

The Add unit of the second subcircuit 620 may add the exponent M_dec_exponent of the activation value output from the PAFE unit 500 and the output value-e from the first subcircuit 610.

That is, the exponent part M_dec_exponent of the first activation value output from the PAFE unit 500 is 00000000, so that the sum of the exponent part M_dec_exponent of the first activation value output from the PAFE unit 500 and the output value-e from the first subcircuit 610 may correspond to the output value-e from the first subcircuit 610.

The Encoding unit of the second subcircuit 620 may encode the output value-e from the first subcircuit 610 and output it to the third subcircuit 630.

The concatenation unit of the third subcircuit 630 may concatenate the output value-e of the second subcircuit 620 to a sign partn M_sign and a mantissa part M_mantissa for the first activation value output (for RS) in the reference section RS.

Accordingly, the third subcircuit 630 may output the second activation value output.

More specifically, since the sign part M_sign for the first activation value output (for RS) in the reference section RS is equal to 0, the third subcircuit 630 may output the second activation value output (for RS) in all sections except the reference section RS by applying the exponential part-e, which is the output value-e of the second subcircuit 620, to the mantissa part M_mantissa for the first activation value output (for RS) in the reference section RS.

If the exponent part e is 1, according to Equation 3, the input x may fall within the range of 2 to 4, which represents the reference section RS of 1 to 2 multiplied by 2.

Figure 35:
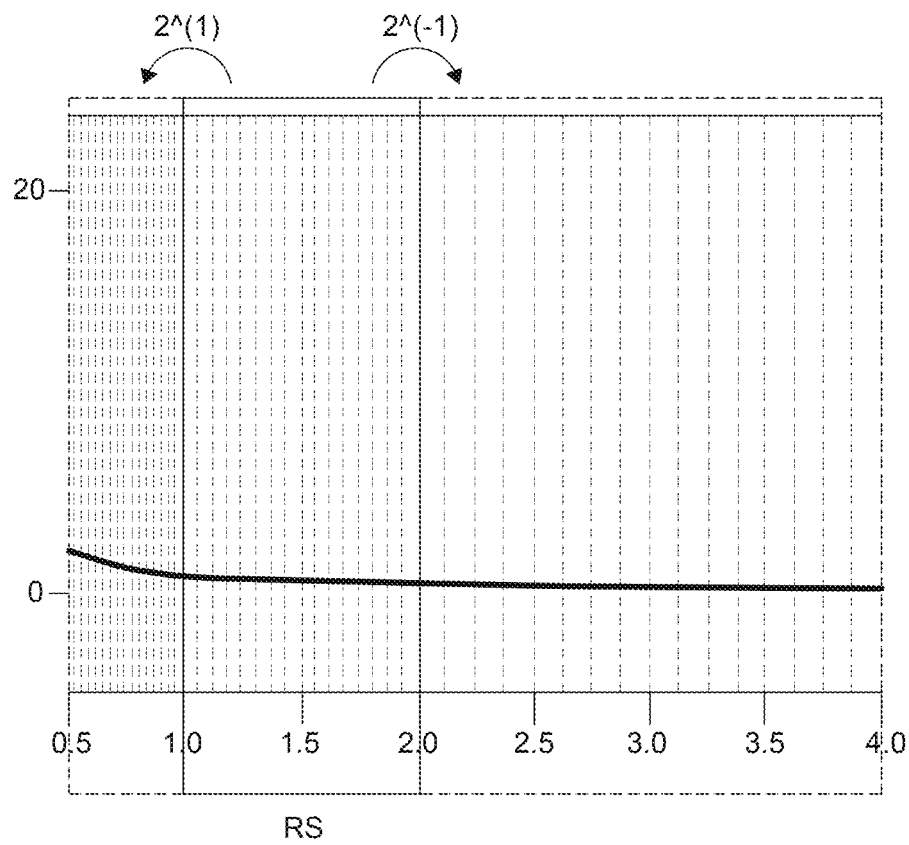
FIG. 35 is a graph illustrating the process of converting the activation value of a reference section in the second PAFE mode according to one example of the present disclosure.

Referring to FIG. 35, since the output value-e of the second subcircuit 620 in the section where the input is between 2 and 4 is equal to −1, the first activation value output (for RS) in the reference section may be multiplied by the exponent part, $2^{(-1)}$, to derive the second activation value in the section where the input is between 2 and 4.

Conversely, if the exponent part e is −1, the input x may fall within the range of 0.5 to 1, which corresponds to ½ of the reference section ES, as defined by Equation 3.

Referring to FIG. 35, in the range where the input is between 0.5 and 1, the output value −e of the second subcircuit 620 corresponds to 1. Therefore, the first activation value output (for RS) can be multiplied by the exponent part, $2^{(1)}$, to derive the second activation value for the range where the input is between 0.5 and 1.

Figure 36:
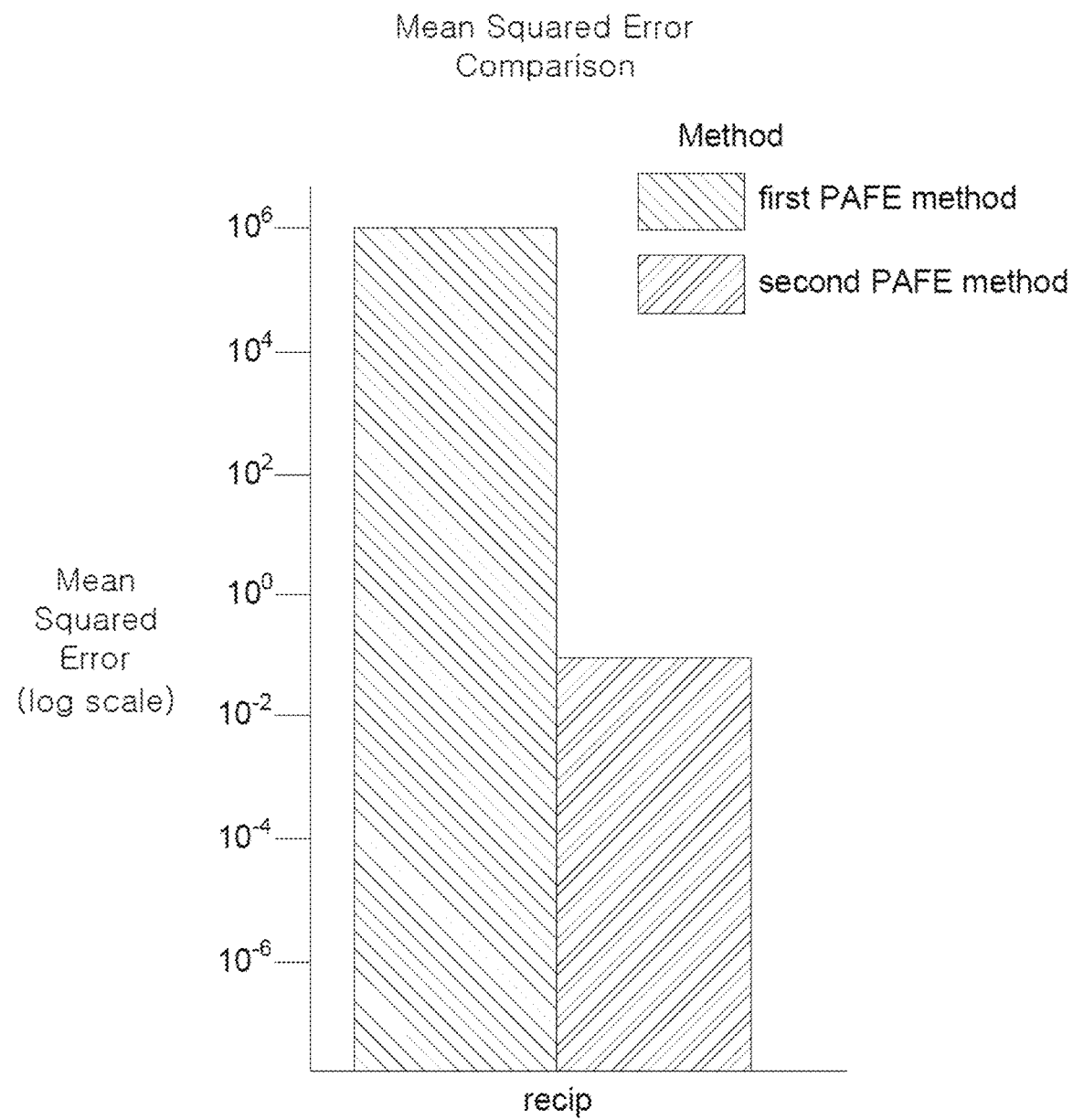
FIG. 36 is a graph illustrating the error rate of the programmed activation function in the first PAFE mode and the second PAFE mode, according to one example of the present disclosure.

FIG. 36 is a graph illustrating the error rate of the programmed activation function when operated in the first PAFE mode and the second PAFE mode, according to one example of the present disclosure.

As described above, when deriving a programmed activation function using the first PAFE mode, the total number of programmable segments derivable across all sections may correspond to the number of comparators included in circuit of the programmed activation function execution unit. For instance, if the programmed activation function execution unit may include 15 comparators, the number of programmable segments derivable from all sections can be up to 16. Thus, when operated in the first PAFE mode, an activation value comprising only 16 programmable segments can be derived, leading to a relatively high error rate for the activation value. As illustrated in FIG. 36, the error rate for the activation value using the first PAFE mode may reach approximately $10^6$ In contrast, when deriving a programmed activation function using the second PAFE mode, the number of programmable segments derivable within the reference section also may correspond to the number of comparators in the circuit of the programmed activation function execution unit. For example, if the execution unit includes 15 comparators, 16 programmable segments can be derived within the reference section.

Furthermore, under the second PAFE mode, an exponential function is applied to the first activation value within the reference section to derive the second activation value outside the reference section.

Consequently, the total number of programmable segments derivable across all sections is calculated by multiplying 16 (the number of segments per reference section) by the number of input sections.

For example, if the input section is divided into 255 segments, the total number of programmable segments derivable across all sections becomes 16×255=4080.

This enables the derivation of activation values comprising 4080 programmable segments, resulting in a significantly lower error rate compared to the first PAFE mode. As shown in FIG. 36, the error rate for the activation value using the second PAFE mode may correspond to approximately $10^{\wedge}(-1)$.

As described, the second PAFE mode reduces the error rate of activation values and thereby enhances the inference accuracy of the neural processing unit (NPU).

In one or more embodiments of the present disclosure, a neural processing unit may be provided. The neural processing unit may comprise a controller circuit configured to select an activation function processing method among a first method or a second method, according to an activation function included in a neural network model, a programmed activation function execution unit (PAFE Unit) configured to execute a programmed activation function (PAF) that approximate the activation function and output a first activation value, and a converter circuit configured to convert the first activation value and output a second activation value. In the first method, only the PAFE Unit may operate. In the second method, both the PAFE Unit and the converter may operate.

In one or more embodiments of the present disclosure, when an error rate, defined as difference between the activation function and the PAF, is lower than a threshold value, the controller circuit may be configured to approximate the activation function using the first method. When the error rate is higher than the threshold value, the controller circuit may be configured to approximate the activation function using the second method.

In one or more embodiments of the present disclosure, an accuracy of an activation value output using the second method may be higher than an accuracy of the activation value output using the first method.

In one or more embodiments of the present disclosure, the PAF may be approximated through training of a neural network for the activation function.

In one or more embodiments of the present disclosure, in the first method, the PAFE unit is configured to output the first activation value for the entire input section.

In one or more embodiments of the present disclosure, in the second method, the PAFE unit may be configured to output the first activation value for the reference section of the input. The converter may be configured to output the second activation value for the sections excluding the reference section of the input.

In one or more embodiments of the present disclosure, the converter may be configured to apply an exponential function to the first activation value to generate and output the second activation value.

In one or more embodiments of the present disclosure, the converter may be configured to output the second activation value by concatenating a variable exponent part with a mantissa part of the first activation value.

In one or more embodiments of the present disclosure, the activation function may be a reciprocal function.

In one or more embodiments of the present disclosure, the PAF may include a programmable segment implemented as a linear function divided into a plurality of segments.

In one or more embodiments of the present disclosure, a method for executing a programmed activation function (PAF) may be provided. The method may comprise analyzing an activation function included in a neural network model, determining a processing method for the activation function from a first method or a second method based on an analysis result of the activation function, and executing the activation function using the determined the processing method from the first method and the second method. In the first method, a first activation value may be output by executing the PAF that approximates the activation function. In the second method, the first activation value may be output by executing the PAF that approximates the activation function. The first activation value may be converted to produce a second activation value.

In one or more embodiments of the present disclosure, in the determining the processing method for the activation function may further comprise: determining the first method that approximates the activation function when an error rate, defined as difference between the activation function and the PAF, is lower than a threshold value, and determining the second method that approximate the activation function when the error rate is equal to or exceeds the threshold value.

In one or more embodiments of the present disclosure, an accuracy of an activation value output using the second method may be higher than an accuracy of the activation value output using the first method.

In one or more embodiments of the present disclosure, the PAF may be approximated through training of a neural network for the activation function.

In one or more embodiments of the present disclosure, the first method may be configured to output the first activation value for the entire input section.

In one or more embodiments of the present disclosure, the second method may be configured to output the first activation value for the reference section of the input, and may be configured to output the second activation value for the sections other than the reference section of the input.

In one or more embodiments of the present disclosure, the second method may be configured to apply an exponential function to the first activation value to generate and output the second activation value.

In one or more embodiments of the present disclosure, the second method may be configured to output the second activation value by concatenating a variable exponent part with a mantissa part of the first activation value.

In one or more embodiments of the present disclosure, the activation function may be a reciprocal function.

In one or more embodiments of the present disclosure, the PAF may include a programmable segment implemented as a linear function divided into a plurality of segments.

The examples of the present disclosure disclosed in the present specification and drawings are only presented as specific examples to easily explain the technical content of the present disclosure and help understanding of the present disclosure, and are not intended to limit the scope of the present disclosure. It is obvious to those skilled in the art that other modified examples based on the technical spirit of the present invention can be implemented in addition to the examples disclosed herein.

[National Research and Development Project that Supported this Invention]
 [Assignment number] 1711195792
 [Assignment number] 00228938
 [Ministry Name] Ministry of Science and ICT
 [Name of project management (professional) organization] Korea Information and Communication Planning and Evaluation Institute
 [Research project name] Artificial intelligence semiconductor SW integrated platform technology development
 [Research project name] Commercial edge AI SoC semiconductor SW development platform technology development
 [Contribution rate] 1/1
 [Name of project carrying out organization] DeepX
 [Research period] 2025.01.01~2025.12.31

What is claimed is:

1. A neural processing unit comprising:
 a controller circuit configured to select a first mode or a second mode for approximating application of a target activation function in a neural network model based on an analysis of the activation function;
 one or more processors configured to execute a programmed activation function (PAF) and generate a first activation value in both the first mode and the second mode by applying the PAF, the first activation value used as an approximation of applying the target activation function in the first mode; and
 a converter circuit coupled to the one or more processors and configured to convert the first activation value into a second activation value in the second mode but not in the first mode, the second activation value used in the second mode to approximate application of the target activation function more accurately than the first activation value.

2. The neural processing unit of claim 1, wherein:
 responsive to an error rate defined as a difference between the target activation function and the PAF being lower than a threshold value, the controller circuit is configured to select the first mode; and
 responsive to the error rate being not lower than the threshold value, the controller circuit is configured to select the second mode.

3. The neural processing unit of claim 1, wherein the PAF is approximated using a trained neural network.

4. The neural processing unit of claim 1, wherein, in the first mode, the one or more processors are configured to output the first activation value across entire sections of input values to the target activation function.

5. The neural processing unit of claim 4, wherein, in the second mode, the one or more processors are configured to use the first activation value for a reference section of the input values, and the converter circuit is configured to use the second activation value for the sections excluding the reference section.

6. The neural processing unit of claim 1, wherein the converter circuit is configured to apply an exponential function to the first activation value to generate the second activation value in the second mode.

7. The neural processing unit of claim 1, wherein the converter circuit is configured to output the second activation value by concatenating a variable exponent part with a mantissa part of the first activation value.

8. The neural processing unit of claim 1, wherein the target activation function is a reciprocal function.

9. The neural processing unit of claim 1, wherein the PAF includes a programmable segment implemented as a linear function divided into a plurality of segments.

10. A method for operating a neural processor, comprising:
 analyzing a target activation function included in a neural network model;
 selecting a first mode or a second mode for approximating application of the target activation function based on the analysis;
 executing a programmed activation function (PAF) in both the first mode and the second mode to generate a first activation value;
 using the first activation value as an approximation of applying the target activation function in the first mode;
 converting the first activation value into a second activation value in the second mode but not in the first mode; and
 using the second activation value as an approximation of applying the target activation function in the second mode, the second activation value more accurately approximating the application of the target activation function than the first activation value.

11. The method of claim 10, wherein:
 selecting the first mode responsive to an error rate defined as a difference between the target activation function and the PAF being lower than a threshold value; and
 selecting the second mode responsive to the error rate being not lower than the threshold value.

12. The method of claim 10, wherein the PAF is approximated through a trained neural network.

13. The method of claim 10, wherein, in the first mode, the first activation value is used across entire sections of input values to the target activation function.

14. The method of claim 13, wherein, in the second mode, using the first activation value for a reference section of the input values, and using the second activation value for the sections excluding the reference section.

15. The method of claim 10, wherein converting the first activation value to the second activation value comprises applying an exponential function to the first activation value to generate the second activation value.

16. The method of claim 10, wherein converting the first activation value to the second activation value comprises concatenating a variable exponent part with a mantissa part of the first activation value.

17. The method of claim 10, wherein the target activation function is a reciprocal function.

18. The method of claim 10, wherein the PAF includes a programmable segment implemented as a linear function divided into a plurality of segments.

* * * * *